US012587814B2

(12) United States Patent
Kobel et al.

(10) Patent No.: US 12,587,814 B2
(45) Date of Patent: Mar. 24, 2026

(54) WORKSITE CONNECTIVITY SYSTEM

(71) Applicant: Oshkosh Corporation, Oshkosh, WI (US)

(72) Inventors: Korry D. Kobel, Oshkosh, WI (US);
Fredric L Yutzy, Oshkosh, WI (US);
Dan Adamson, Oshkosh, WI (US);
Stefan Eshleman, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/509,011

(22) Filed: Nov. 14, 2023

(65) Prior Publication Data

US 2024/0089707 A1 Mar. 14, 2024

Related U.S. Application Data

(63) Continuation of application No. 17/576,813, filed on Jan. 14, 2022.

(Continued)

(51) Int. Cl.
*H04W 4/08* (2009.01)
*B66F 9/06* (2006.01)
(Continued)

(52) U.S. Cl.
CPC ................ *H04W 4/08* (2013.01); *B66F 9/06* (2013.01); *B66F 9/0755* (2013.01);
(Continued)

(58) Field of Classification Search
None
See application file for complete search history.

(56) References Cited

U.S. PATENT DOCUMENTS 3,009,747 A 11/1961 Pitzer
4,099,761 A 7/1978 Cullings
(Continued)

FOREIGN PATENT DOCUMENTS

CN 102756997 A 10/2012
CN 207608281 U 7/2018
(Continued)

OTHER PUBLICATIONS

International Search Report and Written Opinion issued in connection with PCT Appl. Ser. No. PCT/US2022/012610 dated Jun. 21, 2022 (19 pages).

(Continued)

*Primary Examiner* — Kodzovi Acolatse
(74) *Attorney, Agent, or Firm* — Foley & Lardner LLP

(57) ABSTRACT

A site connectivity system includes a deployable connectivity hub configured to be selectively deployed at a site. The deployable connectivity hub including a wireless hub connectivity module configured to facilitate wireless communications and a processing circuit. The processing circuit is configured to establish a local site network with a plurality of wireless machine connectivity modules including at least a first wireless machine connectivity module associated with a first machine at the site and a second wireless machine connectivity module associated with a second machine at the site, establish a connection with a remote server, receive data from the first wireless machine connectivity module regarding the first machine over the local site network, transmit the data to the second wireless machine connectivity module over the local site network, and transmit the data to the remote server over the connection.

17 Claims, 32 Drawing Sheets

Related U.S. Application Data

(60) Provisional application No. 63/137,996, filed on Jan. 15, 2021, provisional application No. 63/138,003, filed on Jan. 15, 2021, provisional application No. 63/138,016, filed on Jan. 15, 2021, provisional application No. 63/137,978, filed on Jan. 15, 2021, provisional application No. 63/137,867, filed on Jan. 15, 2021, provisional application No. 63/138,024, filed on Jan. 15, 2021, provisional application No. 63/137,950, filed on Jan. 15, 2021, provisional application No. 63/137,893, filed on Jan. 15, 2021, provisional application No. 63/138,015, filed on Jan. 15, 2021, provisional application No. 63/137,955, filed on Jan. 15, 2021.

(51) Int. Cl.

| | |
|---|---|
| *B66F 9/075* | (2006.01) |
| *B66F 9/12* | (2006.01) |
| *B66F 11/04* | (2006.01) |
| *G05B 19/4155* | (2006.01) |
| *G05D 1/00* | (2006.01) |
| *G05D 1/224* | (2024.01) |
| *G05D 1/225* | (2024.01) |
| *G05D 1/226* | (2024.01) |
| *G05D 1/692* | (2024.01) |
| *G05D 1/86* | (2024.01) |
| *G06F 3/0482* | (2013.01) |
| *G06F 3/0484* | (2022.01) |
| *G06F 3/0488* | (2022.01) |
| *G06Q 10/20* | (2023.01) |
| *G06Q 30/0251* | (2023.01) |
| *G06Q 30/0601* | (2023.01) |
| *G07C 5/00* | (2006.01) |
| *G07C 5/08* | (2006.01) |
| *G08B 3/00* | (2006.01) |
| *G08B 5/36* | (2006.01) |
| *G08B 7/06* | (2006.01) |
| *G08B 21/18* | (2006.01) |
| *H04L 67/52* | (2022.01) |
| *H04L 67/63* | (2022.01) |
| *H04W 4/029* | (2018.01) |
| *H04W 4/30* | (2018.01) |
| *H04W 4/40* | (2018.01) |
| *H04W 4/70* | (2018.01) |
| *H04W 8/00* | (2009.01) |
| *H04W 48/16* | (2009.01) |
| *H04W 76/14* | (2018.01) |
| *H04W 76/15* | (2018.01) |
| *H04W 76/23* | (2018.01) |
| *B66F 17/00* | (2006.01) |
| *G06F 16/93* | (2019.01) |
| *H04W 4/35* | (2018.01) |
| *H04W 4/80* | (2018.01) |
| *H04W 84/12* | (2009.01) |
| *H04W 84/18* | (2009.01) |
| *H04W 88/08* | (2009.01) |

(52) U.S. Cl.
 CPC ............ *B66F 9/07581* (2013.01); *B66F 9/12* (2013.01); *B66F 11/046* (2013.01); *G05B 19/4155* (2013.01); *G05D 1/0022* (2013.01); *G05D 1/0027* (2013.01); *G05D 1/0044* (2013.01); *G05D 1/005* (2013.01); *G05D 1/224* (2024.01); *G05D 1/2246* (2024.01); *G05D 1/225* (2024.01); *G05D 1/226* (2024.01); *G05D 1/692* (2024.01); *G05D 1/86* (2024.01); *G06F 3/0482* (2013.01); *G06F 3/0484* (2013.01); *G06F 3/0488* (2013.01); *G06Q 10/20* (2013.01); *G06Q 30/0251* (2013.01); *G06Q 30/0611* (2013.01); *G06Q 30/0631* (2013.01); *G06Q 30/0641* (2013.01); *G07C 5/006* (2013.01); *G07C 5/0825* (2013.01); *G08B 3/00* (2013.01); *G08B 5/36* (2013.01); *G08B 7/06* (2013.01); *G08B 21/18* (2013.01); *H04L 67/52* (2022.05); *H04L 67/63* (2022.05); *H04W 4/029* (2018.02); *H04W 4/30* (2018.02); *H04W 4/40* (2018.02); *H04W 4/70* (2018.02); *H04W 8/005* (2013.01); *H04W 48/16* (2013.01); *H04W 76/14* (2018.02); *H04W 76/15* (2018.02); *H04W 76/23* (2018.02); *B66F 11/04* (2013.01); *B66F 17/006* (2013.01); *G05B 2219/45049* (2013.01); *G06F 16/93* (2019.01); *H04W 4/35* (2018.02); *H04W 4/80* (2018.02); *H04W 84/12* (2013.01); *H04W 84/18* (2013.01); *H04W 88/08* (2013.01); *H04W 88/085* (2013.01)

(56) References Cited

U.S. PATENT DOCUMENTS

| | | |
|---|---|---|
| 4,178,591 A | 12/1979 | Geppert |
| 4,315,652 A | 2/1982 | Barwise |
| 4,426,110 A | 1/1984 | Mitchell et al. |
| 4,461,608 A | 7/1984 | Boda |
| 4,572,567 A | 2/1986 | Johnson |
| 4,573,728 A | 3/1986 | Johnson |
| 4,810,020 A | 3/1989 | Powell |
| 5,026,104 A | 6/1991 | Pickrell |
| 5,092,731 A | 3/1992 | Jones et al. |
| 5,209,537 A | 5/1993 | Smith et al. |
| 5,330,242 A | 7/1994 | Lucky, Sr. |
| 5,493,881 A | 2/1996 | Harvey |
| 5,730,430 A | 3/1998 | Hodson et al. |
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | Mcneilus et al. |
| 6,120,235 A | 9/2000 | Humphries et al. |
| 6,123,500 A | 9/2000 | McNeilus et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,264,013 B1 | 7/2001 | Hodgins |
| 6,315,515 B1 | 11/2001 | Young et al. |
| 6,336,783 B1 | 1/2002 | Young et al. |
| 6,350,098 B1 | 2/2002 | Christenson et al. |
| 6,411,887 B1 | 6/2002 | Martens et al. |
| 6,447,239 B2 | 9/2002 | Young et al. |
| 6,474,928 B1 | 11/2002 | Christenson |
| 6,526,335 B1 | 2/2003 | Treyz et al. |
| 6,565,305 B2 | 5/2003 | Schrafel |
| 6,611,755 B1 | 8/2003 | Coffee et al. |
| 6,993,421 B2 | 1/2006 | Pillar et al. |
| 7,070,382 B2 | 7/2006 | Pruteanu et al. |
| 7,207,610 B1 | 4/2007 | Kauppila |
| 7,284,943 B2 | 10/2007 | Pruteanu et al. |
| 7,398,137 B2 | 7/2008 | Ferguson et al. |
| 7,556,468 B2 | 7/2009 | Grata |
| 7,559,735 B2 | 7/2009 | Pruteanu et al. |
| 7,721,857 B2 | 5/2010 | Harr |
| 7,878,750 B2 | 2/2011 | Zhou et al. |
| 7,934,758 B2 | 5/2011 | Stamey et al. |
| 8,182,194 B2 | 5/2012 | Pruteanu et al. |
| 8,215,892 B2 | 7/2012 | Calliari |

(56) References Cited

U.S. PATENT DOCUMENTS

| | | | |
|---|---|---|---|
| 8,360,706 | B2 | 1/2013 | Addleman et al. |
| 8,514,058 | B2 | 8/2013 | Cameron |
| 8,533,604 | B1 | 9/2013 | Parenti et al. |
| 8,540,475 | B2 | 9/2013 | Kuriakose et al. |
| 8,655,505 | B2 | 2/2014 | Sprock et al. |
| 8,807,613 | B2 | 8/2014 | Howell et al. |
| 8,833,823 | B2 | 9/2014 | Price et al. |
| 9,028,193 | B2 | 5/2015 | Goedken |
| 9,216,856 | B2 | 12/2015 | Howell et al. |
| 9,387,985 | B2 | 7/2016 | Gillmore et al. |
| 9,523,582 | B2 | 12/2016 | Chandrasekar et al. |
| 9,624,033 | B1 | 4/2017 | Price et al. |
| 9,694,776 | B2 | 7/2017 | Nelson et al. |
| 9,880,581 | B2 | 1/2018 | Kuriakose et al. |
| 9,886,565 | B2 | 2/2018 | Nielsen et al. |
| 9,981,803 | B2 | 5/2018 | Davis et al. |
| 10,018,171 | B1 | 7/2018 | Breiner et al. |
| 10,035,648 | B2 | 7/2018 | Haddick et al. |
| 10,196,205 | B2 | 2/2019 | Betz et al. |
| 10,221,012 | B2 | 3/2019 | Hund, Jr. |
| 10,311,526 | B2 | 6/2019 | Takeda |
| 10,373,087 | B1 | 8/2019 | Yang et al. |
| 10,457,533 | B2 | 10/2019 | Puszkiewicz et al. |
| 10,663,955 | B2 | 5/2020 | Kuikka |
| 10,693,955 | B2 | 6/2020 | Lalsangi et al. |
| 10,796,577 | B2 * | 10/2020 | Katou .................... G06Q 50/40 |
| 10,798,113 | B2 | 10/2020 | Muddu et al. |
| 10,899,538 | B2 | 1/2021 | Nelson et al. |
| 10,913,428 | B2 | 2/2021 | Dingli |
| 10,977,943 | B1 | 4/2021 | Hayward |
| 11,252,149 | B1 | 2/2022 | Bang et al. |
| 11,493,903 | B2 | 11/2022 | Cella et al. |
| 11,888,853 | B2 | 1/2024 | Childress et al. |
| 11,948,019 | B1 | 4/2024 | Singh et al. |
| 12,130,780 | B2 | 10/2024 | Nishii |
| 12,200,783 | B2 | 1/2025 | Kopchinsky et al. |
| 2002/0070862 | A1 | 6/2002 | Francis et al. |
| 2002/0079713 | A1 | 6/2002 | Moilanen et al. |
| 2002/0123345 | A1 | 9/2002 | Mahany et al. |
| 2003/0158640 | A1 | 8/2003 | Pillar et al. |
| 2004/0114557 | A1 | 6/2004 | Bryan et al. |
| 2005/0002354 | A1 | 1/2005 | Kelly et al. |
| 2005/0140154 | A1 | 6/2005 | Vigholm et al. |
| 2005/0149920 | A1 | 7/2005 | Patrizi et al. |
| 2006/0132323 | A1 | 6/2006 | Grady, Jr. |
| 2007/0130296 | A1 * | 6/2007 | Kim ...................... H04W 76/11 |
| | | | 719/321 |
| 2007/0213869 | A1 | 9/2007 | Bandringa et al. |
| 2008/0154712 | A1 | 6/2008 | Wellman |
| 2009/0005928 | A1 | 1/2009 | Sells et al. |
| 2009/0049441 | A1 | 2/2009 | Mii et al. |
| 2009/0088924 | A1 * | 4/2009 | Coffee .................... B28C 5/422 |
| | | | 701/31.4 |
| 2009/0099897 | A1 * | 4/2009 | Ehrman ......... G06Q 10/063114 |
| | | | 705/7.15 |
| 2009/0101447 | A1 | 4/2009 | Durham et al. |
| 2010/0179844 | A1 | 7/2010 | Lafergola et al. |
| 2010/0271191 | A1 | 10/2010 | De Graff et al. |
| 2011/0010023 | A1 | 1/2011 | Kunzig et al. |
| 2011/0040440 | A1 | 2/2011 | De Oliveira et al. |
| 2011/0081193 | A1 | 4/2011 | Nilsson |
| 2012/0001876 | A1 | 1/2012 | Chervenka et al. |
| 2012/0046809 | A1 | 2/2012 | Wellman |
| 2013/0057007 | A1 | 3/2013 | Howell et al. |
| 2013/0127611 | A1 | 5/2013 | Bernstein et al. |
| 2013/0132140 | A1 | 5/2013 | Amin et al. |
| 2013/0238167 | A1 | 9/2013 | Stanfield et al. |
| 2013/0240300 | A1 | 9/2013 | Fagan et al. |
| 2014/0214240 | A1 | 7/2014 | Funke et al. |
| 2014/0241332 | A1 * | 8/2014 | Yang ...................... H04W 48/12 |
| | | | 370/338 |
| 2014/0278621 | A1 | 9/2014 | Medwin et al. |
| 2014/0312639 | A1 | 10/2014 | Petronek |
| 2015/0185716 | A1 * | 7/2015 | Wichmann ................ F02C 9/28 |
| | | | 700/287 |
| 2015/0310674 | A1 | 10/2015 | Humphrey et al. |
| 2015/0376869 | A1 | 12/2015 | Jackson |
| 2016/0034329 | A1 | 2/2016 | Larson et al. |
| 2016/0052762 | A1 | 2/2016 | Swift |
| 2016/0057004 | A1 | 2/2016 | Ge |
| 2016/0121490 | A1 | 5/2016 | Ottersland |
| 2016/0208992 | A1 | 7/2016 | Parsons |
| 2016/0221816 | A1 * | 8/2016 | Pollock .................. B67D 7/348 |
| 2016/0234259 | A1 | 8/2016 | Talmaki et al. |
| 2016/0272471 | A1 | 9/2016 | Jaipaul |
| 2016/0304051 | A1 | 10/2016 | Archer et al. |
| 2016/0318438 | A1 | 11/2016 | Wadell |
| 2016/0371433 | A1 | 12/2016 | Polesskiy et al. |
| 2017/0149901 | A1 * | 5/2017 | Condeixa ............. H04W 48/20 |
| 2017/0167088 | A1 * | 6/2017 | Walker .................. G06Q 50/08 |
| 2017/0169631 | A1 * | 6/2017 | Walker .................. G07C 5/008 |
| 2017/0212526 | A1 | 7/2017 | Vanderpool et al. |
| 2017/0269608 | A1 | 9/2017 | Chandrasekar et al. |
| 2017/0270490 | A1 | 9/2017 | Penilla et al. |
| 2017/0289121 | A1 | 10/2017 | Harwell |
| 2017/0291805 | A1 | 10/2017 | Hao et al. |
| 2017/0301210 | A1 * | 10/2017 | King ...................... G08B 25/10 |
| 2018/0065544 | A1 | 3/2018 | Brusco |
| 2018/0143734 | A1 | 5/2018 | Ochenas et al. |
| 2018/0150885 | A1 | 5/2018 | Albinger et al. |
| 2018/0151037 | A1 | 5/2018 | Morgenthau et al. |
| 2018/0164993 | A1 | 6/2018 | Zummo et al. |
| 2018/0234266 | A1 * | 8/2018 | Rudolph ................ H04L 67/12 |
| 2018/0276909 | A1 | 9/2018 | Harshbarger et al. |
| 2018/0335903 | A1 * | 11/2018 | Coffman ............. G06F 3/04847 |
| 2019/0033172 | A1 * | 1/2019 | Montemurro ........ G06V 20/588 |
| 2019/0156394 | A1 | 5/2019 | Karmakar |
| 2019/0180354 | A1 | 6/2019 | Greenberger et al. |
| 2019/0246060 | A1 | 8/2019 | Tanabe et al. |
| 2019/0376459 | A1 * | 12/2019 | Pieczko .................. F02D 13/06 |
| 2020/0014759 | A1 | 1/2020 | Wunderlich |
| 2020/0065433 | A1 | 2/2020 | Duff et al. |
| 2020/0134955 | A1 | 4/2020 | Kishita |
| 2020/0183362 | A1 | 6/2020 | Ledwith et al. |
| 2020/0207166 | A1 | 7/2020 | Froehlich |
| 2020/0298801 | A1 | 9/2020 | Dingli |
| 2020/0317489 | A1 | 10/2020 | Bhatia et al. |
| 2021/0023985 | A1 | 1/2021 | Stadnyk |
| 2021/0055178 | A1 | 2/2021 | Hinderling et al. |
| 2021/0056771 | A1 | 2/2021 | Federle |
| 2021/0087035 | A1 | 3/2021 | Yip et al. |
| 2021/0090363 | A1 | 3/2021 | Ramos et al. |
| 2021/0125123 | A1 | 4/2021 | Subramanian et al. |
| 2021/0211852 | A1 * | 7/2021 | Ramalho de Oliveira .................. |
| | | | H04W 28/0883 |
| 2021/0232137 | A1 | 7/2021 | Whitfield et al. |
| 2021/0250178 | A1 | 8/2021 | Herman et al. |
| 2022/0025611 | A1 | 1/2022 | Kandula et al. |
| 2022/0035364 | A1 | 2/2022 | Laclef et al. |
| 2022/0156921 | A1 | 5/2022 | Humpston et al. |
| 2022/0221365 | A1 | 7/2022 | Mahurkar et al. |
| 2022/0229415 | A1 | 7/2022 | Kobel et al. |
| 2022/0229431 | A1 | 7/2022 | Kobel et al. |
| 2022/0230224 | A1 | 7/2022 | Kobel et al. |
| 2022/0230488 | A1 | 7/2022 | Kobel et al. |
| 2022/0232649 | A1 | 7/2022 | Kobel et al. |
| 2023/0224680 | A1 | 7/2023 | Kobel et al. |
| 2023/0247390 | A1 | 8/2023 | Kobel et al. |
| 2024/0073651 | A1 | 2/2024 | Kobel et al. |
| 2024/0089708 | A1 | 3/2024 | Kobel et al. |
| 2024/0235931 | A1 | 7/2024 | Nolan et al. |

FOREIGN PATENT DOCUMENTS

| | | | | |
|---|---|---|---|---|
| CN | 111126522 | A | 5/2020 | |
| CN | 107426770 | B * | 9/2021 | ........... H04W 28/04 |
| DE | 10 2007 020 182 | A1 | 10/2008 | |
| DE | 10 2018 217 716 | A1 | 5/2019 | |
| EP | 1 136 433 | A2 | 9/2001 | |
| EP | 2 886 507 | A1 | 6/2015 | |
| EP | 3 112 312 | A1 | 1/2017 | |
| EP | 3 173 369 | A1 | 5/2017 | |

(56) References Cited

FOREIGN PATENT DOCUMENTS

| | | | |
|---|---|---|---|
| EP | 3 200 482 | A1 | 8/2017 |
| EP | 3 896 024 | A1 | 10/2021 |
| EP | 4 048 842 | B1 | 8/2022 |
| JP | H08-282995 | A | 10/1996 |
| JP | H1059698 | A | 3/1998 |
| JP | 2016-159996 | A | 9/2016 |
| JP | 2020-128270 | A | 8/2020 |
| JP | 2021-052920 | A | 4/2021 |
| WO | WO-01/30671 | A2 | 5/2001 |
| WO | WO-2011/019872 | A2 | 2/2011 |
| WO | WO-2012/109444 | A2 | 8/2012 |
| WO | WO-2020/121613 | A1 | 6/2020 |

OTHER PUBLICATIONS

Invitation to Pay Additional Fees issued in connection with PCT Appl. Ser. No. PCT/US2022/012610 dated Apr. 28, 2022 (136 pages).

Invitation to Pay Additional Fees issued in connection with PCT Appl. Ser. No. PCT/US2022/012628 dated May 13, 2022 (134 pages).

Notification of Transmittal of the International Search Report and the Written Opinion of the International Search Authority, or the Declaration issued in connection with PCT Appl. Ser. No. PCT/US2022/012603 dated Jul. 6, 2022 (27 pages).

Notification of Transmittal of the International Search Report and the Written Opinion of the International Search Authority, or the Declaration issued in connection with PCT Appl. Ser. No. PCT/US2022/012628 dated Julv 6, 2022 (27 pages).

Suzuki et al., "Teleoperation of Multiple Robots through the Internet", IEEE International Workshop on Robot and Human Communication, published 1996, pp. 84-89 (Year: 1996).

B. Ressa and A. Mori, "An incremental approach to the advanced teleoperation of an earthwork equipment," Proceedings of the Intelligent Vehicles '94 Symposium, Paris, France, 1994, pp. 556-561, doi: 10.1109/IVS.1994.639578. (Year: 1994).

J. Ramos, R. Ribeiro, D. Safadinho, J. Barroso and A. Pereira, "Communication Protocol for Unmanned Vehicles : An Architectural Approach," 2020 Global Internet of Things Summit (GIoTS), Dublin, Ireland, 2020, pp. 1-7, doi: 10.1109/ GIOTS49054.2020.9119640. (Year: 2020).

M. C. Mora, V. Suesta, L. Armesto and J. Tornero, "Factory management and transport automation," EFTA 2003. 2003 IEEE Conference on Emerging Technologies and Factory Automation. Proceedings (Cat. No.03TH8696), Lisbon, Portugal, 2003, pp. 508-515 vol.2, doi: 10.1109/ETFA.2003. 1248741. (Year: 2003).

R. Bostelman and W. Shackleford, "Improved performance of an automated guided vehicle by using a smart diagnostics tool," 2010 IEEE International Conference on Industrial Technology, Via del Mar, Chile, 2010, pp. 1688-1693, doi: 10.1109/ICIT.2010.5472637. (Year: 2010).

Extended European Search Report issued in EP Appl. No. 25187841.9 dated Sep. 10, 2025.

* cited by examiner

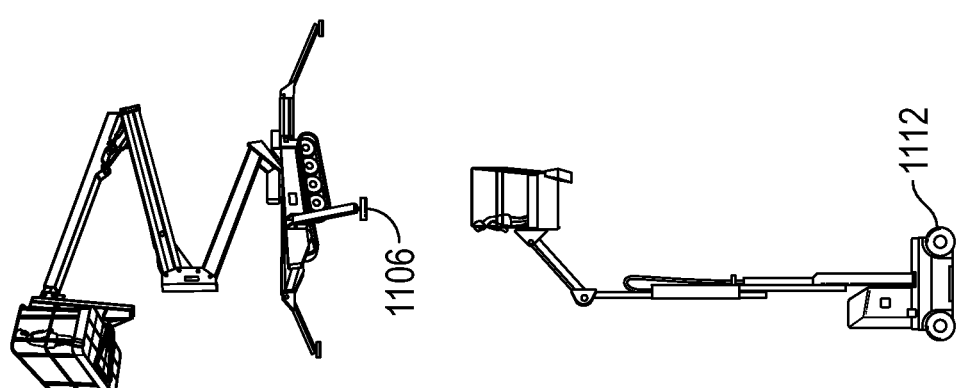
1106
1112
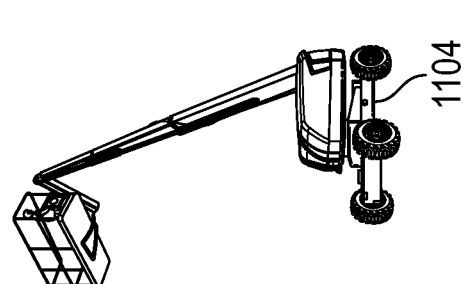
1104
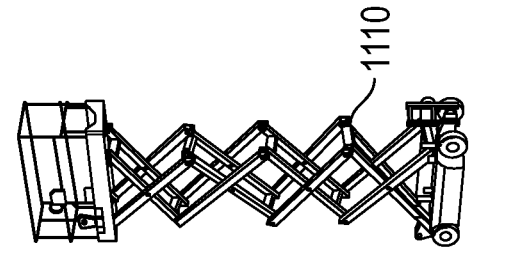
1110
FIG. 11
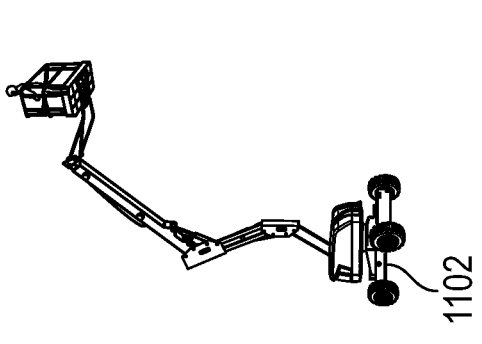
1102
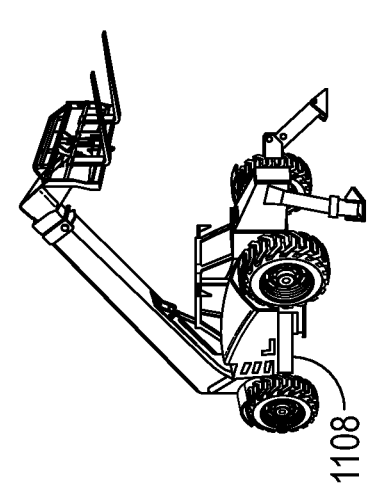
1108

1500

1506

1504

1502

PLATFORM POSITION HEAT MAPPING - MACHINE PROFILING

WORKSITE CONNECTIVITY SYSTEM

CROSS-REFERENCE TO RELATED PATENT APPLICATIONS

This application is a continuation of U.S. application Ser. No. 17/576,813, filed Jan. 14, 2022, which claims the benefit of and priority to U.S. Provisional Application No. 63/137, 950, filed on Jan. 15, 2021, U.S. Provisional Application No. 63/137,955, filed on Jan. 15, 2021, U.S. Provisional Application No. 63/137,996, filed on Jan. 15, 2021, U.S. Provisional Application No. 63/138,003, filed on Jan. 15, 2021, U.S. Provisional Application No. 63/138,015, filed on Jan. 15, 2021, U.S. Provisional Application No. 63/138,016, filed on Jan. 15, 2021, U.S. Provisional Application No. 63/138, 024, filed on Jan. 15, 2021, U.S. Provisional Application No. 63/137,867, filed on Jan. 15, 2021, U.S. Provisional Application No. 63/137,893, filed on Jan. 15, 2021, and U.S. Provisional Application No. 63/137,978, filed on Jan. 15, 2021, all of which are incorporated herein by reference in their entireties.

BACKGROUND

Work equipment such as lifts and telehandlers sometimes require tracking, tasking, monitoring, and servicing at a work site. Managers and operators of work equipment typically rely on discrete systems, applications, and methods to perform these functions for each piece of equipment.

SUMMARY

One embodiment relates to a site connectivity system. The site connectivity system includes a deployable connectivity hub configured to be selectively deployed at a site. The deployable connectivity hub including a wireless hub connectivity module configured to facilitate wireless communications and a processing circuit. The processing circuit is configured to establish a local site network with a plurality of wireless machine connectivity modules including at least a first wireless machine connectivity module associated with a first machine at the site and a second wireless machine connectivity module associated with a second machine at the site, establish a connection with a remote server, receive data from the first wireless machine connectivity module regarding the first machine over the local site network, transmit the data to the second wireless machine connectivity module over the local site network, and transmit the data to the remote server over the connection.

Another embodiment relates a site connectivity system. The site connectivity system includes a first wireless machine connectivity module configured to be associated with a first machine, a second wireless machine connectivity module configured to be associated with a second machine, and a connectivity hub selectively deployable at a site. The connectivity hub is configured to establish a local site network with the first wireless machine connectivity module and the second wireless machine connectivity module, establish a connection with a remote server, receive data from the first wireless machine connectivity module regarding the first machine, transmit the data to the second wireless machine connectivity module over the local site network, and transmit the data to the remote server over the connection.

Still another embodiment relates to a site connectivity system. The site connectivity system includes a connectivity hub selectively deployable at a site. The connectivity hub is configured to establish a local site network with a first wireless machine connectivity module associated with a first machine, establish a connection with a remote server, receive data from the first wireless machine connectivity module regarding the first machine, and transmit the data to the remote server over the connection.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 11 is a picture representation of work machines configured for use in the local fleet connectivity system of FIG. 2, according to some embodiments.

DETAILED DESCRIPTION

Figure 1:
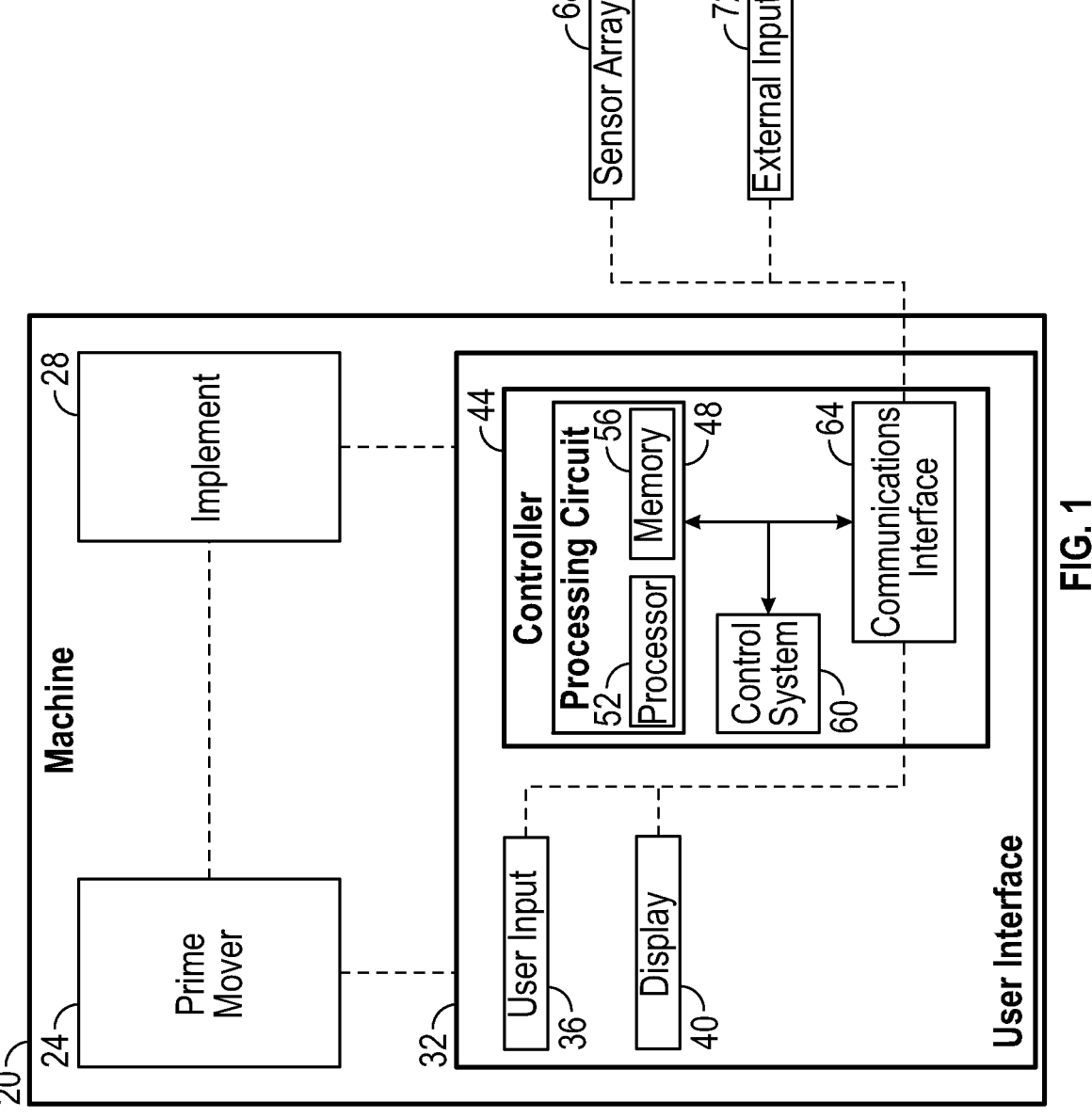
FIG. 1 is a schematic representation of a work machine including a machine control module, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Work equipment such as lifts and telehandlers sometimes require tracking, tasking, monitoring, and servicing at a work site. It is therefore desirable to provide a means to quickly and effectively connect work machines with wireless digital services to assist a user in identifying a particular machine and the state of the machine thereby saving time, improving efficiency, and reducing costs.

Referring to the figures generally, various exemplary embodiments disclosed herein relate to systems and methods for a local fleet connectivity system hub. For example, a local fleet connectivity system may include various network nodes. A local fleet connectivity system hub (i.e. a connectivity hub) may be a network node device that has a connectivity module to provide functions in place of or in addition to one or more work machines connected to the local fleet connectivity system. The local fleet connectivity system hub functions may include, for example, broadcasting a site identifier, connecting work machines to a local mesh network, and connecting the local mesh network to an external interne connection to flow through data to and from the work site that is provided across the local mesh network. The local fleet connectivity system hub functions may also include more active functions such as interpreting, analyzing, and storing input and generating an output.

Further referring generally to the figures, a connectivity hub may connect work machines at a work site to a local fleet connectivity system. In some examples, the connectivity hub may use Bluetooth Low Energy (BLE) Machine to Machine (M2M) communication protocols to expand communication at a worksite/jobsite via local connectivity between machines at the worksite/jobsite. In some embodiments, a local fleet connectivity system may include various work machines, interface modules, work site equipment, communications devices, communications networks, user interface devices, devices hosting local fleet connectivity system software, and user interfaces. Local fleet connectivity system users may include equipment users, equipment maintainers, equipment suppliers, worksite/jobsite supervisors, remote users, etc. The information provided to the equipment local fleet connectivity system may be communicated to users via a user interface. In some embodiments, the user interface may include a real time map, showing a current machine location, a machine status, etc. In some embodiments, the user interface includes a color coded warning indicator, an audible alarm, or another indicator structured to communicate to the machine operator that the work machine is in a location or state that requires the attention of the operator.

One exemplary embodiment of the present disclosure relates to a local fleet connectivity system connectivity hub. For example, a connectivity hub may include a connectively module. In some embodiments, the connectivity hub is configured to communicatively interconnect with one or more connectivity module equipped machines in proximity to the connectivity hub via a wireless self-forming network. In some embodiments, the connectivity hub is configured to broadcast a work site identification signal or site identifier. In some embodiments, the connectivity hub may connect work site machines connected to the local fleet network to an external data feed (e.g. an internet connection). In some examples, the connectivity hub may be configured as a gateway to one or more communications systems or network systems to enable exchanges of data between nodes (e.g. connectivity modules) on the work site local fleet connectivity mesh network and nodes external to the work site. In some embodiments, the connectivity hub comprises a processor and a database. In such embodiments, the connectivity hub may be configured to receive, analyze, and store data corresponding to a plurality of work machines disposed at a work site.

The local fleet connectivity system may include a network of a plurality of communicatively connected work machines. In some implementations, the network connections may be one or more of a low energy wireless data network, a mesh network, a satellite communications network, a cellular network, or a wireless data network. In some implementations, the network of work machines may be a self-forming network initiated by automatic exchange of networking messages between a different machines in the plurality of communicatively connected work machines. In some implementations, a network node is associated with each machine in the plurality of networked machines. In some implementations, a first machine extends a connection to a second machine in proximity to the first machine on a work site to establish a network link at the work site one. In some implementations, a work site network may be established among a fleet of work machines at the work site in which machines connect with other nearby machines and one or more connectivity hubs in a mesh network. In some implementations, network access is enabled according to one or more access indicators. In some implementations, access to machine-specific data for one or more machines connected to the network is provided according to the one or more access indicators. In some implementations, interconnectivity and productivity related data is exchanged via a connectivity modules. In some embodiments, the connectivity module may be communicatively connected to a machine controller. In some embodiments, the connectivity module may be a self-contained unit. In some embodiments, the controller may host one or more interconnectivity and productivity applications. In some embodiments, the one or more connectivity and productivity applications hosted by the plurality of controllers may be local instances of a remotely hosted master interconnectivity and productivity application.

The local fleet connectivity system may include one or more processing circuits comprising one or more memory devices coupled to one or more processors, the one or more memory devices configured to store instructions thereon that, when executed by the one or more processors, cause the one or more processors to: communicate across a wireless network by sending messages across nodes that are created by different machines and extend a connection with one nearby machine to a network of machines to connect to various machines across a work site. The local fleet connectivity system then automatically identifies equipment connected to the network of machines. In some embodiments, the local fleet connectivity system may be supported by an ad hoc machine to machine network. In some embodiments, the local fleet connectivity system may be supported by a self-organizing network on a work site. In some embodiments, the communications means between machines connected to the network of machines may comprise wired networking, short range radio frequency networking (e.g., Bluetooth, Bluetooth Low Energy, WiFi, VHF, or UHF), optical communications networking, or long range radio frequency networking (e.g. satellite communications). In some embodiments, the network of machines may be a mesh network. In some embodiments, access to machine-specific data from machines connected to the network of machines may be associated with one or more access indicators (e.g. a customer key, a manufacturer key, etc.). In some embodiments, the one or more indicators may be associated with a fleet of equipment. In some embodiments, machine specific data may be accessed via the network for a machine connected to the equipment self-forming network where the machine is associated with a specific code (e.g., customer key). In some instances, notifications related to work machine identity may be generated based on a code (e.g. a customer key, a manufacturer key). In some embodiments, machine specific data for a plurality of machines connected to the network of machines may be accessed via the network using a customer account. In some embodiments, machine specific data for all of the machines connected to the equipment self-forming network may be accessed via the network using a manufacturer account. In some embodiments, one or more messages may be generated in response to the state of a machine connected to the network of machines. In some embodiments, a change in the state of a machine connected to the network of machines may trigger the transmission of the one or more messages. In some instances, the one or more messages may be transmitted to a particular machine based on the indicator (e.g., customer key) associated with the machine. In some instances, the one or more messages transmitted to a particular machine based on the indicator (e.g., customer key) associated with the machine may be presented to a user via a user interface. In some embodiments, the one or more messages may comprise advertising, warnings, advisories, instructions, or reports. In some instances, the security of the network of machines is protected using the code (e.g., customer key) to restrict network access. In some instances, the confidentiality of data associated with machines connected to the local fleet connectivity system is protected using the indicator (e.g., customer key) to restrict network access. In some embodiments, the local fleet connectivity system automatically associates machines connected on a near network to one or more other machines. In some embodiments, the automatic associations are based on rules stored on a work machine or on another network node (e.g., a connectivity hub). In some embodiments, the association rules are based on one or more of a work site designation, a location of a machine, an access indicator (e.g., a customer key, a manufacturer key, or a maintainer key), etc. In some embodiments, assets (e.g., work machines) may automatically create or join a mesh network created by and among the assets themselves. In some instances, the mesh network corresponds to work site network. In some embodiments, a network identifier is automatically created upon creation of the work site network. In some embodiments, a user can designate or create the work site network. After joining the network, the machine may provide an indication that it is connected to the work site network. When the machine changes or enters a particular state or status (e.g., tow mode, transport mode, disconnection from a network, etc.), the machine may provide an indication that it has changed state or status (i.e. left the work site). In some embodiments, the local fleet connectivity system may identify work machines based on type, owners, or manufacturers. In some embodiments, the local fleet connectivity system may transmit data related to identity of a work machine to the cloud via the local fleet connectivity system for data processing or fleet management. In some embodiments, the local fleet connectivity system generates an integrated work site group user interface that identifies and provides data for all equipment associated with a work site.

As shown in FIG. 1, a work machine 20 (e.g., a telehandler, a boom lift, a scissor lift, etc.) includes a prime mover 24 (e.g., a spark ignition engine, a compression ignition engine, an electric motor, a generator set, a hybrid system, etc.) structured to supply power to the work machine 20, and an implement 28 driven by prime mover 24. In some embodiments, the implement 28 is a lift boom, a scissor lift, a telehandler arm, etc.

A user interface 32 is arranged in communication with the prime mover 24 and the implement 28 to control operations of the work machine 20 and includes a user input 36 that allows a machine operator to interact with the user interface 32, a display 40 for communicating to the machine operator (e.g., a display screen, a lamp or light, an audio device, a dial, or another display or output device), and a control module 44.

As the components of FIG. 1 are shown to be embodied in the work machine 20, the controller 44 may be structured as one or more electronic control units (ECU). The controller 44 may be separate from or included with at least one of an implement control unit, an exhaust after-treatment control unit, a powertrain control module, an engine control module, etc. In some embodiments, the control module 44 includes a processing circuit 48 having a processor 52 and a memory device 56, a control system 60, and a communications interface 64. Generally, the control module 44 is structured to receive inputs and generate outputs for or from a sensor array 68 and external inputs or outputs 72 (e.g. a load map, a machine-to-machine communication, a fleet management system, a user interface, a network, etc.) via the communications interface 64.

The control system 60 generates a range of inputs, outputs, and user interfaces. The inputs, outputs, and user interfaces may be related to a jobsite, a status of a piece of equipment, environmental conditions, equipment telematics, an equipment location, task instructions, sensor data, equipment consumables data (e.g. a fuel level, a condition of a battery), status, location, or sensor data from another connected piece of equipment, communications link availability and status, hazard information, positions of objects relative to a piece of equipment, device configuration data, part tracking data, text and graphic messages, weather alerts, equipment operation, maintenance, and service data, equipment beacon commands, tracking data, performance data, cost data, operating and idle time data, remote operation commands, reprogramming and reconfiguration data and commands, self-test commands and data, software as a service data and commands, advertising information, access control commands and data, onboard literature, machine software revision data, fleet management commands and data, logistics data, equipment inspection data including inspection of another piece of equipment using onboard sensors, prioritization of communication link use, predictive maintenance data, tagged consumable data, remote fault detection data, machine synchronization commands and data including cooperative operation of machines, equipment data bus information, operator notification data, work machine twinning displays, commands, and data, etc.

The sensor array 68 can include physical and virtual sensors for determining work machine states, work machine conditions, work machine locations, loads, and location devices. In some embodiments, the sensor array includes a GPS device, a LIDAR location device, inertial navigation, or other sensors structured to determine a position of the equipment 20 relative to locations, maps, other equipment, objects or other reference points.

In one configuration, the control system 60 is embodied as machine or computer-readable media that is executable by a processor, such as processor 52. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the control system 60 is embodied as hardware units, such as electronic control units. As such, the control system 60 may be embodied as one or more circuitry components including, but not limited to, processing circuitry, network interfaces, peripheral devices, input devices, output devices, sensors, etc. In some embodiments, the control system 60 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 60 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The control system 60 may also include programmable hardware devices such as field programmable gate arrays, programmable array logic, programmable logic devices or the like. The control system 60 may include one or more memory devices for storing instructions that are executable by the processor(s) of the control system 60. The one or more memory devices and processor(s) may have the same definition as provided below with respect to the memory device 56 and processor 52. In some hardware unit configurations, the control system 60 may be geographically dispersed throughout separate locations in the machine. Alternatively, and as shown, the control system 60 may be embodied in or within a single unit/housing, which is shown as the controller 44.

In the example shown, the control module 44 includes the processing circuit 48 having the processor 52 and the memory device 56. The processing circuit 48 may be structured or configured to execute or implement the instructions, commands, and/or control processes described herein with respect to control system 60. The depicted configuration represents the control system 60 as machine or computer-readable media. However, as mentioned above, this illustration is not meant to be limiting as the present disclosure contemplates other embodiments where the control system 60, or at least one circuit of the control system 60, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 52) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., control system 60 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 56 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 56 may be communicably connected to the processor 52 to provide computer code or instructions to the processor 52 for executing at least some of the processes described herein. Moreover, the memory device 56 may be or include tangible, non-transient volatile memory or non-volatile memory. Accordingly, the memory device 56 may include database components, object code components, script components, or any other type of information structure for supporting the various activities and information structures described herein.

In an exemplary embodiment, the memory device 56 stores instructions for execution by the processor 52 for a process to automatically generate a work site equipment grouping. The process to automatically generate a work site equipment grouping automatically associates machines 20 connected on a near network to one or more other machines 20. In some embodiments, the automatic associations are based on rules stored on a work machine or on another network node. In some embodiments, the association rules are based on one or more of a work site designation, a location of a machine, or a code (e.g. a customer key, a manufacturer key, or a maintainer key).

Figure 2:
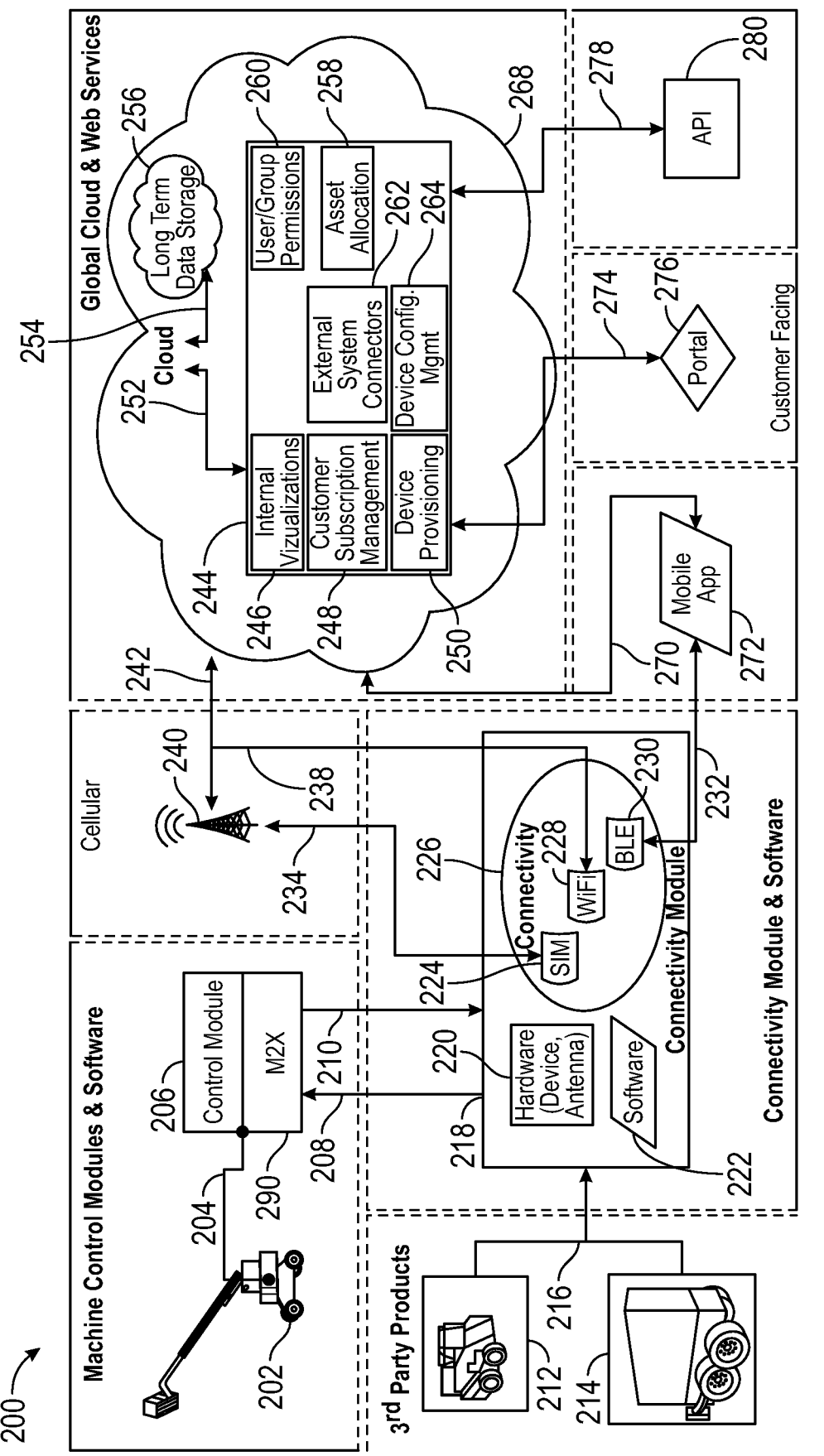
FIG. 2 is a schematic representation of a local fleet connectivity system, according to an exemplary embodiment.

As shown in FIG. 2, the system for local fleet connectivity system 200 is supported by a network of nodes. The network of nodes may include one or more work machines 202, each with a control module 206, one or more connectivity modules 218, and one or more network devices hosting, for example, user interfaces 272, network portals 276, application interfaces/application programming interfaces 280, data storage systems 256, cloud and web services, and product development tool and application hubs 244.

The work machine 202 is communicably connected to a control module 206 via connection 204. The connection 204 between the work machine 202 and the control module 206 may be wired or wireless thus providing the flexibility to integrate the control module with the work machine 202 or to temporarily attach the control module 206 to the work machine 202. The control module 206 may be configured or may be reconfigurable in both hardware and software to interface with a variety of work machines 202, 212, 214 via the connectivity module 218. The control module 206 may comprise an integral power source or may draw power from the work machine 202 or another external source of power. Control modules 206 may be installed on or connected, e.g., via the connection 216, to products (e.g. third party products) 212, 214 not configured by the original product manufacturer of a control module 206.

The work machine 202 communicably connects to the local fleet connectivity system 200 via a machine-to-X (M2X) module 290. The M2X module 290 is communicably connected to the control module 206. The M2X module 290 establishes one or more communications channels 208, 210 with a connectivity module 218. The connectivity module 218 provides a plurality of links between one or more work machines 202, 212, 214 and the local fleet connectivity system 200. Applications providing functions for the local fleet connectivity system 200 may be run by the M2X modules on one or more work machines 202 to exchange commands, codes (e.g. a customer key), and data between work machines 202, 212, 214, and user devices 272 to form a network of interconnections among machines, devices, or nodes. Connections between machines and user devices in the local fleet connectivity system 200 may, for example, be provided by a wireless mesh network.

The connectivity module 218 comprises hardware 220, further comprising antennas, switching circuits, filters, amplifiers, mixers, and other signal processing devices for a plurality of wavelengths, frequencies, etc., software hosted on a non-volatile memory components 222, and a communications manager 226. The communications manager 226 may comprise processing circuits with communications front ends 224, 228, and 230 for one or more signal formats and waveforms including, for example, Bluetooth, Bluetooth low energy, WiFi, cellular, optical, and satellite communications. The connectivity module 218 may function as a gateway device connecting work machine 202 to other work machines 212, 214, remote networks 244, 272, 276, and 280, beacons, scheduling or other fleet management and coordination systems.

The local fleet connectivity system 200 allows for the coordination of multiple machines 202, 212, 214 within the same work site, or a fleet wide control. For example, a work machine 202 may remotely report the results of a self-inspection to a user via a user device including user interface 272.

The local fleet connectivity system 200 provides connectivity between work machines 202, 212, 214 and remotely hosted user interfaces 272, network portals 276, application interfaces/application programming interfaces 280, data storage systems 256, cloud and web services 268, and product development tool and application hubs 244 that function as an Internet of Things (IoT) system for operation, control, and support of work machines 202, 212, 214 and users of work machines. Connections 232, 234, 238, 242, 252, 254, 270, 274, and 278 between nodes connected to the local fleet connectivity system 200 may comprise, for example, cellular networks (e.g., via cell towers 240), or other existing or new means of digital connectivity.

Product development tool and application hubs 244 may comprise tools and applications for internal visualizations 246, customer subscription management 248, device provisioning 250, external systems connectors 262, device configuration management 264, user/group permissions 260, asset allocation 262, fleet management, compliance, etc.

Figure 3:
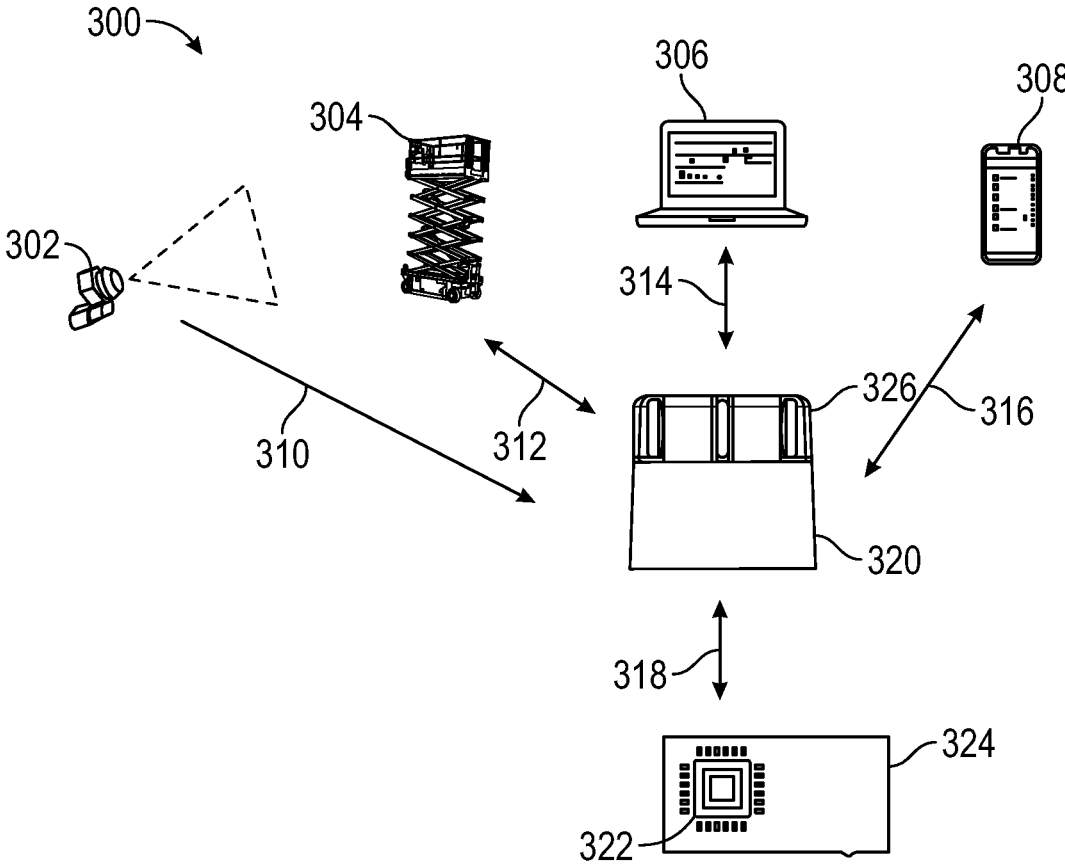
FIG. 3 is a schematic representation of a local fleet connectivity system with a central integration module, according to an exemplary embodiment.

FIG. 3 shows a local fleet connectivity system 300 according to an exemplary embodiment. As shown in FIG. 3, the M2X module 320 is communicably connected to a machine controller that functions as a communications interface between the control system 322 of the work machine 324 and other elements connected to the local fleet connectivity system 300. The M2X module 320 may be part of the work machine 324 or may be physically coupled to the work machine 324. The M2X module 320 may exchange sensor data 310 with auxiliary sensors 302, machine data with another machine 304, sensor data with another machine 304, commands and data 314 with a node or portal 306, and commands and data 316 with a user device 308 running an application for the local fleet connectivity system 300.

In some embodiments, the M2X module 320 comprises a machine state visual indicator 326. The machine state visual indicator 326 provides a signal to an observer. The signal indicates a state or condition of the machine (e.g. power on, power off, in operation, fuel level, electrical system state of charge, DTC, maintenance required). The machine state visual indicator 326 may be configured, for example, to indicate a mode of the local fleet connectivity 300. In other examples, the machine state visual indicator 326 is an indicator module connected to the M2X module 320. In still other examples, the machine state visual indicator 326 may be a machine component or a separate device attached to the machine (e.g. a vehicle external light, a vehicle internal light, a beacon, etc.). The machine state visual indicator may be a light (e.g. an incandescent light, a light emitting diode, a fixed beacon, a flashing beacon, a rotating beacon, a laser, a light array, etc.), a display device, a marker, etc. In some examples, the machine state visual indicator 326 may incorporate an audible indicator of a machine state.

The machine state visual indicator 326 is configured to generate a variety of visual signals. In some examples, the variety of visual signals comprises one or more colors, patterns, and combinations of colors and patterns. In some examples, the machine state visual indicator is configured to generate visual signals observable as a light or one or more light patterns. In some examples, the light patterns generated by the machine state visual indicator 326 can be varied in any optical characteristic (e.g. color, wavelength, intensity, pulse duration, direction, etc.).

Visual signals generated by the machine state visual indicator 326 show various states, conditions, and criteria of the machine. The visual signals may indicate, for example, one or more machines on a work site that have sufficient fuel levels to perform a task. In other examples, the visual signals generated by the machine state visual indicator 326 illustrate predefined or user configurable machine states for the local identification of that state. For example, a scissor lift machine 304 can flash a beacon light indicating that it requires a charge. In some embodiments, the visual signal may be initiated in response to a local user command 316 entered by a user at a user device 308, a remote user command, a machine to machine command, a condition or state detected by a machine onboard sensor, or a controller 322 logic determination.

In some embodiments, machine onboard sensors detect a state or condition of the machine 324. The machine controller 322 determines a command 318 and transmits the command 318 to the M2X module 320 or directly to the machine state visual indicator 326 to display one or more visual signals. In some embodiments, the machine state visual indicator 326 illuminates a colored light signal corresponding to a machine state or condition. For example, a work site supervisor may select green to indicate a fuel level above ¾ of capacity, yellow to indicate a fuel level between ¾ and ¼, and red to indicate a fuel level below ¼. In another example a service technician may transmit a wireless command to all machines on a work site to flash a red light if the machine controller detects a battery charge below a user specified level.

In some embodiments, a machine state visual indicator application hosted on a user device 308 presents a user interface to a user. The user interface receives user selections of a criterion for a machine state and a visual signal corresponding to the criterion. For example, a user selects state of charge as a criterion for electric powered scissor lift machines 304 on a work site and one or more state visual indicator signals (e.g. a colored light) corresponding to one or more state of charge conditions. The user inputs are transmitted to machines 304, 324 via a network. User inputs received at the M2X module 320 generate one or more commands to the machine visual state indicator 326. Each machine state visual indicator 326 for the machines at the work site then respond to the user input by displaying light beacon with a color representing a status of that machine for the selected criterion (e.g., Machines with good charges show green lights, machines requiring a recharge show yellow lights, and machines requiring battery replacement show red lights.).

The machine status visual indicator 326 is configurable to function when machine power is off. For example, the machine status visual indicator 326 may receive user inputs via a Bluetooth low energy (BLE) signal received at the M2X module 320. The BLE communications path can be configured to remain always active with power input from a machine power source (e.g. a battery). In some examples, the BLE communications channel in the M2X module remains open and the machine state visual indicator 326 is available to display a visual signal in response to a user input in a power saving mode (e.g. modified receiver duty cycles, reduced communications/BLE intervals, lower power operation of the machine state visual indicator beacon).

In some embodiments, the local fleet connectivity system 300 may support commercial services. In some embodiments the local fleet connectivity system 300 includes one or more applications hosted on one or more processors. Host processors may comprise a machine controller 322, an M2X module controller, and a user device controller. In some examples, commercial services supported by the local fleet connectivity system 300 may comprise advertising, user preference identification, point of sale, third-party messaging, etc. In some examples, an application hosted on one or more of a machine controller and a user device may generate user interfaces for commercial services. In some examples, the application may generate one or more of audio, visual, and tactile signals to convey messages associated with commercial services. In some examples, the application may be configured to display recommended purchases to the user based on the state or condition of the machine connected to the local fleet connectivity system or a parameter associated with a user of the equipment identity system. In some examples, the application may provide point of sale services (e.g. order entry, payment acceptance, order tracking, etc.).

Further referring to FIG. 3, in some embodiments, the local fleet connectivity system 300 application may comprise electronic commerce functions. In some examples, electronic commerce functions are accessed through a tab or page within the application, a click-through popup within the application, a scrolling banner within the application, a push notification, etc. In some examples, the electronic commerce functions provided through the local fleet connectivity system 300 may be managed by an electronic commerce application hosted on a controller installed in a machine 304, 324 or a user device 308. Electronic commerce functions provided through the local fleet connectivity system 300 may comprise, for example, original equipment manufacturer advertising (e.g. service kits, equipment consumables, replacement parts based on a status or condition of a machine). In some examples, electronic commerce messages are transmitted via the local fleet connectivity system 300. Electronic commerce messages may comprise, for example, messages based on a specific machine or machines being accessed, a profile or a nature of a person accessing the specific machine or machines, weather or local conditions around the machine or machines, conditions or states associated with the machine (e.g., engine hours, fault codes, etc.), location of the machine, location of the work site, proximity of a vendor to a work site, etc. In some examples, the application is a point of sale portal for purchasing items or services identified in electronic commerce messages. For example, an original equipment manufacturer (OEM) may determine a work machine component requires replacement based on the condition of the component as detected by a sensor on the work machine and reported to the OEM via the local fleet connectivity system 300. The OEM may locate the nearest replacement part, determine a price and delivery time for the part and generate a push message to a user on a user device at a work site identifying the need to replace the component, the price and arrival time for the replacement component, a purchase incentive for ordering the component through the application, process the order through the user device, and provide post sale services (e.g. delivery status, installation instructions, warranty support) through the application.

In some examples, the electronic commerce functions supported through the applications may include third party advertising and point of sale. For example, the electronic commerce application may provide notifications to equipment users from a restaurant in proximity to a work site based on one or more parameters collected by the application. Parameters collected by the application may comprise, for example, a number of users present at a work site, a time of day, a purchase incentive from a vendor, user preferences, etc. The application may, for example, capture a record of sales conversions in response to application electronic commerce messaging as a basis for revenue calculation for a sales channel supported by the electronic commerce functions enabled by the local fleet connectivity system 300.

Further referring to FIG. 3, in some embodiments, the machine controller 322 is configured to receive data from a first pressure sensor on the machine. The machine controller 322 determines a vertical location component for a machine position. In some examples, the machine controller 322 is configured to determine the position of the machine 324 with respect to a floorplan of a work site (e.g. the position of the machine is identified with a floor of a structure in which the machine is located). In some examples, the machine controller 322 determines the position of a machine on a network (e.g. a mesh network) with respect to a mobile user device 308 or another machine 304. In some examples, the machine controller 322 receives pressure sensor data from a second sensor at a load (platform/forks/etc.) relative pressure difference between chassis and can be used for elevation verification or calculation as well.

Further referring to FIG. 3, in some embodiments, a controller 322 is configured to determine a relative height differential between a first pressure sensor and a second pressure sensor. The first pressure sensor measures a first pressure measurement at a first location and the second pressure sensor measures a second pressure at a second location. In some examples, the first pressure sensor is provided on a first machine 324 and communicatively connected to the controller 322. In some examples, the second pressure sensor is an off board (i.e. not located on the first machine) sensor. The second pressure sensor may be provided, for example, on a user device 308 (e.g., a phone), a second machine 304, a load, an implement, a work site connectivity hub device, etc. In some examples, the second pressure measurement at the second pressure sensor may be transmitted to the controller 322 of the first machine 324 via a direct local connection 312, 316 (e.g. a BLE connection, a WiFi connection, etc.). In some examples, the second pressure measurement is transmitted by the second sensor to the controller 322 via a network connection 314. In some examples, the controller 322 may determine the local relative height differential between the first pressure and the second pressure sensor. The controller may, for example, transmit the relative local height differential to other machines connected to a local network via the M2X module. In some examples, the relative pressure difference between a first pressure sensor attached to a chassis of the machine 322 and a second pressure sensor attached to an implement or located at a load (e.g. a platform, a set of forks of a forklift, etc.) may transmit a first pressure measurement and a second pressure measurement to the controller 322. In some examples, the controller 322 may use the first pressure measurement and the second pressure measurement to calculate or verify a height of the implement or the load. The controller may, for example, use the calculated or verified height of the implement or the load as a safety check within a height safety application supported by the work site network.

In some examples, a machine 324 may be configured with a first pressure sensor on the base of the machine and a second pressure sensor on the platform of the machine. The controller 322 may receive a first pressure measurement from the first pressure sensor and a second pressure measurement from the second sensor. The controller 322 may dynamically determine an operational height of the platform of the machine based on the difference between the first pressure measurement and the second pressure measurement. The operational height of the platform may be transmitted, for example, to other machines 304 connected to the local network 312, to a remote processor 306 via a network connection 314, to a work site connectivity hub device. In some examples, the operational height of the platform may be provided for external consumption by other devices connected to the network or used as part of the machine's 324 local controls.

In some embodiments, the controller 322 is communicatively connected to a light attached to a work machine. The light may be a work machine light (e.g. a headlight) or a beacon light 326 attached to the machine. In some embodiments, the light is configured to emit light in one or more colors, intensities, patterns, etc. In some embodiments, the controller 322 illuminates the light responsive to a command from a remote user device communicatively connected to the connectivity module via a wireless connection. In some embodiments, the user device transmits the command to illuminate the work machine light responsive to user interaction with a local fleet connectivity system 300 application hosted on the user device. In some embodiments, the controller 322 illuminates the light and activates an audible indicator responsive to the command from the remote user device. In some embodiments, visual and audible indicators may be used in conjunction or independently of one another. In some embodiments, a plurality of controllers 322 illuminate the lights attached to a plurality of work machines responsive to a command from a remote user device communicatively connected to the plurality of controllers 322 via a wireless connection. In some embodiments, the plurality of lights attached to the plurality of work machines are illuminated simultaneously in response to a single command from the remote user device. In some embodiments, the local fleet connectivity system 300 generates commands to a plurality of work machines designated by a user interacting with the local fleet connectivity system 300 application hosted on a user device to activate lights or audible indicators and electronically pair a work machine selected by a user from the plurality of work machines with a digital model of the selected work machine generated by the local fleet connectivity system 300 application on the user device. For example, a user may observe a group of work machines at a work site. The user may command a subset of the group of work machines to activate lights on or attached to the work machines using an application on a user device (e.g. a "find me" application). The user may, through the user application, designate the subset of work machines to be identified based on criteria selected through the application. Through the application and user device connected to work machines on the local fleet connectivity network, the user may activate lights, horns or other indicators on several different work machines and may select variations on lights (e.g. different colors, different patterns, different intensities, etc.) to distinguish between machines and quickly identify the desired machine or group of machines (e.g. "find me" commands to multiple machines at the same time). The application provides options for a user to identify a machine physically (through observation of the light or a horn) and tie the identified machine to the digital model of the same machine generated by the application on the user device. For example, a user may tie a selected machine or group of machines identified physically by the user using the "find me" indications with a digital record for the machine (including serial number, service records), and access connected services for the machine available through the local fleet connectivity system 300 (e.g. location, electronic commerce, use tracking, billing, maintenance support, etc.). In a further example, a user may apply additional criteria to machine identification commands. For example, a user input to the application criteria for machine states or conditions (e.g. fully charged, at least ½ fuel, no outstanding service issues, no faults detected on self-test, etc.), machine type (e.g. specific make, specific model, etc.), machine location (e.g. proximity to the user, proximity to a task, positioned for easiest movement out of a staging area, etc.) The provisions within the local fleet connectivity application and network for physically identifying machines and tying them to matching digital models including full digital machine records provides significant savings of time searching machines and manually confirming records (e.g. machine serial numbers). In a further example, a user may simultaneously communicate with a plurality of machines (e.g. directly using a mesh, WiFi, or other local connection or remotely via a cloud network connection) that satisfy one or more selected criteria (e.g. machines that are the same model) and command them via the local fleet connectivity system 300 application to separately identify themselves (e.g., with different color lights). The user may then select the "green machine" indicated via the application user interface, the machine may flash its lights to indicate "this one" and the user can then tap an indicator in the application to verify machine selection and electronically pair a user device with that machine. The user may then access or enter information for selected machines and share the information with other devices connected to the local fleet connectivity system through the application.

In some embodiments, the connectivity module is configured with integrated telematics, machine identification, machine positioning, local communication, remote communications and components. In some embodiments, the connectivity module may be configured with a telematics control unit, a multi-function light beacon, one or more multi-channel communication modems, one or more antennas, one or more power sources, one or more positioning systems, one or more local fleet connectivity processors, one or more interface blocks, one or more machine connectivity provisions, and one or more memory devices. In some embodiments, the connectivity module is configured to selectively enable and disable components of the connectivity module and a machine to which the connectivity module is communicatively connected. For example, the connectivity module may be configured as an integrated connectivity device provisioned with all components required to connect a work machine that is not provisioned with networking equipment to a local fleet connectivity system. The connectivity module configured as an integrated connectivity device may include, for example, a telematics control unit specific componentry included (e.g. multi-color beacon, GPS/GNSS, communications modem, antenna, controller, memory device, interface blocks, housing, etc.) and be affixable to a work machine using temporary or permanent physical, electrical, or electronic connections. The connectivity module connected to the work machine may be configured to selectively enable, activate, disable, and deactivate components of the connectivity module and the work machine to which it is connected. For example, a connectivity module with an integral beacon connected to a work machine equipped with headlights may enable and activate the work machine headlights and disable the integral beacon in response to a "find me" command received by the connectivity module from the local fleet connectivity network. The connectivity module is configured, in some embodiments, to determine what components are integral to the module and what components are machine equipment in response to a command such that only the components necessary to respond to the command are activated and no individual components are activated in conflict with the components activated in concert In some embodiments, the connectivity module may be configured to determine a machine state or condition (e.g. state of charge), receive and process data from sensors (e.g. determine machine position or motion based on satellite positioning or inertial measurement unit outputs), receive and store data and software (e.g. use memory for over-the-air (OTA) software updates for the connectivity module and the machine as a whole, use memory to store onboard manuals, use memory to store advertising files, etc.).

In some embodiments, the connectivity module is configured as an integrated device incorporating in one unit components to provide all required local fleet connectivity system functions at the work machine level (e.g., GPS sensor, GPS antenna, Bluetooth transmitter, Bluetooth antenna, WiFi module, WiFi antenna, cellular data transmitter, cellular data antenna, pressure transducer, light sensor, accelerometer/inertial measurement unit, memory storage, processor, multiple colored LEDs, etc.).

In some embodiments, the local fleet connectivity system 300 supports ad hoc, self-forming networks based on an association between a user key and item of equipment (e.g. a local fleet connectivity network). The local fleet connectivity system 300 may include various controller, processor, connectivity, and memory devices to support fleet connectivity and fleet management functions and applications. For example, a local fleet connectivity system memory device may store machine specific technical literature on a module connected to a work machine and provide users a way to access information. In another example, a local fleet connectivity processor device may present machine groupings (site networks) to end users in OLE (e.g. a view in a local fleet connectivity system user interface). In a further example, a local fleet connectivity device may allow a user to light a light and/or sound a horn on a machine selected in a mobile application (e.g. a "find me," "find it," or "machine identify" application) to identify the machine on a work site. In another example, a local fleet connectivity processor may generate a user interface on a mobile application hosted on a user device to allow user to use the light on a machine (e.g. a headlight, a beacon, a connectivity module integrated beacon, etc.) to indicate a machine status (SOC, Fuel Level, DTC, etc.). In another example, a local fleet connectivity processor may generate a user interface on a mobile application hosted on a user device to allow user to light the light for the 6 machines nearest the user in different colors in order to determine which machine is which.

The local fleet connectivity system 300 further allows for the coordination of multiple machines 304, 324 within the same work site, or a fleet wide control. For example, if a first work machine 324 is required to accomplish a task collaboratively with a second work machine 304, a user interacting with a user device 308 may provide commands to the first work machine 324 and second work machine 304 to execute the task in collaboration.

Figure 4:
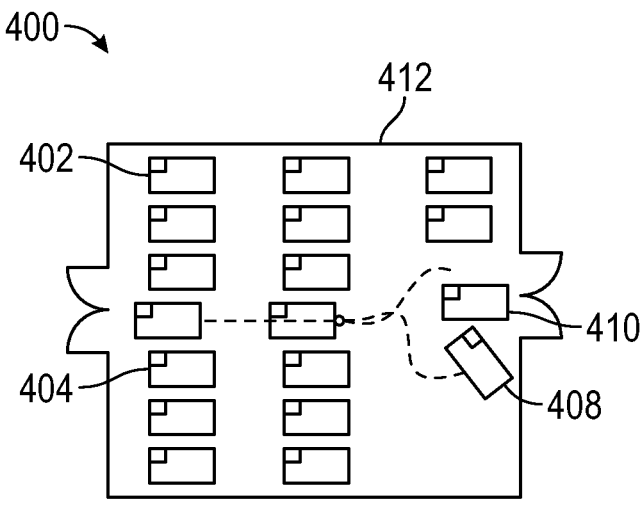
FIG. 4 is a schematic representation of a work site and equipment staging area with a local fleet connectivity system deployed, according to an exemplary embodiment.

Referring now to FIG. 4, a fleet connectivity system 400 is shown, according to an exemplary embodiment. As discussed above, the fleet connectivity system 400 may be deployed at a work site 412 to control a fleet of work machines 402, 404, 408, 410, so as to collaboratively perform tasks requiring more than one work machine 408, 410. For example, a user may wish to move the work machine 410 from its stored position on the left of the work site 412 out the door on the right of the work site. Components of the fleet connectivity system 400 (e.g., a network access point, a system access point, a connectivity hub, work machines having a connectivity module, etc.) may communicate with both the work machine 408 and the work machine 410, causing the work machine 408 to move out of the way of the work machine 410, so that the work machine 410 can move past the work machine 408 and out the doorway.

Figure 5:
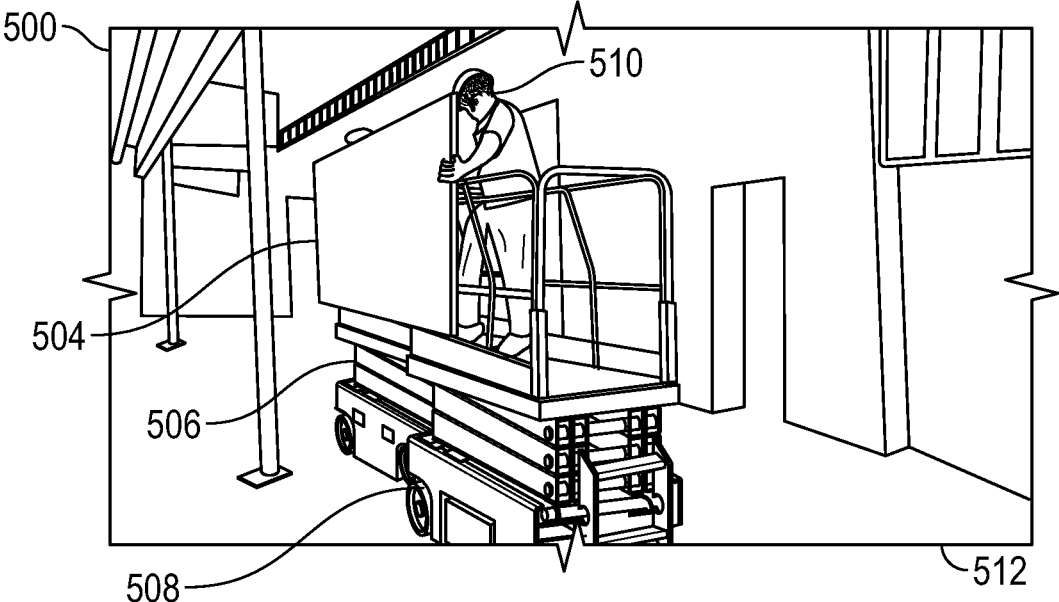
FIG. 5 is a picture representation of a work site with a local fleet connectivity system connecting two pieces of equipment, according to an exemplary embodiment.

Referring now to FIG. 5, a fleet connectivity system 500 is shown, according to an exemplary embodiment. As discussed above, the fleet connectivity system 500 may be communicably coupled to a plurality of work machines 506, 508 (e.g., via a plurality of connectivity modules), such that the work machines 506, 508 may collaboratively perform tasks on a jobsite 512. For example, as shown in FIG. 5 the fleet connectivity system 500 may be used to replace a section of drywall 504 that is too large to be handled by a single work machine 508. Components of the fleet connectivity system 500 (e.g., a network access point, a system access point, a connectivity hub, etc.) may communicate with both the work machine 506 and the work machine 508, and cause them to move at the same speed and in the same direction so that a user 510 on each work machine 506, 508 may hold the drywall 504 while the work machines 506, 508 are moving. In this regard, communication between components of the fleet connectivity system and the work machines 506, 508 may prevent the work machines 506, 508 from being separated so that the users 510 do not drop the drywall 504.

Figure 6:
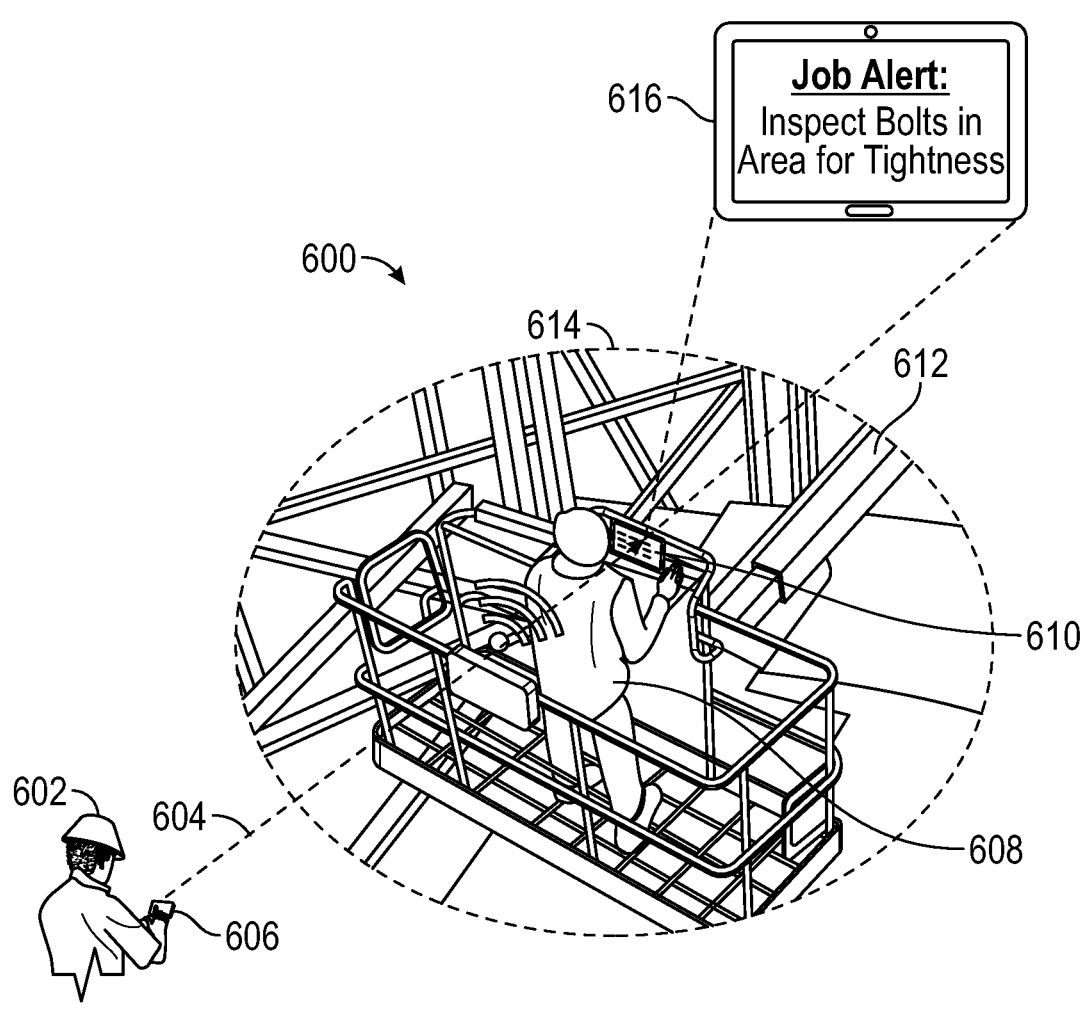
FIG. 6 is a picture representation of a piece of equipment with a local fleet connectivity system providing connectivity to a remote user, according to an exemplary embodiment.

As shown in FIG. 6, a remote user 602 of a local fleet connectivity system 600 can send messages and data 604 from a remote device 606 to an onsite user 608 on a jobsite 614. The messages and data 604 may be received by the control system 610 of a work machine 612 via a connectivity module and displayed via a user interface on an onboard display 616. The remote user 608 may send work instructions to the onsite user 608, informing the onsite user 608 of talks to be performed using the work machine 612. For example, as shown in FIG. 6, the remote user 602 may send instructions to the onsite user 608 to use the work machine 612 to inspect bolt tightness in the area. The instructions may displayed for the onsite user 608 on the onboard display 616. This allows the onsite user 608 to receive and view the instructions without the need to call the remote user 602 or write the instructions down. Because the work machine 612 is connected to the remote device 606 (e.g., via a connectivity module 218) the remote user 602 may receive the location of the work machine 612, as well as other work machines on the jobsite 614, and may use the location information to determine the instructions to send.

As shown in FIGS. 6-11, the local fleet connectivity system and methods described above may be implemented using various work machines 20 such as an articulating boom lift 1102 as shown in FIG. 11, a telescoping boom lift 1104 as shown in FIG. 11, a compact crawler boom lift 1106 as shown in FIG. 11, a telehandler 1108 as shown in FIG. 11, a scissor lift 506, 508, and 1110 as shown in FIGS. 5 and 11, and/or a toucan mast boom lift 1112 as shown in FIG. 11.

Figure 7:
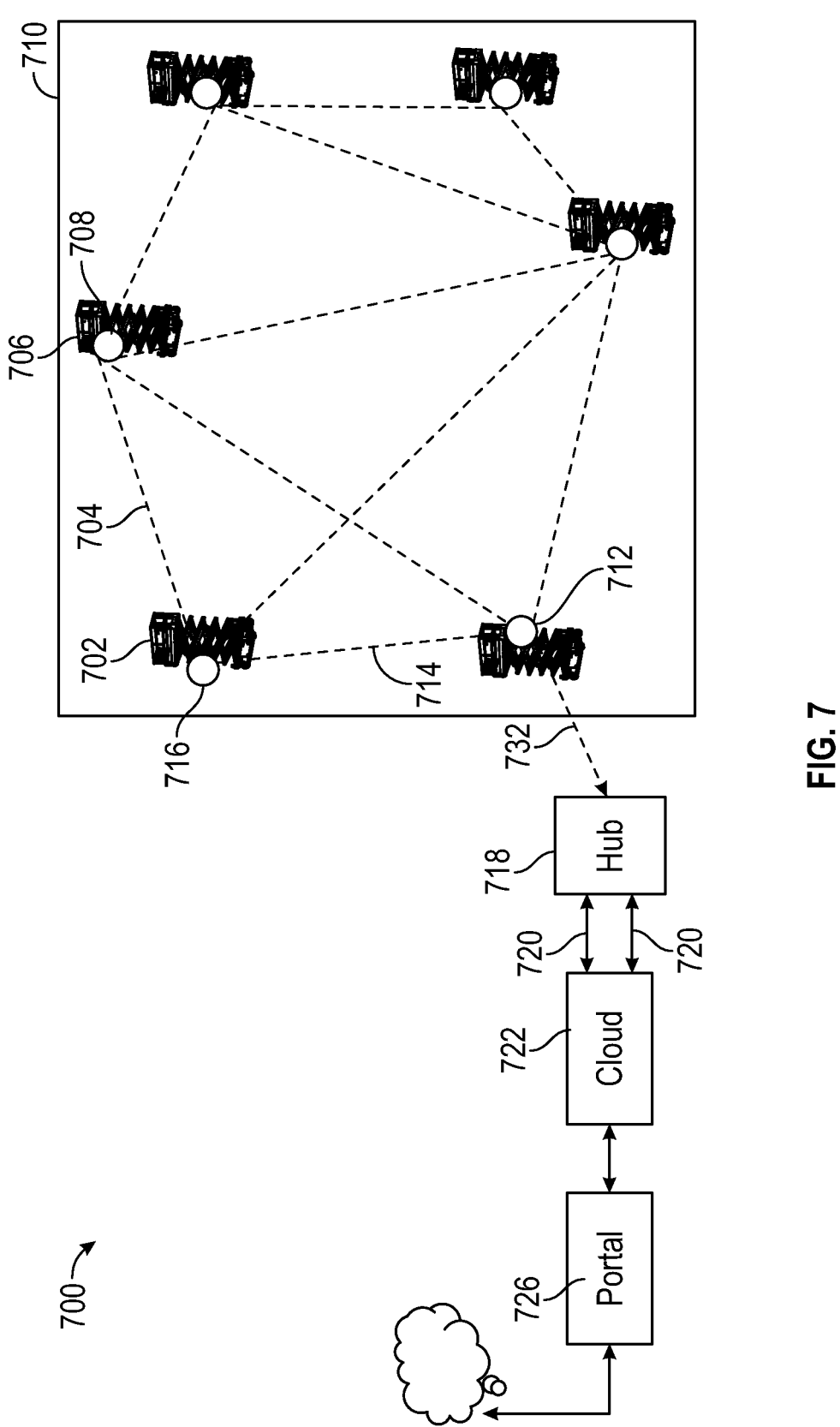
FIG. 7 is a schematic representation of a work site with a local fleet connectivity system deployed with connectivity to off-site systems, according to an exemplary embodiment.

As shown in FIG. 7, a local fleet connectivity system 700 includes a connectivity hub 718, according to an exemplary embodiment. In some embodiments, the connectivity hub 718 includes a connectivity module 218. In some embodiments, the connectivity hub 718 is configured as a gateway between one or more communications systems or network systems to enable exchanges of data 720 between nodes 708, 712, 716 on a work site 710 local fleet connectivity mesh network 704, 714, 732 and nodes 722, 726 external to the work site. In some embodiments, the connectivity hub 718 is configured to communicatively connect with one or machines 702, 706 in proximity to the connectivity hub 718. In some embodiments, the connectivity hub 718 is configured to provide the functionalities described herein in place of, or in addition to, a machine that has a connectivity module. In some embodiments, the connectivity hub 718 is configured to broadcast a work site identification signal. In some embodiments, the connectivity hub 718 is configured to connect work site machines 702, 706 connected to the local fleet network to an external internet feed 720. In some embodiments, the connectivity hub 718 is configured to connect to an external internet to flow data to and from a jobsite that is provided across a mesh.

In some embodiments, the connectivity hub 718 comprises at least one processor. The connectivity hub 718 may also include at least one database. The database may be configured to store various applications and data corresponding to the local fleet connectivity system 700. The processor may be configured to receive input (e.g., commands, data, programming, etc.), interpret, analyze, and manipulate the input, and generate outputs. For example, the connectivity hub 718 may receive input indicating where the work site it is located. The input may comprises a unique site identifier. For example, the work site may be identified as Work Site A. Based on the input comprising the site identifier, the connectivity hub 718 may be configured to broadcast the site identifier to nodes (e.g., work machines, user devices, etc.) disposed at the work site. The nodes can receive and interpret the broadcast and determine that the nodes are at that specific site. The broadcast can be a single event, it can be a continuous signal emitted by the connectivity hub 718, or it can be an intermittent signal emitted at specified intervals or times. For example, if the broadcast is a continuous signal, any node (e.g., work machine) delivered to the work site may identify the broadcast and determine which work site it is at. In another example, when the broadcast is only emitted at specified times, the times may be dictated by the occurrence of an event. For example, upon detection of an arrival of a new work machine, the connectivity hub 718 may broadcast the site identifier so the machine can determine the site it is at.

In another embodiment, the connectivity hub 718 may be configured to receive an input comprising a command. The command may comprise a task to be completed by a work machine. Based on the command, the connectivity hub 718 may be configured to assign at least one of a plurality of machines to perform the task. For example, the connectivity hub 718 may be configured to receive a command from a remote server. The connectivity hub 718 may be communicably coupled with a local fleet connectivity system 700 comprising a plurality of machines 702, 706. The connectivity hub 718 may assign one of the plurality of machines 702, 706 the task. In some embodiments, to assign the task to one of the plurality of machines 702, 706, the connectivity hub 718 may be configured to determine a subset of a plurality of machines that are capable of performing the task. The connectivity hub 718 may then be configured to select a preferred machine from the subset of the plurality of machines. To determine the subset, the connectivity hub 718 may be configured to analyze various data corresponding to the plurality of machines 702, 706. For example, the connectivity hub 718 may obtain data from the plurality of machines 702, 706 regarding type of equipment (e.g., boom lift, scissor lift, etc.), battery level, availability (e.g., not already assigned a different task), self-inspection data, etc. In some embodiments, responsive to the command, the connectivity hub 718 may activate a self-inspection test for each, of a subset of the plurality of machines 702, 706. A result of the self-inspection test may include a score indicating the status of the machine. The result may include a plurality of scores associated with different components or systems of the machine. In some embodiments, some of the data may already be stored in a database of the connectivity hub 718 and not have to be obtained from the machine itself. For example, the database may comprise information regarding all the types of machines disposed on the site. The database may comprise information regarding tasks already assigned to the machines, indicating which machines are available.

With the data associated with the plurality of machines 702, 706, the connectivity hub 718 may be configured to select the preferred machine. To select the preferred machine, the connectivity hub 718 may be configured to apply predetermined criteria. For example, input provided by a user may indicate to select the preferred machine based on task location (e.g., select a machine closest to the task location), battery power (e.g., select a machine with the most battery power), highest reliability (e.g., select a machine with the fewest recorded malfunctions), highest self-inspection score (e.g., select a machine with the highest self-inspection score), etc.

In another embodiment, the connectivity hub 718 may be configured to receive an input comprising a request. The request may be from a user of a remote server. The request may be to obtain machine-specific data corresponding to a plurality of machines connected with the local fleet connectivity system 700. In some embodiments, the request may include an access identifier. The access identifier may be any input configured to identify the user. For example, a user name, a password, a customer number, an account number, etc. The access identifier may be used to determine what machine-specific data the user has access too. For example, the user may only be authorized to access machine-specific data associated with a subset of the plurality of machines. In another embodiment, the user may only be authorized to access a portion of the machine-specific data associated with the plurality of machines. For example, a customer user may only have authorization to access current operational statuses and conditions of a machine. A manufacturer may have authorization to access current and historical operational statuses and conditions of the machine. The connectivity hub 718 may be configured to determine the machine-specific data the user is authorized to access based on the access identifier. The connectivity hub 718 may be configured to receive the machine-specific data the user is authorized to access from the plurality of machines, or a subset thereof. The connectivity hub 718 may be configured to transmit the machine-specific data the user is authorized to access to the user of the remote server.

In another embodiment, the access identifier may also be used to determine what functions of the machine connectivity application the user has access to. For example, a customer may be provided with control functionality (e.g., ability to use and control the machines, etc.) and status visibility (e.g., ability to view the current statuses of the machines, etc.). A technician may be provided with a more detailed status visibility (e.g., specific parts that need to be repaired, etc.) and access to retailer databases corresponding to the parts needed to be repaired (e.g., ability to easily order new parts through the application). The functions of the machine connectivity application and the machine-specific data accessible by a user may be customized for each user.

Figure 8:
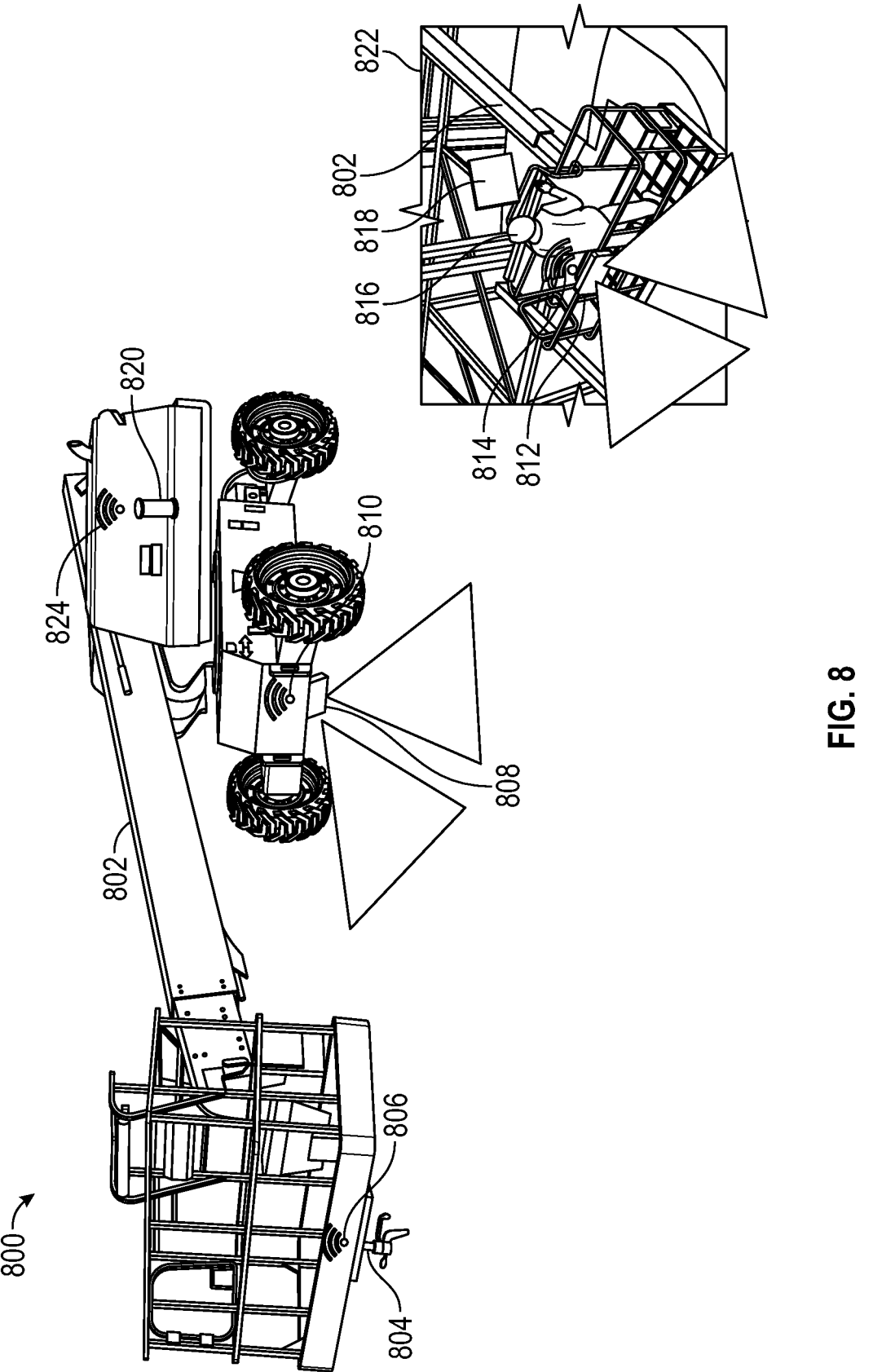
FIG. 8 is a picture representation of an apparatus configured with a local fleet connectivity system, according to an exemplary embodiment.

Referring to FIG. 8, a local fleet connectivity system 800 is shown, according to an exemplary embodiment. Sensors 804, 808, 812, 820 may be coupled to a work machine 802 on a jobsite 822. The sensors 804, 808, 812, 820 may be, for example, object detection sensors, environmental sensors (e.g., wind speed, temperature sensors), and tagged consumable sensors. The sensors 804, 808, 812, 820 may be connected to and may send data via the local fleet connectivity system 800 via wireless connections 806, 810, 814, 24. The sensor data may be displayed or may be used to generate messages for display on an onboard display 818 for a user 816 of the work machine 802. The onboard display 818 may receive the sensor data via a direct wired or wireless connection to the sensors. Alternatively the sensors may communicate with the onboard display through the local fleet connectivity system 800 (e.g., via a connectivity module 218). Sensor data from various work machines may be combined to map the jobsite 822 and to determine if environmental conditions are safe for using the work machines. Sensor data from the tagged consumable sensors 820 may be used to determine, for example, when tagged consumables must be replaced.

Figure 9:
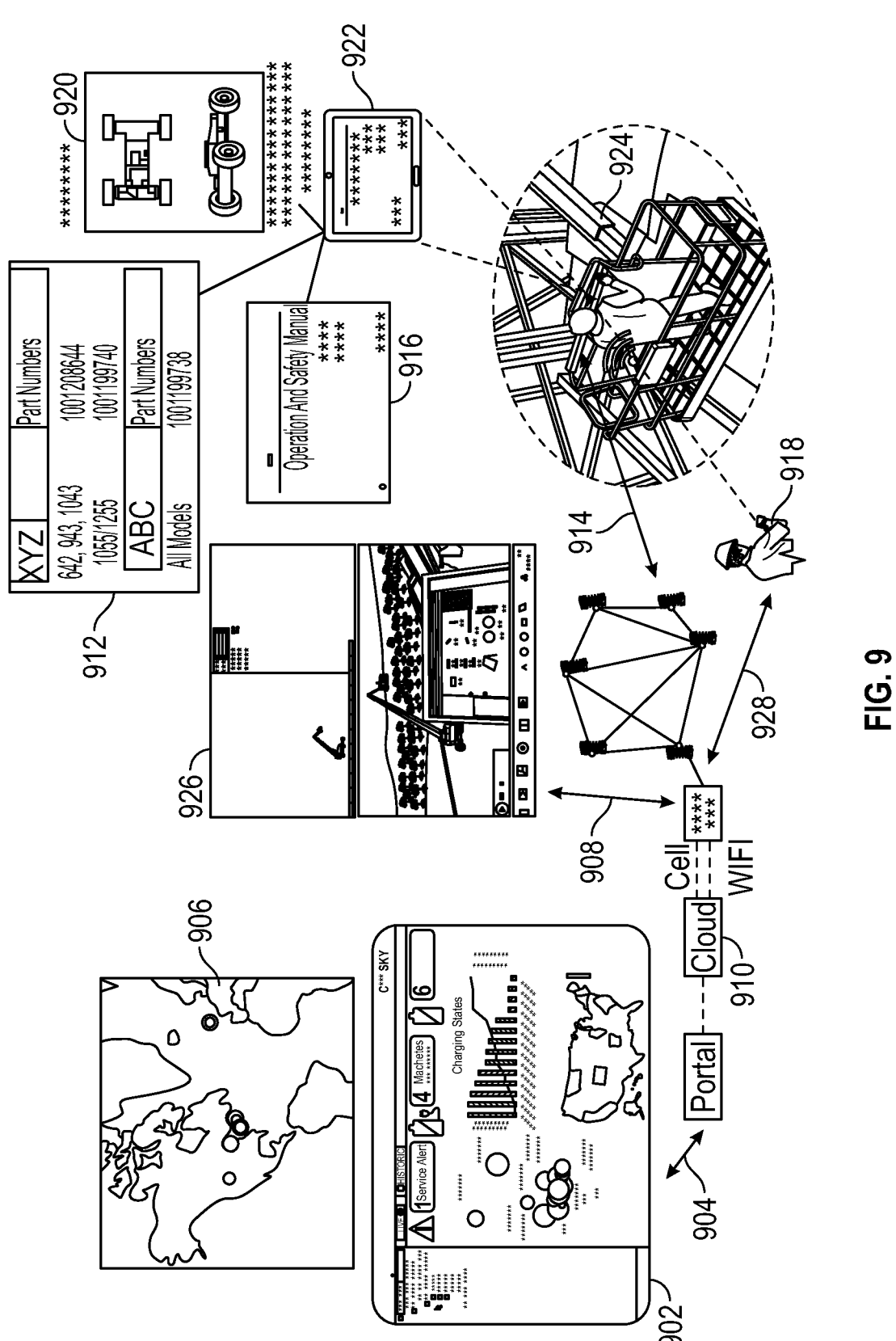
FIG. 9 is a combined picture and drawing representation of graphical user interfaces of the local fleet connectivity system of FIG. 2, according to some embodiments.
Figure 9A:
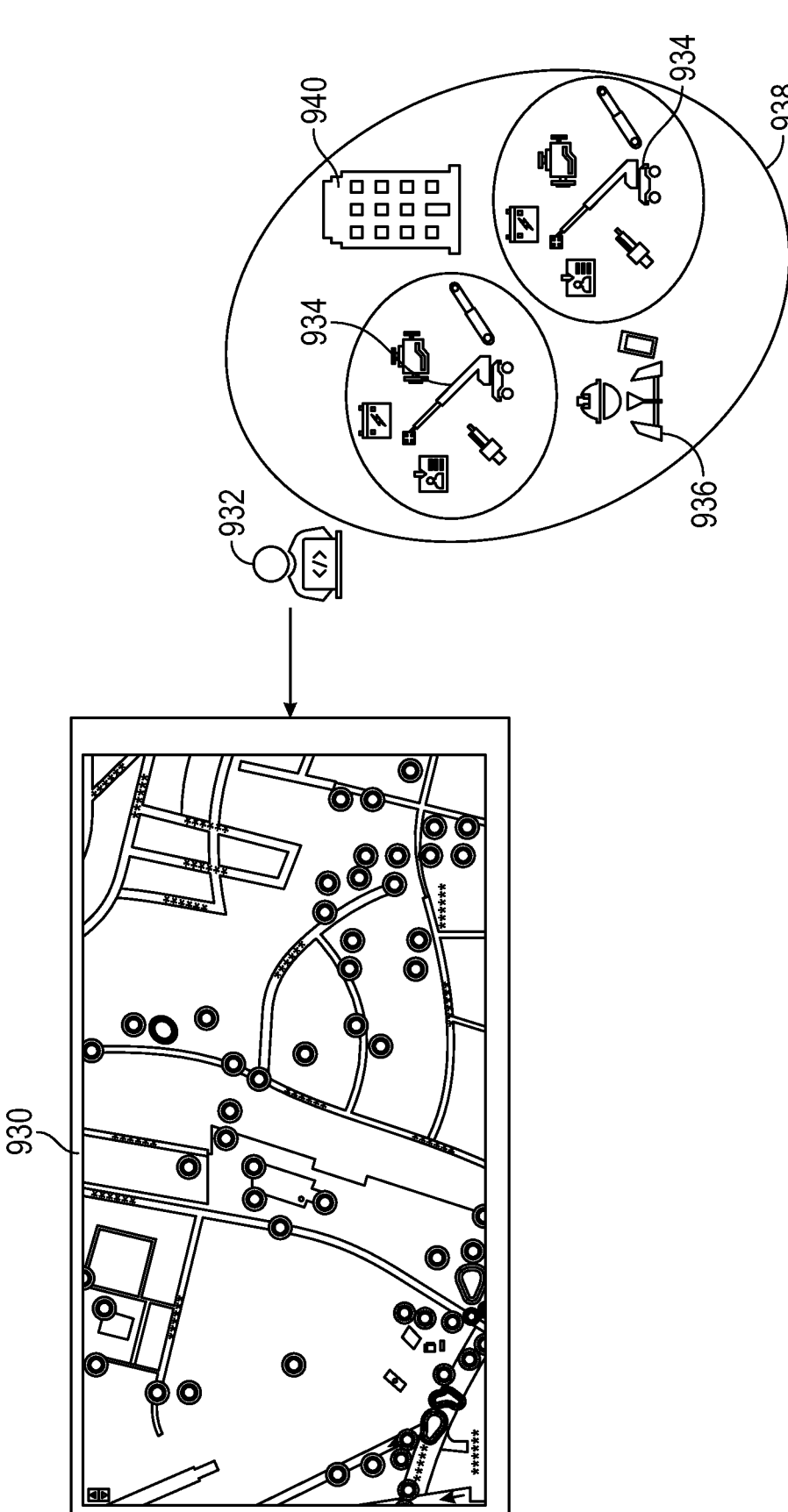
FIG. 9A is a drawing of a local fleet connectivity system eco-system including a heat map user interface, according to an exemplary embodiment.

As shown in FIG. 9, various user interfaces are available to be displayed on a remote user device 918 and an onboard display 922 of a work machine 924. A connectivity hub 910 may send and receive data 928, 908, 904 914 including the user interfaces 902, 906, 912, 916, 926, 920. The user interface 906 is a heat map of locations of a plurality of work machines. The user interface 902 is a machine status display that shows the battery level, location, and alerts relating to a plurality of work machines. User interface 926 shows a digital twin of a work machine that updates based on sensor data of an associated work machine. User interface 912 is a list of part numbers for the work machine 924. User interface 916 is an operation and safety manual for the work machine 924. User interface 920 is a detailed schematic of the work machine 924.

Figure 10:
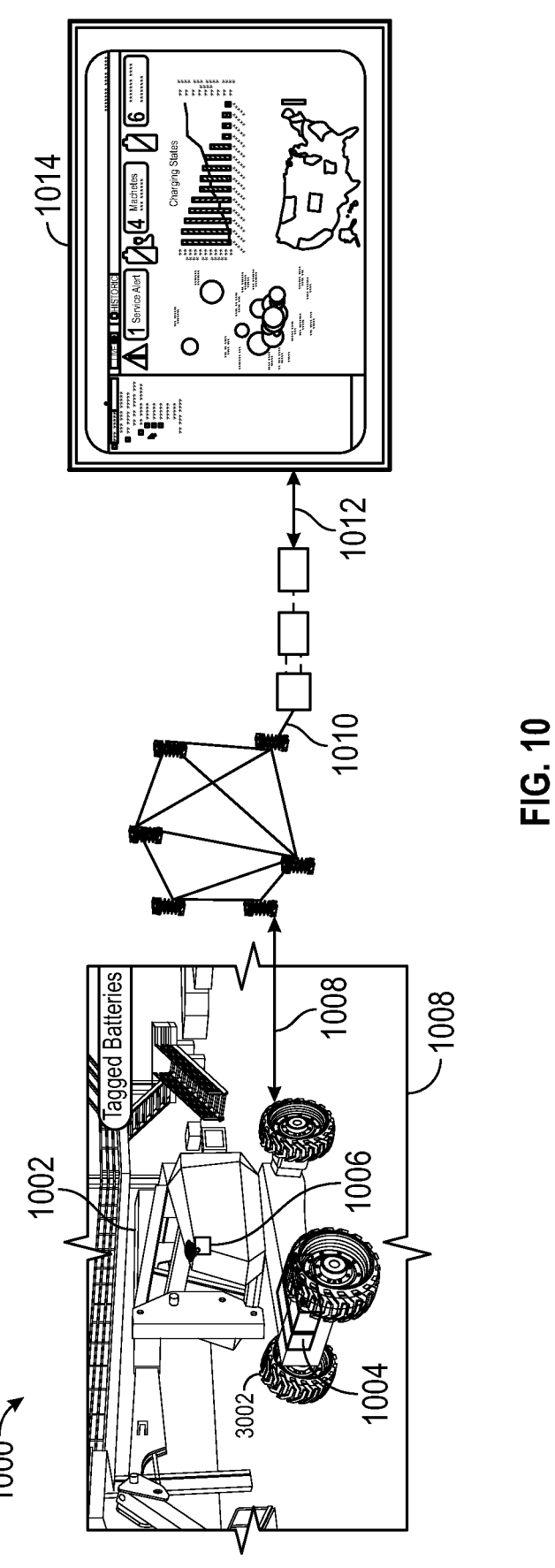
FIG. 10 is a picture representation of a work machine with machine specific output data connected to the local fleet connectivity system of FIG. 2, according to an exemplary embodiment.

As shown in FIG. 10, a tagged consumable tracking system 1000 is shown. A work machine 1002 on a jobsite 1008 includes tagged consumables 1004 (e.g., batteries connected to battery charger 1006). The machine 1002 sends and receives data 1008 to and from the connectivity hub 1010. The connectivity hub 1010 sends and receives data 1012 to and from a remote device and produces a user interface 1014. Data regarding the tagged consumables 1004 may be communicated via the user interface 1014 via the connectivity hub 1010. For example, battery charge state and battery health may be displayed via the user interface 1014. When the battery health falls below a predetermined state, for example, when the battery is only able to hold half of its original charge, the connectivity hub 1010 may send an alert via the user interface 1014 indicating that the battery should be replaced.

As shown in FIG. 11, the local fleet connectivity systems and methods described above may be implemented using various work machines 20 such as an articulating boom lift 1102 as shown in FIG. 11, a telescoping boom lift 1104 as shown in FIG. 11, a compact crawler boom lift 1106 as shown in FIG. 11, a telehandler 1108 as shown in FIG. 11, a scissor lift 506, 508, and 1110 as shown in FIGS. 5 and 11, and/or a toucan mast boom lift 1112 as shown in FIG. 11.

According to the exemplary embodiment shown in FIG. 11, the work machines 20 (e.g., a lift devices, articulating boom lift 1102, telescoping boom lift 1104, compact crawler boom list 1106, telehandler 1108, scissor lift 1110, toucan mast boom lift 1112) include a chassis (e.g., a lift base), which supports a rotatable structure (e.g., a turntable, etc.) and a boom assembly (e.g., boom). According to an exemplary embodiment, the turntable is rotatable relative to the lift base. According to an exemplary embodiment, the turntable includes a counterweight positioned at a rear of the turntable. In other embodiments, the counterweight is otherwise positioned and/or at least a portion of the weight thereof is otherwise distributed throughout the work machines 20 (e.g., on the lift base, on a portion of the boom, etc.). As shown in FIG. 11, a first end (e.g., front end) of the lift base is supported by a first plurality of tractive elements (e.g., wheels, etc.), and an opposing second end (e.g., rear end) of the lift base is supported by a second plurality of tractive elements (e.g., wheels). According to the exemplary embodiment shown in FIG. 11, the front tractive elements and the rear tractive elements include wheels; however, in other embodiments the tractive elements include a track element.

As shown in FIG. 11, the boom includes a first boom section (e.g., lower boom, etc.) and a second boom section (e.g., upper boom, etc.). In other embodiments, the boom includes a different number and/or arrangement of boom sections (e.g., one, three, etc.). According to an exemplary embodiment, the boom is an articulating boom assembly. In one embodiment, the upper boom is shorter in length than lower boom. In other embodiments, the upper boom is longer in length than the lower boom. According to another exemplary embodiment, the boom is a telescopic, articulating boom assembly. By way of example, the upper boom and/or the lower boom may include a plurality of telescoping boom sections that are configured to extend and retract along a longitudinal centerline thereof to selectively increase and decrease a length of the boom.

As shown in FIG. 11, the lower boom has a first end (e.g., base end, etc.) and an opposing second end (e.g., intermediate end). According to an exemplary embodiment, the base end of the lower boom is pivotally coupled (e.g., pinned, etc.) to the turntable at a joint (e.g., lower boom pivot, etc.). As shown in FIG. 11, the boom includes a first actuator (e.g., pneumatic cylinder, electric actuator, hydraulic cylinder, etc.), which has a first end coupled to the turntable and an opposing second end coupled to the lower boom. According to an exemplary embodiment, the first actuator is positioned to raise and lower the lower boom relative to the turntable about the lower boom pivot.

As shown in FIG. 11, the upper boom has a first end (e.g., intermediate end, etc.), and an opposing second end (e.g., implement end, etc.). According to an exemplary embodiment, the intermediate end of the upper boom is pivotally coupled (e.g., pinned, etc.) to the intermediate end of the lower boom at a joint (e.g., upper boom pivot, etc.). As shown in FIG. 11, the boom includes an implement (e.g., platform assembly) coupled to the implement end of the upper boom with an extension arm (e.g., jib arm, etc.). In some embodiments, the jib arm is configured to facilitate pivoting the platform assembly about a lateral axis (e.g., pivot the platform assembly up and down, etc.). In some embodiments, the jib arm is configured to facilitate pivoting the platform assembly about a vertical axis (e.g., pivot the platform assembly left and right, etc.). In some embodiments, the jib arm is configured to facilitate extending and retracting the platform assembly relative to the implement end of the upper boom. As shown in FIG. 11, the boom includes a second actuator (e.g., pneumatic cylinder, electric actuator, hydraulic cylinder, etc.). According to an exemplary embodiment, the second actuator is positioned to actuate (e.g., lift, rotate, elevate, etc.) the upper boom and the platform assembly relative to the lower boom about the upper boom pivot.

According to an exemplary embodiment, the platform assembly is a structure that is particularly configured to support one or more workers. In some embodiments, the platform assembly includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly includes a control panel to control operation of the work machines 20 (e.g., the turntable, the boom, etc.) from the platform assembly. In other embodiments, the platform assembly includes or is replaced with an accessory and/or tool (e.g., forklift forks, etc.).

Referring generally to FIGS. 12-31, the local fleet connectivity system may include components and equipment to support system operation, maintenance, research, and development. Local fleet connectivity system operations and maintenance components and equipment may include, for example, telematics devices, satellite communications devices, network analysis devices (e.g. network traffic analysis devices), network security devices, methods, and applications, machine use profiling devices and applications (e.g. devices, methods, and applications that provide machine use data (i.e. platform position, load reports, etc.) to end users), work machine monitors (e.g. advanced battery monitoring systems), work machine wireless remote control devices and applications, object linking and embedding methods and applications, machine software revision methods and applications, over the air keying and encryption systems and applications, cybersecurity devices, methods, and applications, software as a service management systems, methods, and applications, network subscription management systems, methods, and applications (e.g. systems to enable certain data or features based on a user or customer "subscription" for a local fleet connectivity system service), systems, methods, and applications for automated provisioning of a control module based on control module to machine serial number look up, user interfaces including local fleet connectivity network "dashboard" displays, systems, methods and applications for streaming of machine internal databus traffic over the local fleet connectivity network (e.g. remote diagnosis of machine faults based on databus traffic analysis), configurable application programming interfaces, electronic commerce systems, methods, and applications, emissions control and reporting systems, methods, and applications, etc.

Figure 12:
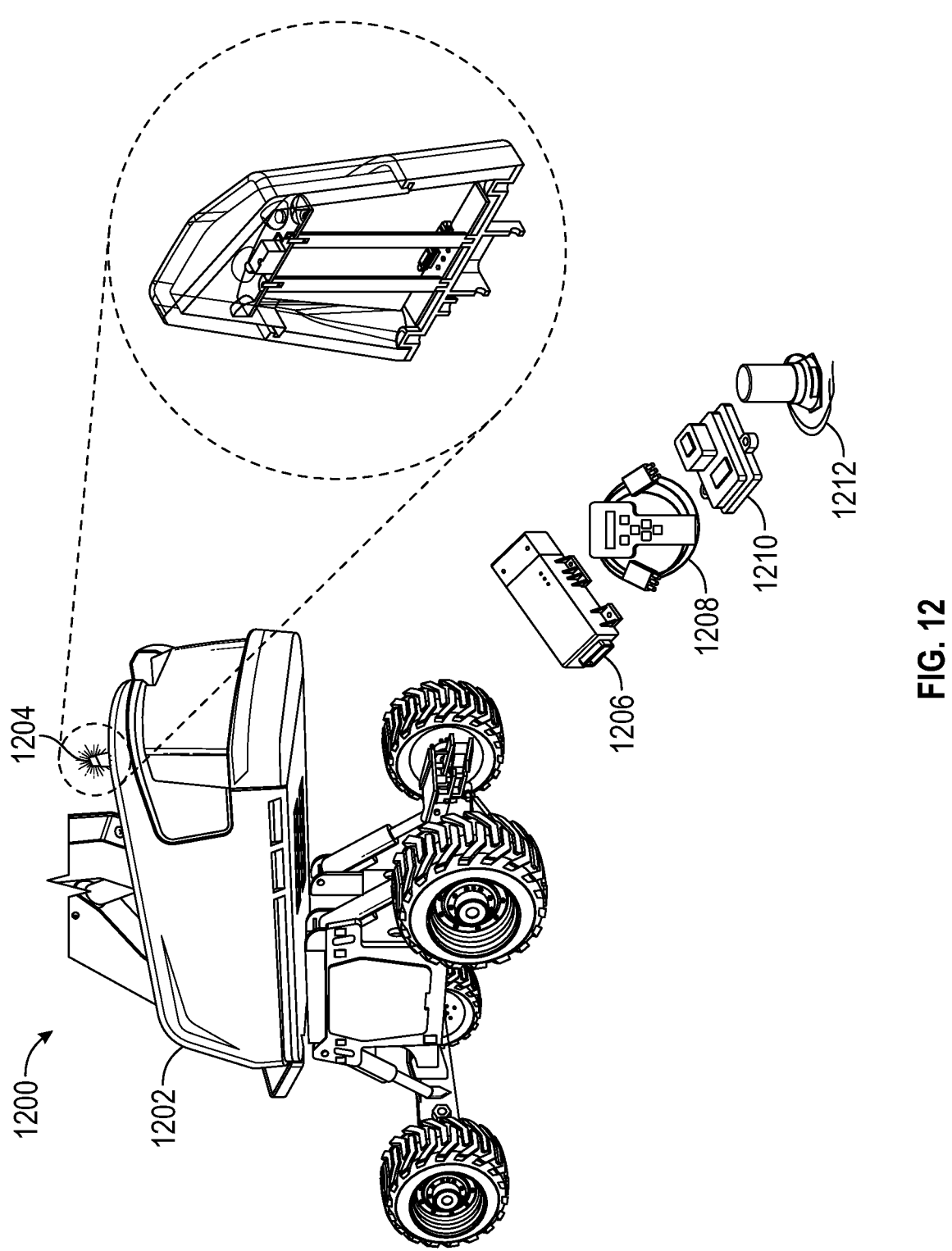
FIG. 12 is a picture representation of a work machine provisioned with an integrated connectivity module and beacon, according to an exemplary embodiment.

Referring now to FIG. 12, a work machine 1202 may be provisioned with an integrated connectivity module 1204 configured to connect to the local fleet connectivity system 1200. The integrated connectivity module 1204 may be configured to perform the functions of multiple devices that are often installed as separate components in traditionally provisioned work machines 1202. The functions and components provided in the integrated connectivity module 1204 can include telematics 1206, analytics 1208, communications 1210, visual and aural indicators 1212 (e.g., a warning beacon), etc.

Figure 13:
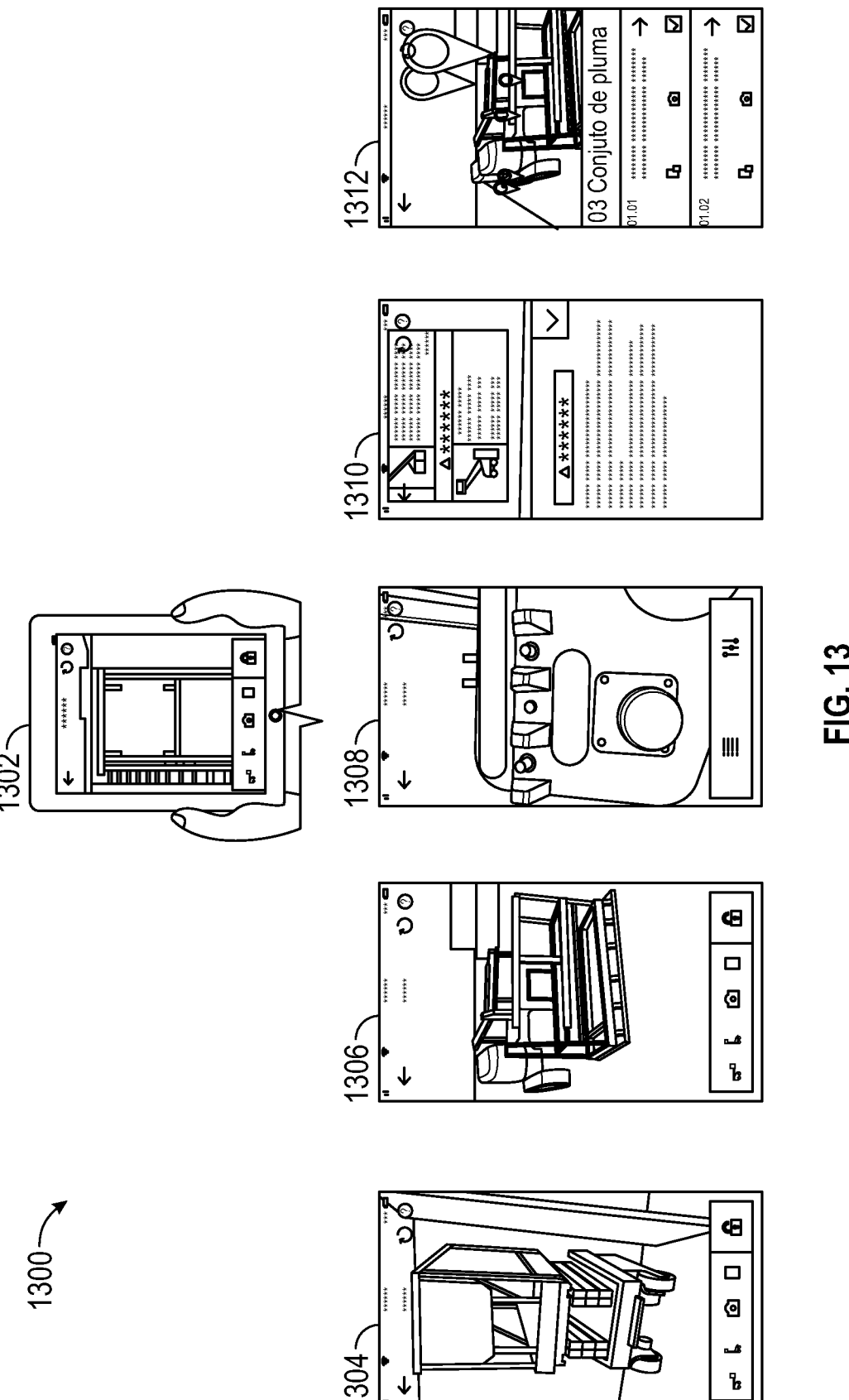
FIG. 13 is a picture representation of a series of user interface views of a local fleet connectivity application hosted on a user device, according to some embodiments.

Referring to FIG. 13, a series of user interface views of a local fleet connectivity application 1300 is shown according to some embodiments. A first user interface view, shown as view 1302, may include a model of a machine 202 to view the size of the machine 202 relative to a location visible through a camera of a user device. A second user interface view, shown as view 1304, may be another view including a model of a machine 202 to view the size of the machine 202 relative to a different location visible through the camera of the user device. A third user interface view, shown as view 1306, may include a picture of a machine 202 and interactive points to enable a user to identify the machine 202 and obtain more information about the machine 202. A fourth user interface view, shown as view 1308, may include an image of a portion of a machine 202 as seen via the camera of the user device and interactive points to enable a user to identify parts of the portion of the machine and to obtain information about how to operate the parts. A fifth user interface view, shown as view 1310, may include a picture of a machine decal as seen via the camera of the user device and display additional information regarding the machine decal. A sixth user interface view, shown as view 1312, may include a plurality of machine options and an image of a selected option relative to a location visible through the camera of the user device.

Figure 14:
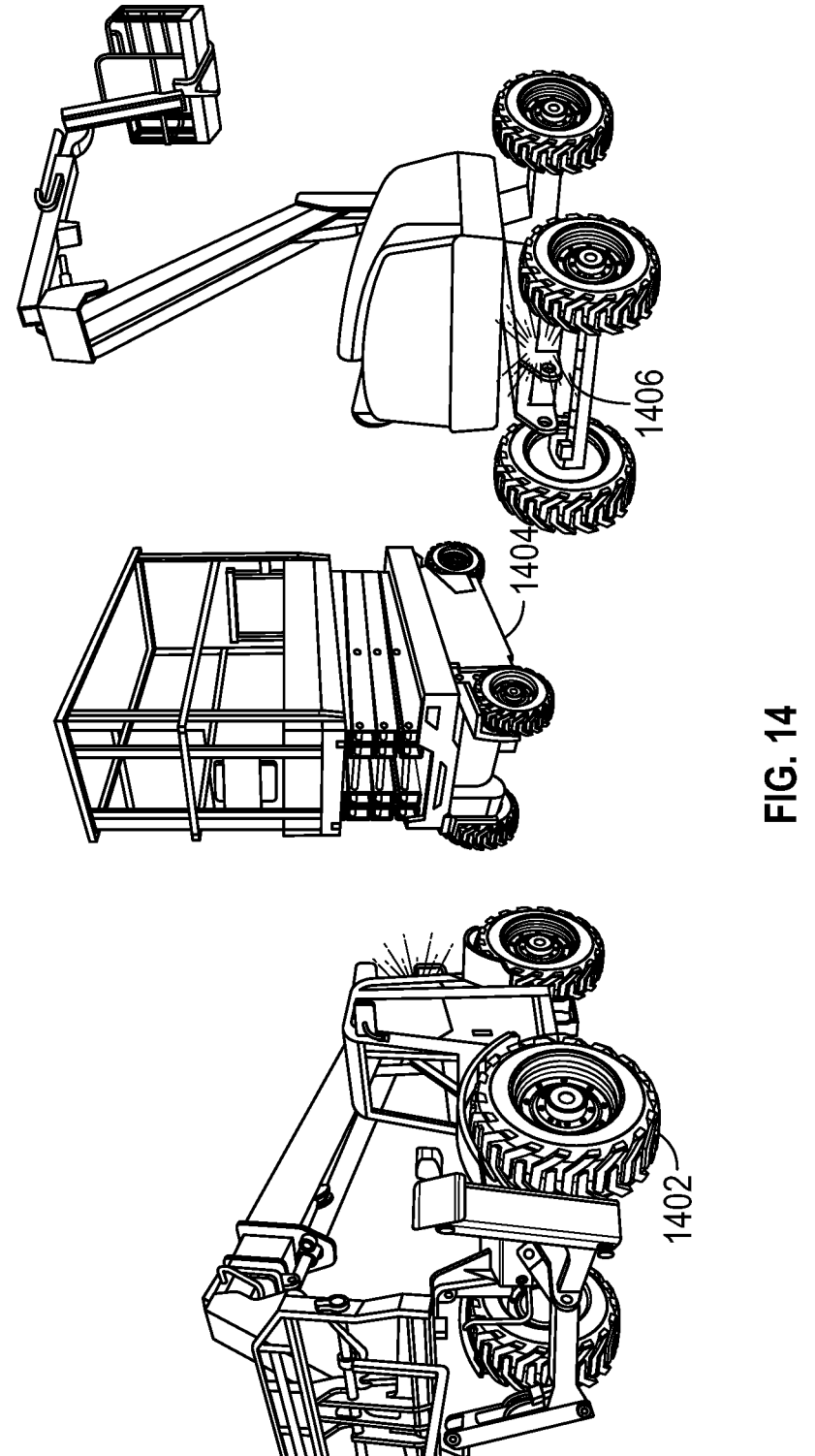
FIG. 14 is a picture representation of a fleet of work machines at a work site connecting to the local fleet connectivity system, according to an exemplary embodiment.
Figure 15:
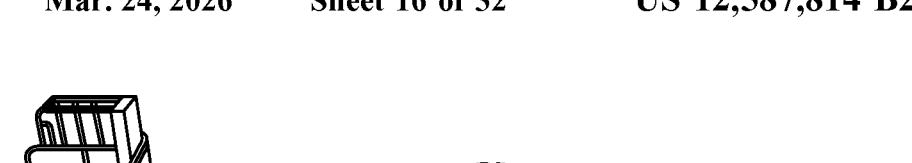
FIG. 15 is a combination picture and drawing representation of work machines connected to a local fleet connectivity system, according to an exemplary embodiment.
Figure 16:
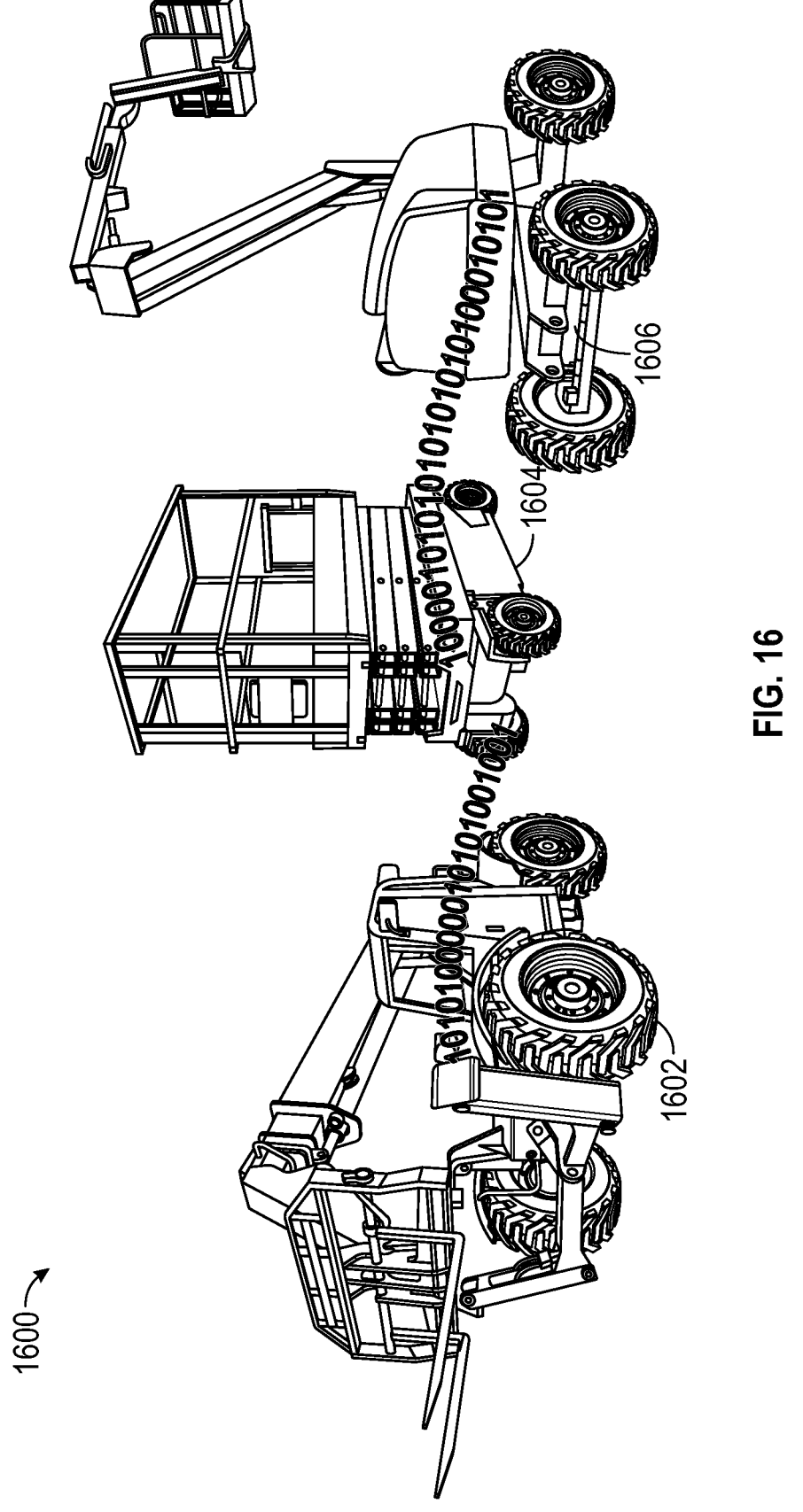
FIG. 16 is a drawing representing of digital machine to machine communications between machines connected to a local fleet connectivity system at a work site, according to an exemplary embodiment.

As shown in FIGS. 14-16, individual work machines 1402, 1404, 1406, 1502, 1504, 1506, 1602, 1604, 1606 at a work site 1400 automatically connect to one another on a local area network to create, for example, a local fleet connectivity system 200.

Referring now to FIG. 16, machines 1602, 1604, 1606 connected to the local area network may transmit information to the cloud for data processing and for simple fleet management. In other words all machines on a particular job-site could easily be identified and accessed and grouped by site. Notifications may also be used to alert persons with the correct permissions when machines are checked in or out. Products, for example work machines 1602, 1604, 1606, automatically create or join a mesh network, (e.g. a local fleet connectivity system 200) created by and among the assets themselves. A mesh identifier is automatically created upon creation of the mesh. Customer can name the mesh network. After joining the mesh, the machine may provide an indication that it "arrived." When the machine enters tow mode, when the machine enters a transport mode, when the machine leaves the mesh, etc., the machine provides an indication that it left the jobsite. Whenever two or more assets are there, they talk across the same network. The system and methods for automatic generation of work site equipment groupings is agnostic as to machine type, manufacturer, owner, status, etc. as the system provides for machines, including machines from different manufacturers to be part of the same network through, for example, connectivity modules.

Figure 17:
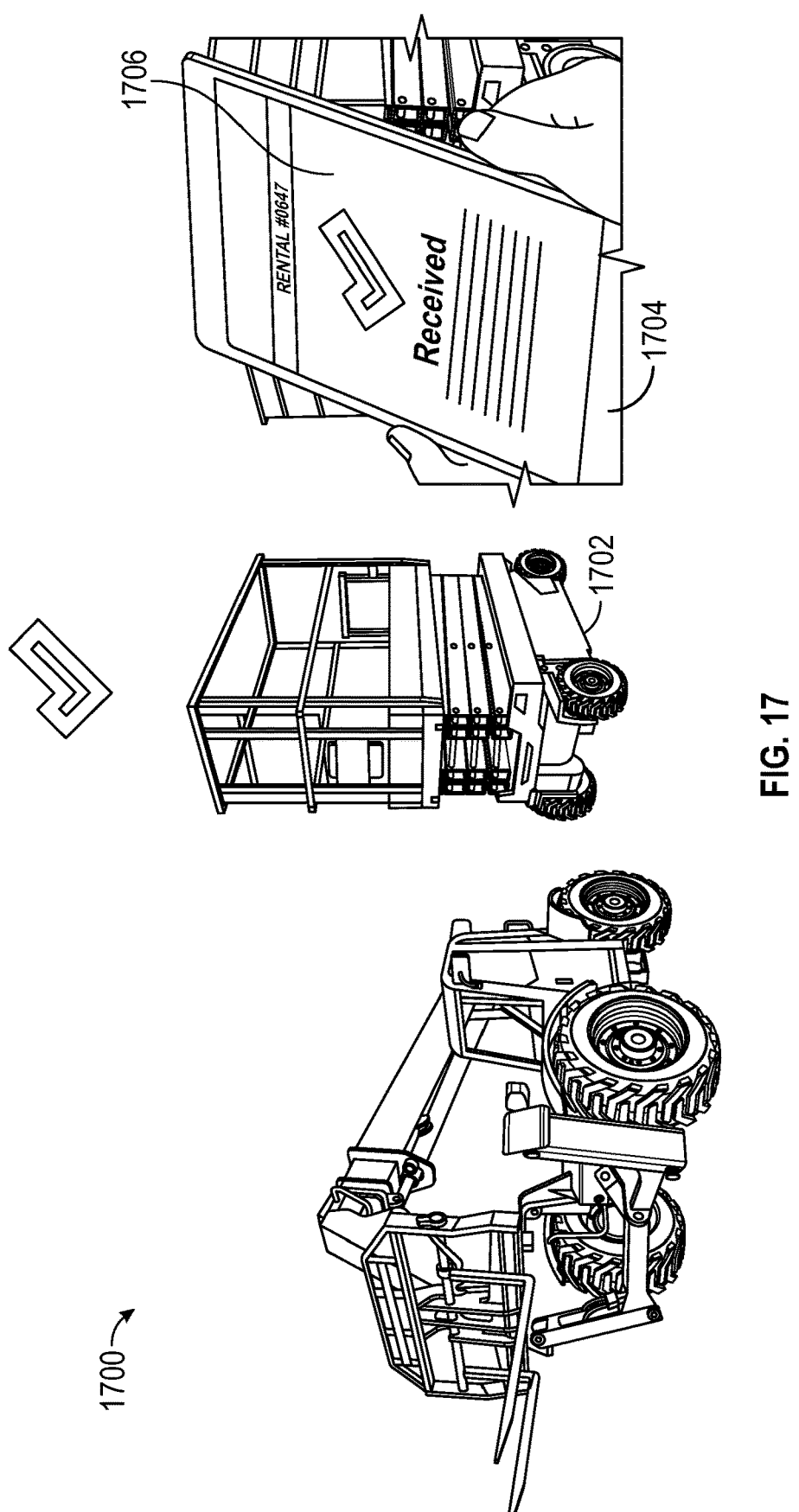
FIG. 17 is a combined picture and drawing representation of the fleet of work machines of FIG. 14 and a user device connected to the local fleet connectivity system of FIG. 2, according to an exemplary embodiment.

Referring to FIG. 17, local fleet connectivity system 1700 is shown, according to an exemplary embodiment. The work machine 1702 may be connected to the user device 1704 via the local fleet connectivity system 1700. The user device 1704 may display a user interface 1706 of the machine connectivity application that corresponds to the local fleet connectivity system. The user interface 1706 may provide an indication to a user of the user device 1704 when the work machine 1702 is successfully received. For example, a user of a user device 1704 located at a work site may receive a notification via user interface 1706 when the work machine 1702 arrives at the work site.

In some embodiments, a connectivity hub 718 may include a site identifier. The site identifier may be indicative of which work site or location the connectivity hub 718 is located. A plurality of machines assigned or transported to the work site associated with the connectivity hub 718 may be configured to automatically connect with the connectivity hub 718. The connection may be triggered upon arrival of the machine at the work site, upon arrival of the connectivity hub 718 at the work site, upon assigning a work site to the machine, upon assigning the work site to the connectivity hub, etc. For example, connectivity hub 718 may be disposed at a work site. Due to being disposed at the work site (e.g., Work Site A), the connectivity hub 718 may be identified as the Work Site A connectivity hub 718. Therefore, when a work machine arrives at the work site, it may automatically connect with the connectivity hub 718 associated with the work site (e.g., the Work Site A connectivity hub 718). In another embodiment, prior to arriving at the work site, a machine may be designated as a Work Site A work machine. Upon such a designation, the work machine may connect with the associated connectivity hub 718 (e.g., the Work Site A connectivity hub 718).

With a connection with the connectivity hub 718, as machines come and go from the work site (or any identified location, e.g., a supplier facility) or are checked in/checked out for tasks, the machines may provide an indication to the connectivity hub 718 that it has left the work site, is currently unavailable because it is being used for a task, needs repair, etc. For example, when the machine enters tow mode, when the machine enters a transport mode, when the machine leaves the mesh, etc., the machine automatically provides an indication to the connectivity hub 718 that it left the jobsite. The connectivity hub 718 may also be configured to receive an indication when the machine returns to the work site or has completed a task (e.g., machine automatically sends an indication when deactivated/turned off). With these indications, the connectivity hub 718 may be configured to automatically check in and check out machines associated with the site identifier. In another embodiment, the connectivity hub 718 may be able to detect when a machine arrives at or leaves the site based on a sensor communicably coupled with the connectivity hub 718. Based on the status of the machine (e.g., checked in or checked out), the connectivity hub 718 may generate a notification to transmit to a user to indicate the status of the machine. In some embodiments, the connectivity hub 718 may receive a command from a user indicating a task to be performed by a machine. Upon designating a machine as checked in, the connectivity hub 718 may recommend the machine to perform the task. In other embodiments, the connectivity hub 718 may automatically assign the task to the machine. In other embodiments, the connectivity hub may automatically activate the machine to perform the task. Upon designating a machine as checked out, the connectivity hub 718 may prevent user of the machines to access those machines or any information associated with the machines. In other embodiments, the connectivity hub 718 may provide an indication regarding when the machine may be accessible/available again. For example, upon receiving a request for a machine to perform a task when the machine is checked out, the connectivity hub 718 may generate a notification indicating the machine is not available. The notification may indicate a time when the machine may become checked in. The notification may be automatically generated after automatically checking in and checking out the machines.

Figure 18:
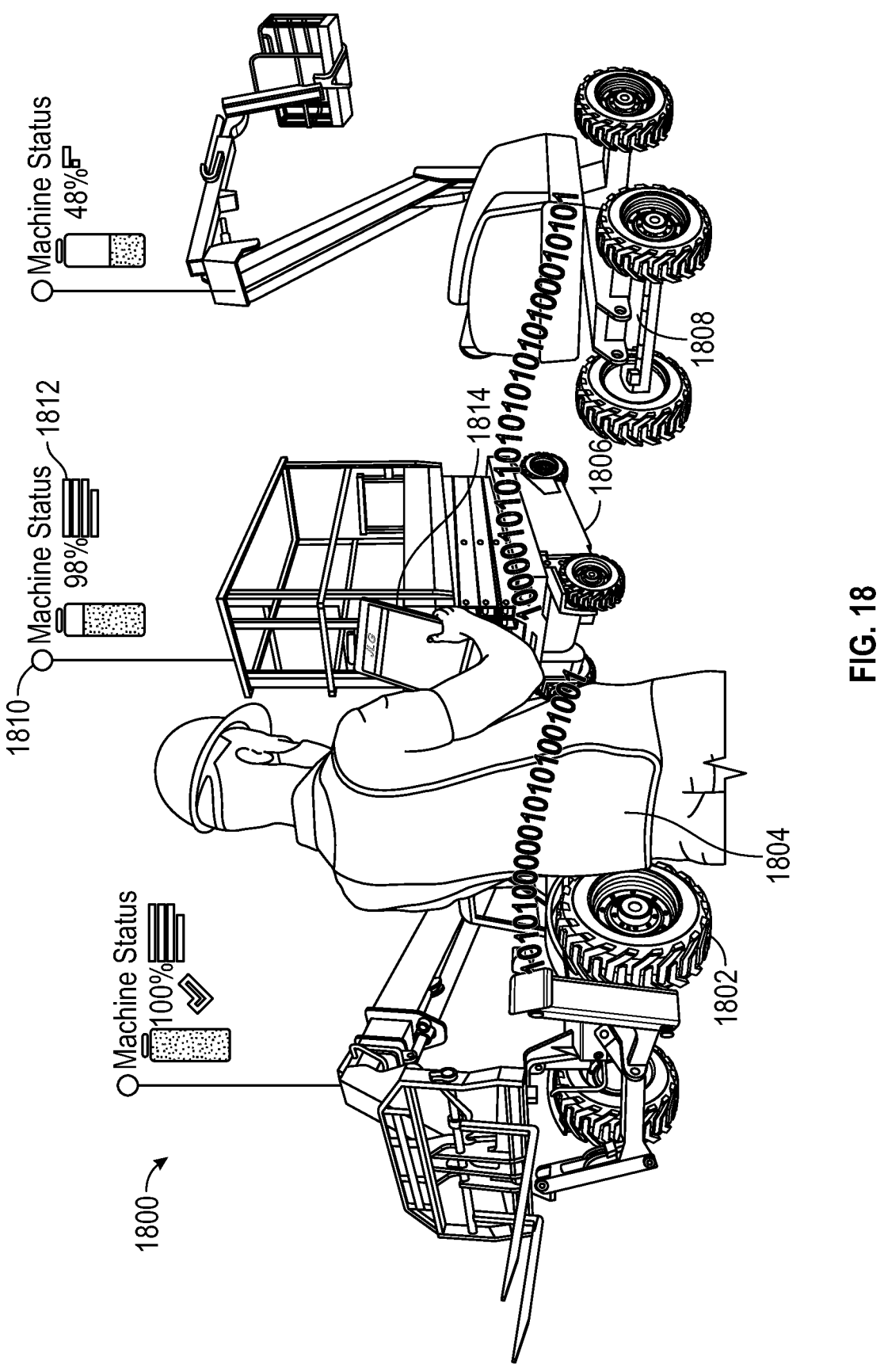
FIG. 18 is a combined picture and drawing representation of the fleet of work machines of FIG. 14 and a user operating a device connected to the local fleet connectivity system, according to some embodiments.

Referring to FIG. 18, local fleet connectivity system 1800 is shown, according to an exemplary embodiment. Local fleet connectivity system 1800 may include machines connecting and communicating with other machines. Local fleet connectivity system 1800 may also include other network devices connected to and communicating with the machines. For example, local fleet connectivity system 1800 may include a first machine 1802, a second machine 1806, and a third machine 1808. Each of the machines 1802, 1806, 1808 may be connected to the other, either directly or indirectly. For example, the first machine 1802 may be directly connected with the second machine 1806 and directly connected with the third machine 1808. In another embodiment, the first machine 1802 may be directly connected with the second machine 1806 and the second machine is directly connected with the third machine 1808. Through the second machine 1806, the first machine 1802 is connected with the third machine 1808. Each machine 1802, 1806, 1808 may be a node 1810 of the local fleet connectivity system 1800. A network device, shown as user device 1814, may also be connected with each of the machines 1802, 1806, 1808 either directly or indirectly. A user 1804 of the user device 1814 may be able to view data 1812 corresponding to the machines 1802, 1806, 1808 via a display of the user device 814. For example, the data 1812 may include a battery level of the machine. The user 1804 may be able to view data regarding multiple machines at the same time via a single user interface on the user device 1814.

Figure 19:
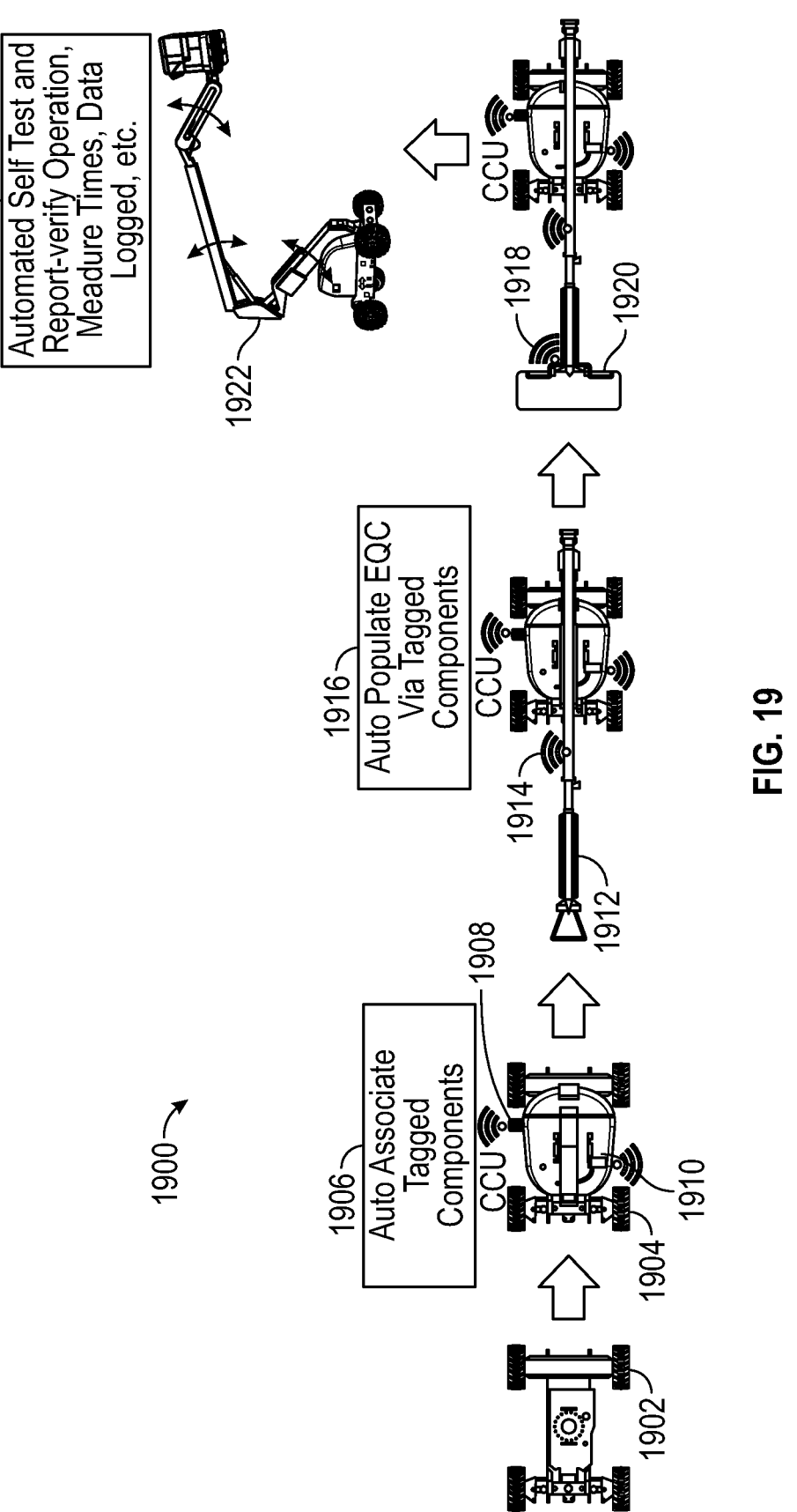
FIG. 19 is a drawing of provisioning a work machine with local fleet connectivity system enabled components, according to some embodiments.

Referring to FIG. 19, provisioning of a work machine with local fleet connectivity system enabled components is shown, according to an exemplary embodiment. A machine 1922 may begin with a chassis, shown as lift base 1902. A body 1904 may be disposed on the lift base 1902. The body 1904 may include various electronic and mechanical devices (e.g., engine, controls, etc.) to drive the machine 1922 and all of its parts. The body 1904 may include a central control unit (CCU) 1908 configured to wirelessly send and receive signals to control the machine 1922. The body 1904 may also include a wireless connection sensor 1910. The sensor 1910 may receive commands and transmit data to other parts of the machine 1922 or to other devices external to the machine 1922. All the components may automatically be tagged via the local fleet connectivity system 200 such that the system 200 automatically associates a sensor 1910 with a certain part of the machine 1922. The machine 1922 may also include a boom assembly 1912. The boom assembly 1912 may include a wireless connection sensor 1914. The machine may also include a platform assembly 1920. The platform assembly 1920 may include a wireless connection sensor 1918. An electronic quality control (EQC) system 1916 may be configured to auto-populate with the tagged components of the machine 1922. With all the components of the machine 1922 assembled, the machine 1922 may perform an automated self-test 1924 to verify operation, measure times, log data, etc., to determine whether all the components are working, the statuses of the components, etc.

Figure 20:
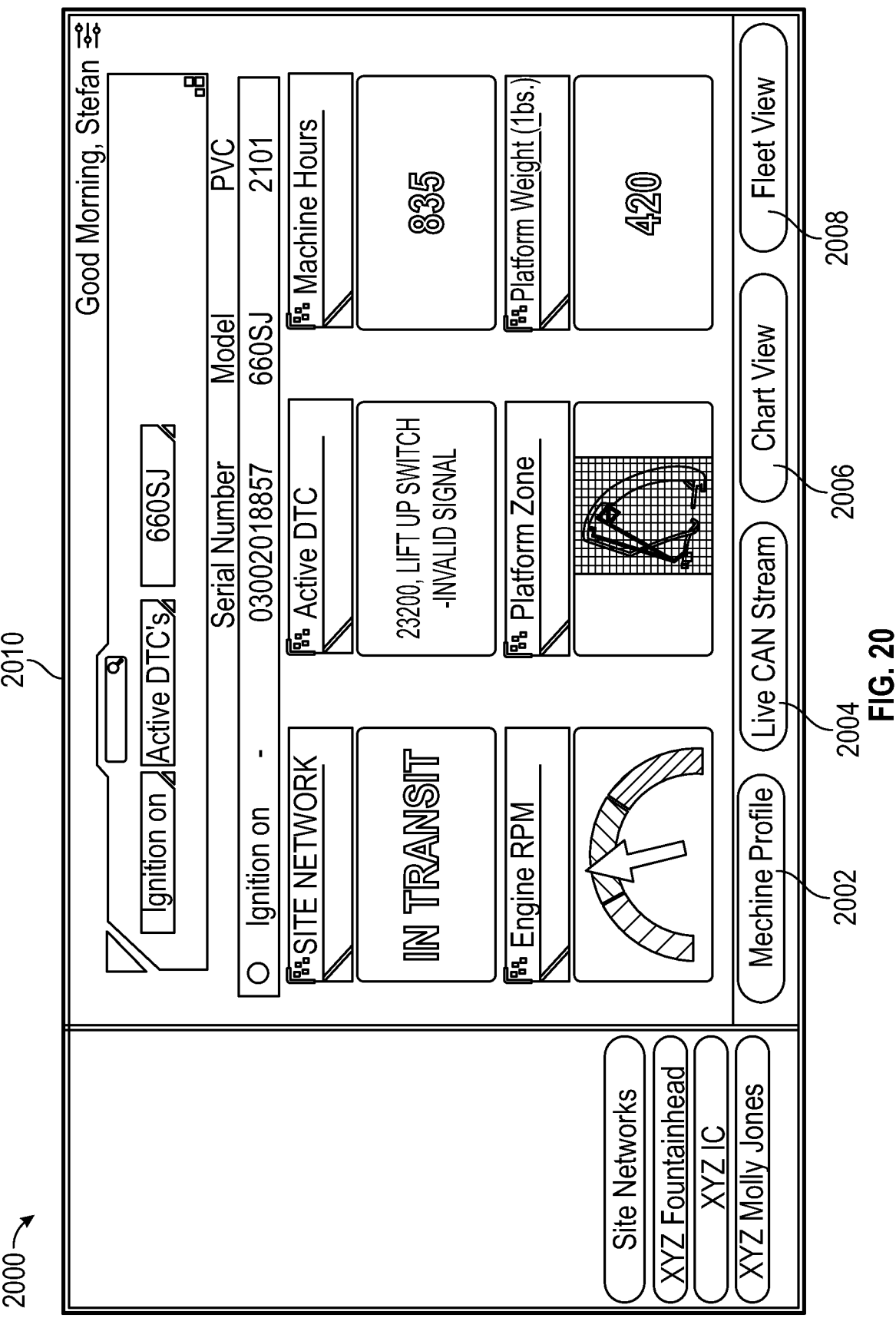
FIG. 20 is a drawing of a user interface of a local machine connectivity system application, according to an exemplary embodiment.

Referring to FIG. 20, a user interface 2010 of a local machine connectivity application 2000 is shown, according to an exemplary embodiment. The user interface 2010 may be presented to a user via a user device depending on a role of the user and the nature of a task. The user interface 2010 may include textual and graphic representations of data associated with a machine, a plurality of machines, a local machine connectivity system, etc. For example, the user interface 2010 may display data corresponding to a machine profile 2002, a machine databus stream 2004, a machine position, configuration or state, 2006, or data related to a fleet of machines 2008.

Figure 21:
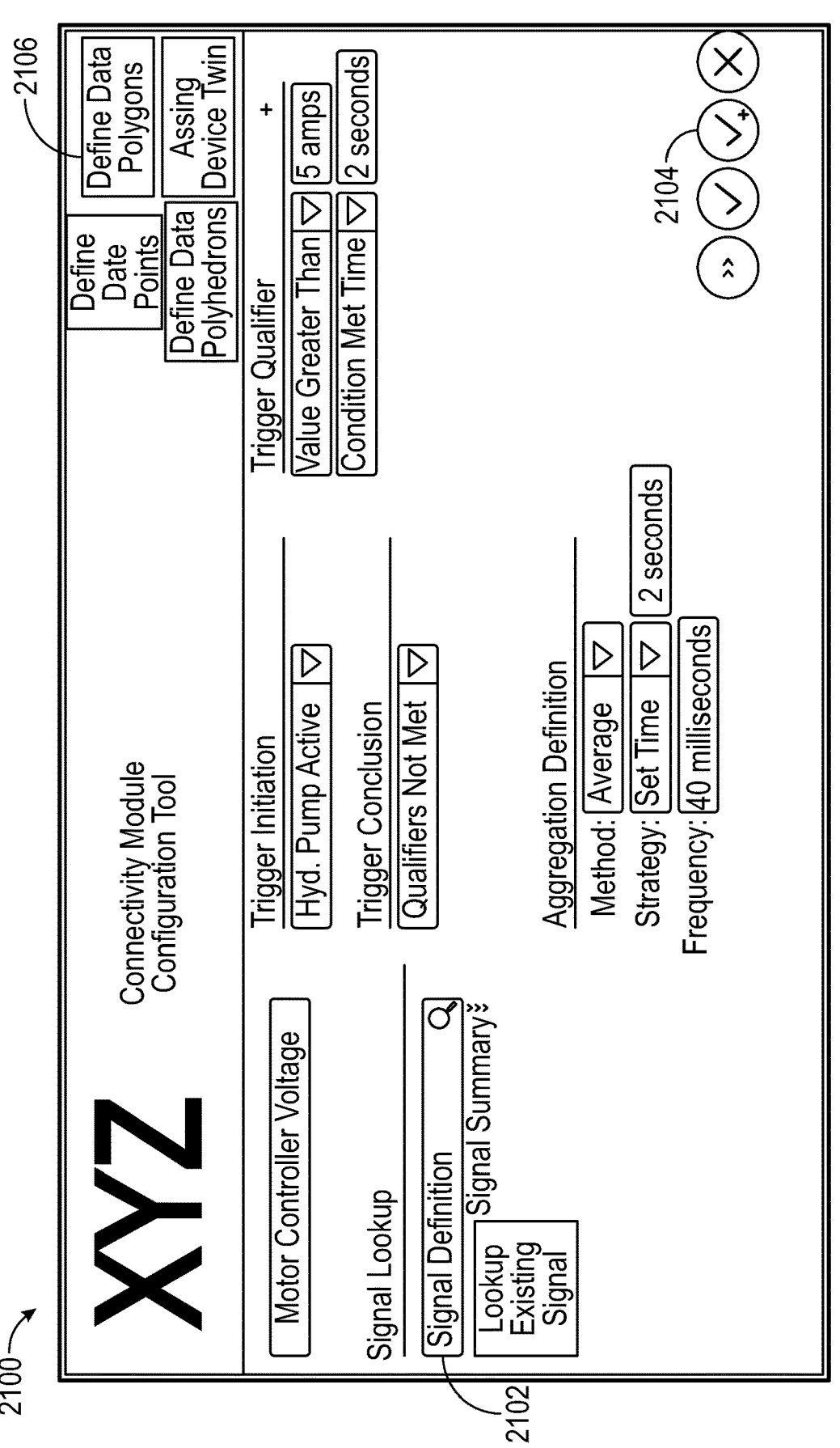
FIG. 21 is a drawing of another user interface of the machine connectivity application, according to an exemplary embodiment.

Referring to FIG. 21, a user interface 2110 of a local machine connectivity application 2100 is shown, according to an exemplary embodiment. The user interface 2110 may be presented to a user via a user device depending on a role of the user and the nature of a task. The user interface 2110 may be based on a connectivity tool. The user interface 2110 may be configured to facilitate the input of user-defined criteria for a system or a task. For example, the user interface 2110 may include a signal identification 2102. The signal identification 2102 may be configured to enable the user to identify existing signals at a specific location or from certain devices. The user interface 2110 may also include a definition tool 2106. A definition tool may be configured to enable the user to define data points, define data polygons, define data polyhedrons, or assign a device twin. The user interface 2110 may include approval selections 2104. The approval selections 2104 may facilitate the user in accepting or declining the criteria displayed on the user interface 2110.

Figure 22:
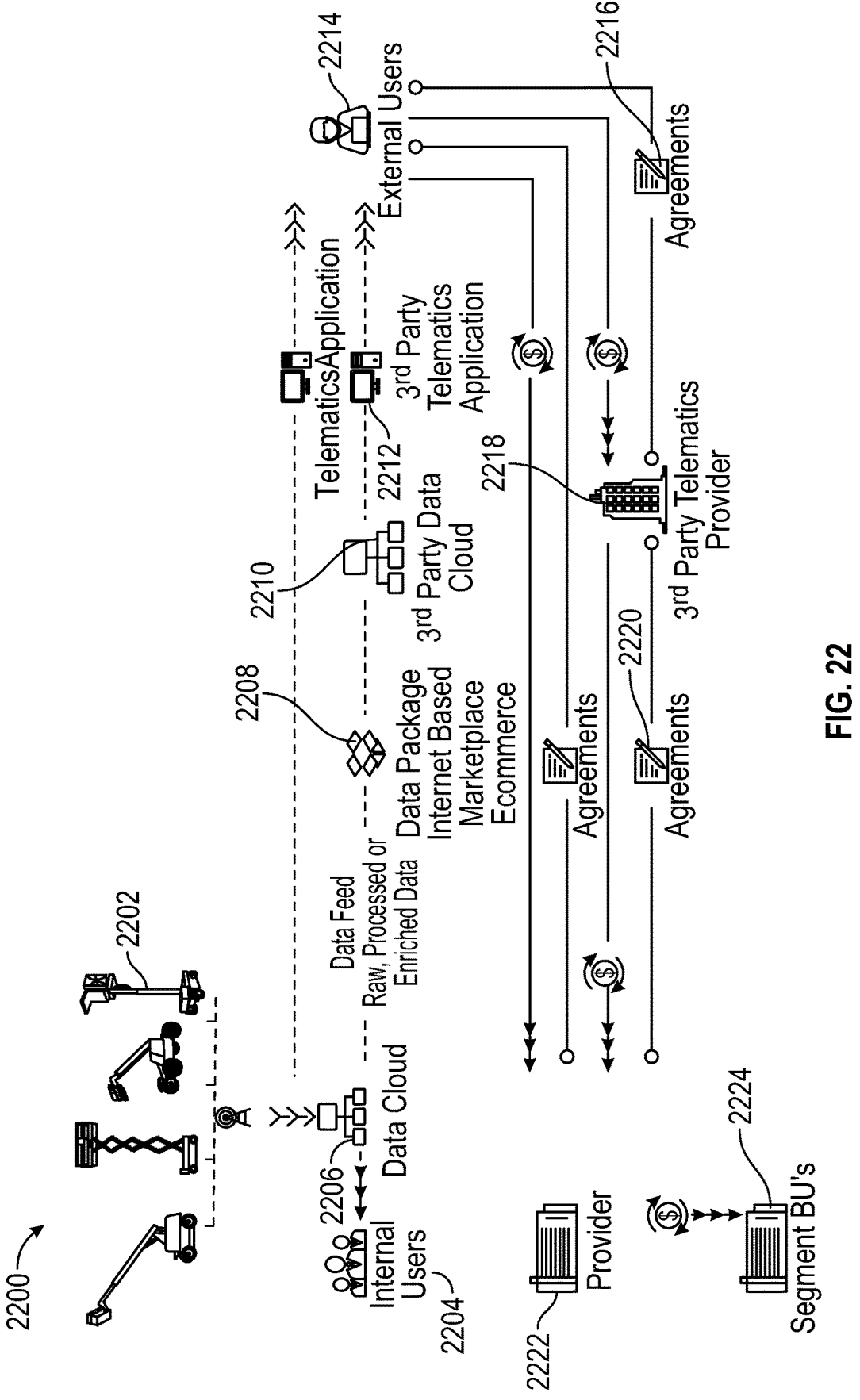
FIG. 22 is a drawing of a data flow within the local machine connectivity system of FIG. 2 and supporting systems, according to an exemplary embodiment.

Referring to FIG. 22, a data flow within a local machine connectivity system 2200 is shown, according to an exemplary embodiment. The local machine connectivity system 2200 may include a plurality of machines 2202 communicably connected to a network. Data from the plurality of machines 2202 may be transmitted to a provider data cloud 2206. Users associated with the provider, shown as internal users 2204, may be able to access the data from the provider data cloud 2206. In one embodiment, the provider data cloud 2206 may be configured to transmit the data to a telematics application 2212 controlled by the provider. In another embodiment, The provider data cloud 2206 may be configured to transmit the data to a telematics application 2212 controlled by a third party. In such an embodiment, the provider data cloud 2206 may be configured to transmit the data from the plurality of machines 2202 as a data package 2208 such that the data may be accessed by other users via an internet-based e-commerce marketplace. The data may be transmitted to a third party data cloud 2210 communicably coupled with the third party telematics application 2212. An external user 2214 may be able to access the data via either the provider telematics application 2212 or the third party telematics application 2212.

In some embodiments, the third party telematics application 2212 is provided by a third party telematics provider 2218. There may be a user agreement 2216 established between the external users 2214 and the third party telematics provider and a commercial agreement 2220 established between the third party telematics provider 2218 and a data provider 2222. The data provider 2222 may be the owner of the plurality of machines 2202. The data provider 2220 may be configured to generate, obtain, and organize the data such that it can be accessible by the external users. Any financial benefit obtained by the data provider 2222 may be stored and cataloged by a segment BU 2224.

Figure 23:
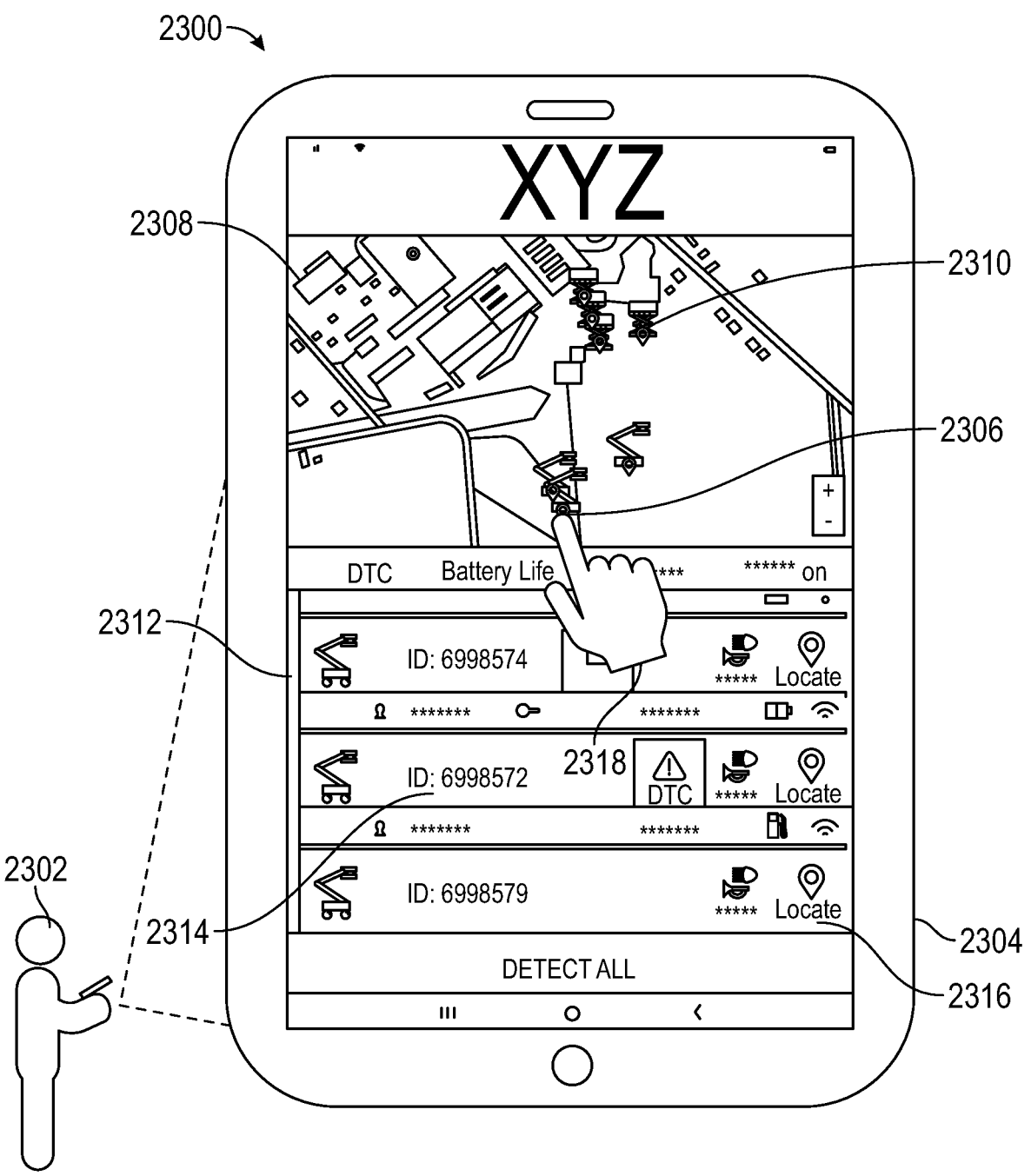
FIG. 23 is a picture representation of a user interface of a machine connectivity application, according to an exemplary embodiment.

Referring to FIG. 23, a user interface 2300 of a machine connectivity application is shown, according to an exemplary embodiment. A user 2302 may use the machine connectivity application by interacting 2318 with an application hosted on a user device 2304 that generates a user interface 2308. The user device 2304 and various work machines 1202 are interconnected via the local fleet connectivity system 200. The user 2302 selects a machine 2306 from the user interface 2308 comprising a group of a machines 2310 connected to the local fleet connectivity system 200 at a work site. The user interface 2308 may depict, for example, imagery of a work site with overlays of machine locations (e.g. a map) 2310 and information regarding machine specific information including status (e.g. location, fuel state, state of charge, etc.) 2312, 2314, 2316. The application may dynamically filter the map to illustrate the total machine population and locations and statuses of individual machines in the population. In some examples, a remote user may apply filters (e.g. proximity to a user, filters related to machine status including self-test, fuel level, state of charge, etc.) to a specific work site network much the same as can be done locally via an application on a mobile user device (e.g. in the instance where a remote user can apply the desired user configurable rules to assist a local user w/o the need of mobile application use). The user may select a machine or group of machines using an application and communicate with the machine or group of machines (directly or via a cloud) to have that machine provide a an equipment identify indication (e.g. a colored light, a light pattern, a combination of light colors and patterns, activation of a horn).

Figure 24:
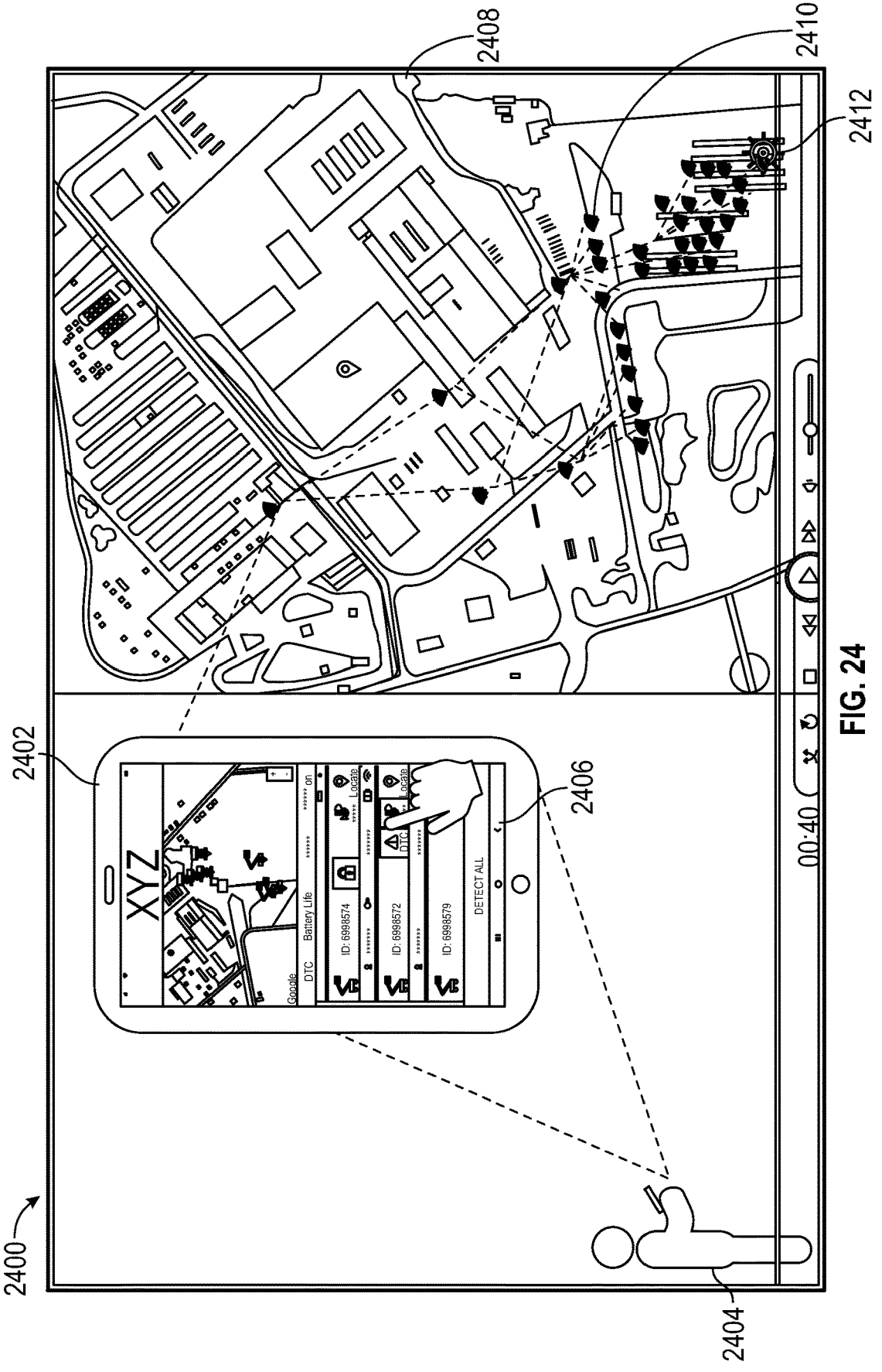
FIG. 24 is a picture representation of another user interface of the machine connectivity application, according to an exemplary embodiment.

Referring to FIG. 24, a user interface 2400 of a machine connectivity application is shown, according to an exemplary embodiment. The user interface 2400 may include a map 2408. The map may be an aerial view of a job site. The map 2408 may include machine indicators 2410 that show where machines are disposed on the map 2408. A light on a connectivity module can be used to identify a first machine 2412 of the plurality of machines within the job site and indicate various statuses of the first machine (e.g., fuel level, state of charge, fault status, ignition on/off, in operation, etc.). The application user interface 2406 on user device 2402 can be used by a user 2404 to select which status they want to be displayed on a fleet within user defined parameters (e.g., a connected range of the user device). Features of the "find me" application can be used independently of or in conjunction with the filter criteria of a desired subset of a fleet. The equipment identification system application can also provide user interfaces for other instructions or commands (e.g. allowing a machine to be powered up or shut down).

Figure 25:
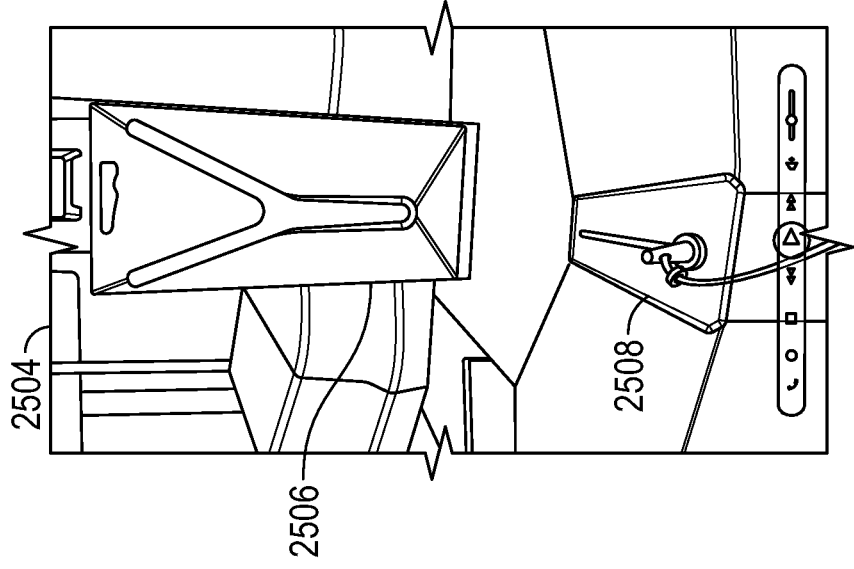
FIG. 25 is a combined picture and drawing representation of a work machine provisioned with an integrated connectivity module, according to an exemplary embodiment.
Figure 25:
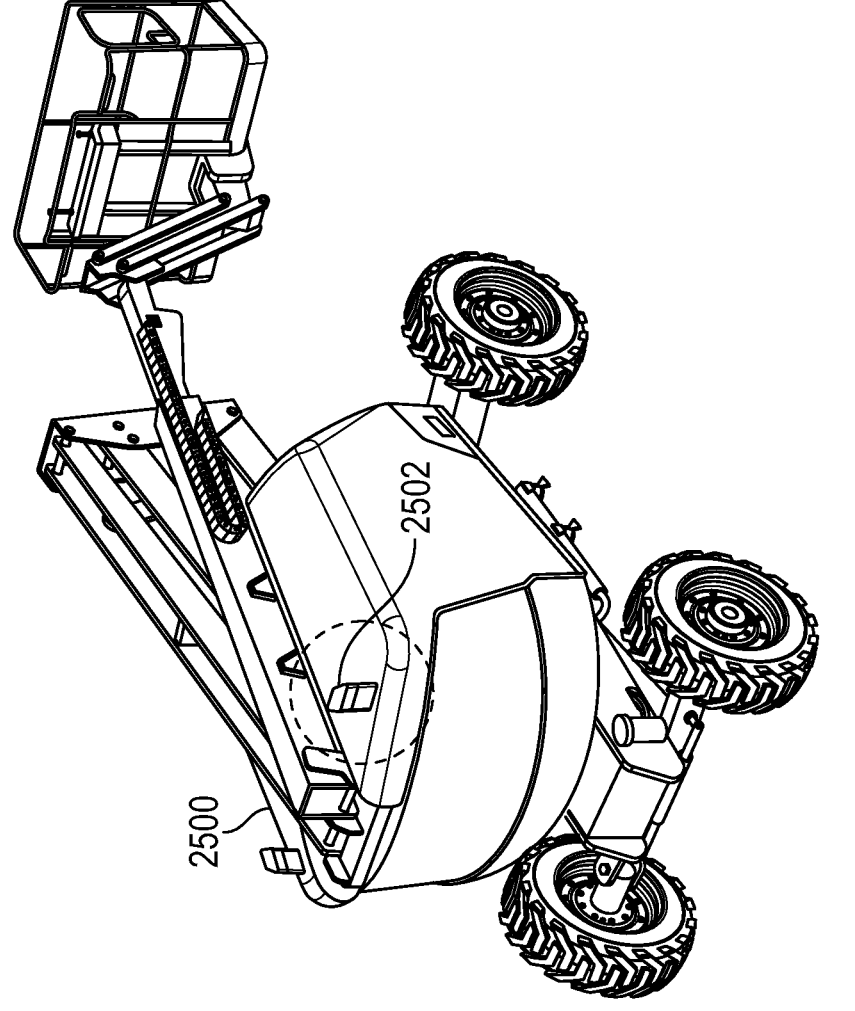

Referring to FIG. 25, a machine 2500 provisioned with an integrated connectivity module 2502 is shown, according to an exemplary embodiment. The integrated connectivity module 2502 may be configured to communicably connect the machine 2500 with other nodes of a local fleet connectivity system. The integrated connectivity module 2502 may include an indication assembly 2504. The indication assembly 2504 may include at least one visual indicator, shown as light 2506 and light 2508. In other embodiments, the indication assembly may include an audible indicator (e.g., a siren). The indication assembly 2504 may include any combination of indicators. The indication assembly 2504 may be configured to provide data to a user, and enable the user to interpret the data without needing to access a user device.

Figures 26, 27:
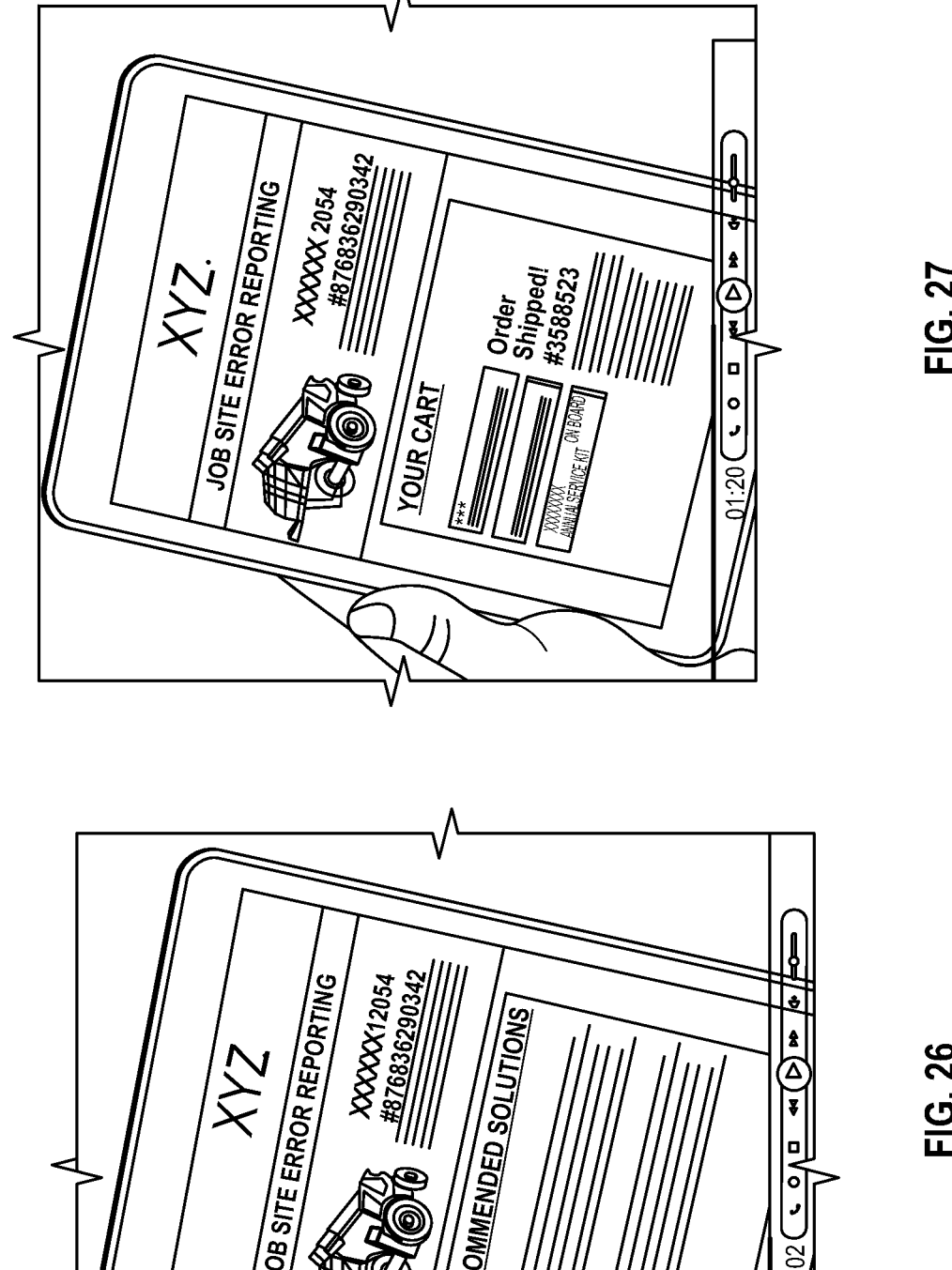
FIG. 26 is a combined picture and drawing representation of a user interface of the machine connectivity application on a user device, according to an exemplary embodiment.
FIG. 27 is a combined picture and drawing representation of another machine connectivity application on a user device, according to an exemplary embodiment.

Referring to FIG. 26, a user interface of a machine connectivity application is shown, according to an exemplary embodiment. A user device 272 may display the user interface when a machine 202 is not working appropriately. The user interface may include a notification indicating an error has occurred. The notification may include details regarding an identification of the machine 202 at issue, what the problem is with the machine 202, and recommended solutions on how to fix the problem.

Referring to FIG. 27, a user interface of a machine connectivity application is shown, according to an exemplary embodiment. A user device 272 may display the user interface when a machine 202 is not working appropriately. The user interface may facilitate a purchase of parts needed to fix an identified problem. For example, the user interface may provide links to websites hosted by providers that make the parts that are needed to fix the machine 202. The user of the user device 272 may purchase the necessary part through the machine connectivity application. Upon purchase, the application may provide the user interface indicating confirmation of the order, and shipping update, etc.

Figure 28:
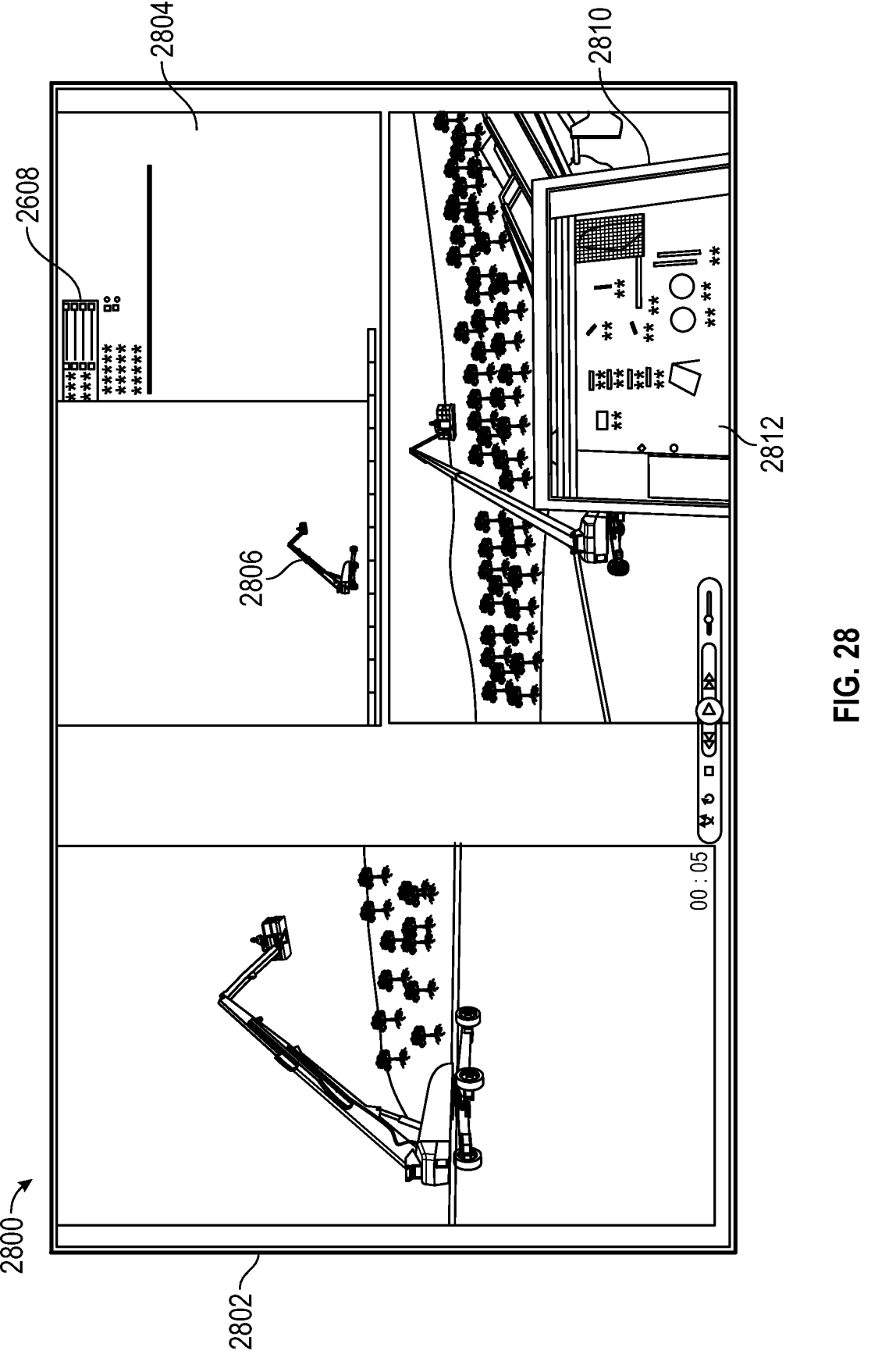
FIG. 28 is a picture representation of a digital twinning function provided through the machine connectivity application via the local machine connectivity system of FIG. 2, according to an exemplary embodiment.

Referring to FIG. 28, a digital twinning function 2800 provided through the machine connectivity application via the local machine connectivity system 200 is shown, according to an exemplary embodiment. The local machine connectivity system 200 may identify a machine 2802. A twinning user interface 2804 may be displayed by a user device 2810 via the machine connectivity application. The user interface 2804 may include a digital model 2806 of the machine. The user interface 2804 may include data 2608 corresponding to the machine 2802 based on the digital model 2806. The digital model 2806 may be configured to mimic the movements of the machine 2802 in real time. The data 2608 may be configured to update as the digital model 2806 moves. For example, as a boom of the machine 1802 moves, the data 2608 (e.g., the boom angle) may adjust accordingly. An analytics user interface 2812 may be another user interface displayed via the user device 2810. The analytics user interface 2812 may provide additional detail regarding the machine 2802 and the job performed by the machine 2802.

Figure 29:
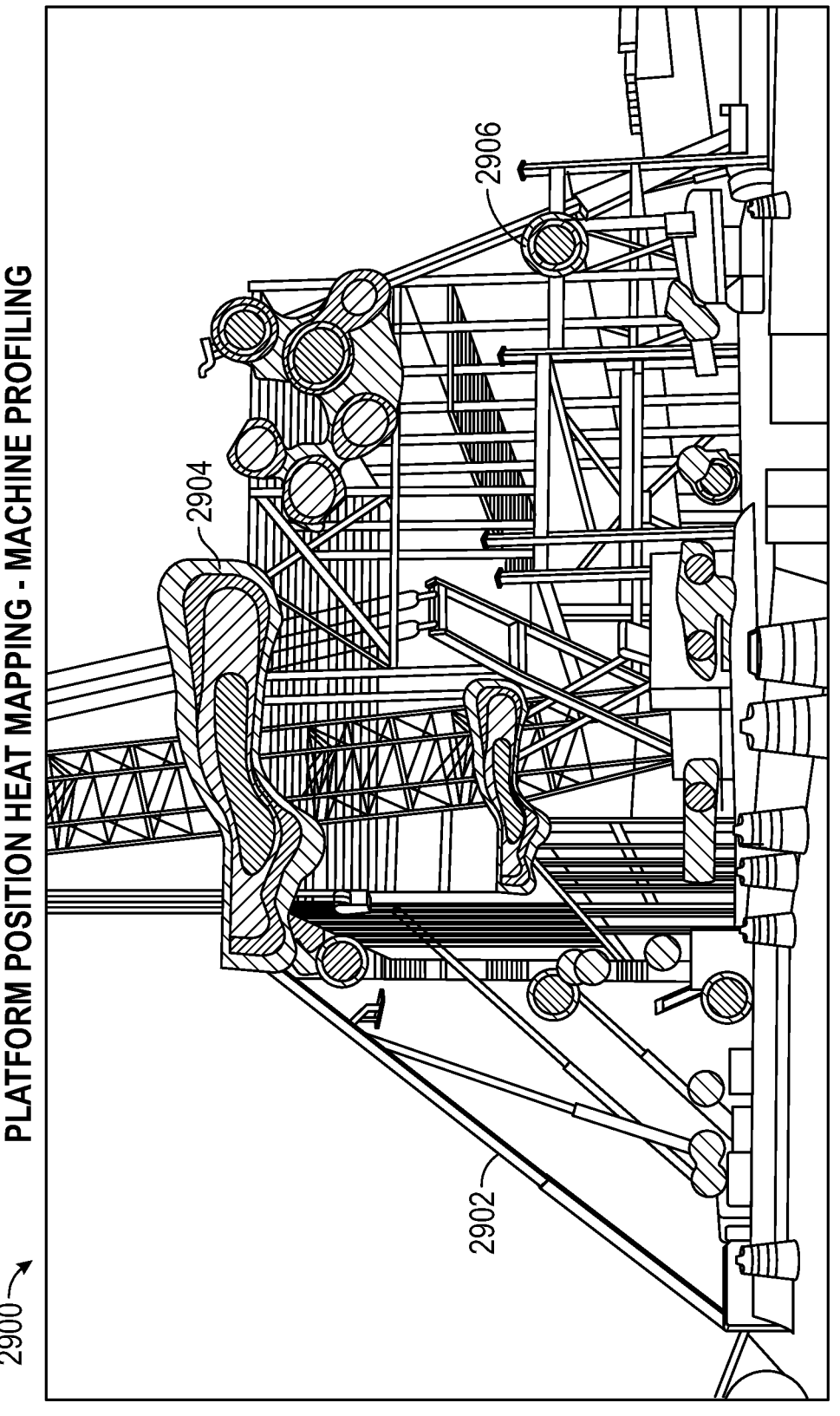
FIG. 29 is a combined picture and drawing representation of a work machine profiling function provided through the local machine connectivity system of FIG. 2 via the machine connectivity application, according to an exemplary embodiment.

Referring to FIG. 29, a work machine profiling function 2900 provided through the local machine connectivity system via the machine connectivity application is shown, according to an exemplary embodiment. The machine profiling function 2900 may provide platform position heat mapping. For example, there may be a plurality of machines 2902 disposed on a work site. The machine profiling function 2900 may indicate locations on a jobsite where more heat is being generated due to machine activity by displaying heat indicators 2904, 2906.

Figure 30:
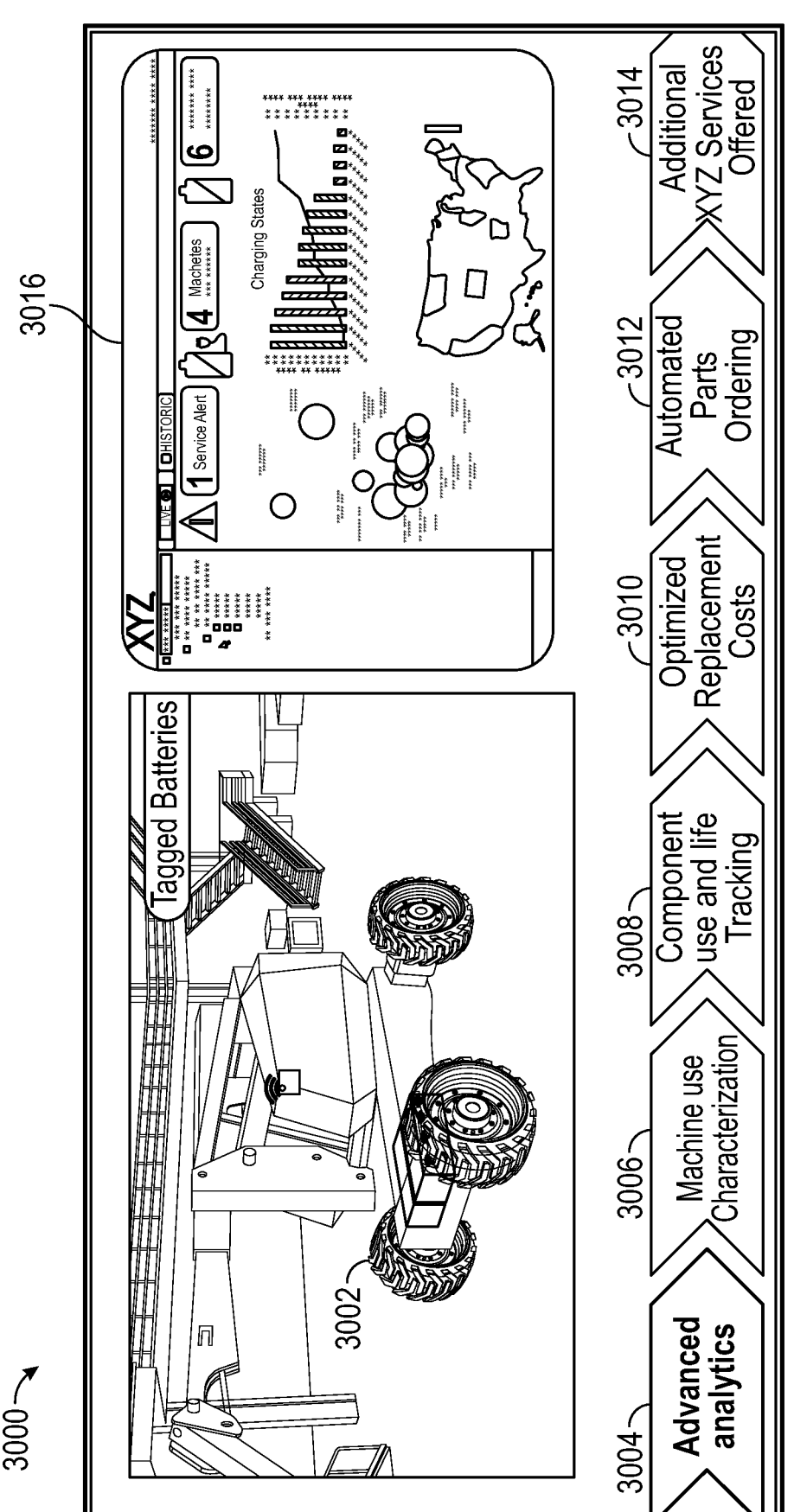
FIG. 30 is a drawing of another user interface of the machine connectivity application, according to some embodiments.

Referring to FIG. 30, a user interface 3000 of the machine connectivity application is shown, according to an exemplary embodiment. The user interface 3000 may include a machine 3002 with a tagged consumables. The user interface 3000 may include an analytics portion 3016 to display data regarding a plurality of machines 3002 connected via a fleet connectivity system. The user interface 3000 may include various data regarding the plurality of machines 3002. For example, the user interface may include advanced analytics 3004, machine use characterization 3006, component use and life tracking 3008, optimized replacement costs 3010, automated parts ordering 3012, and additional services offered 3014.

Figure 31:
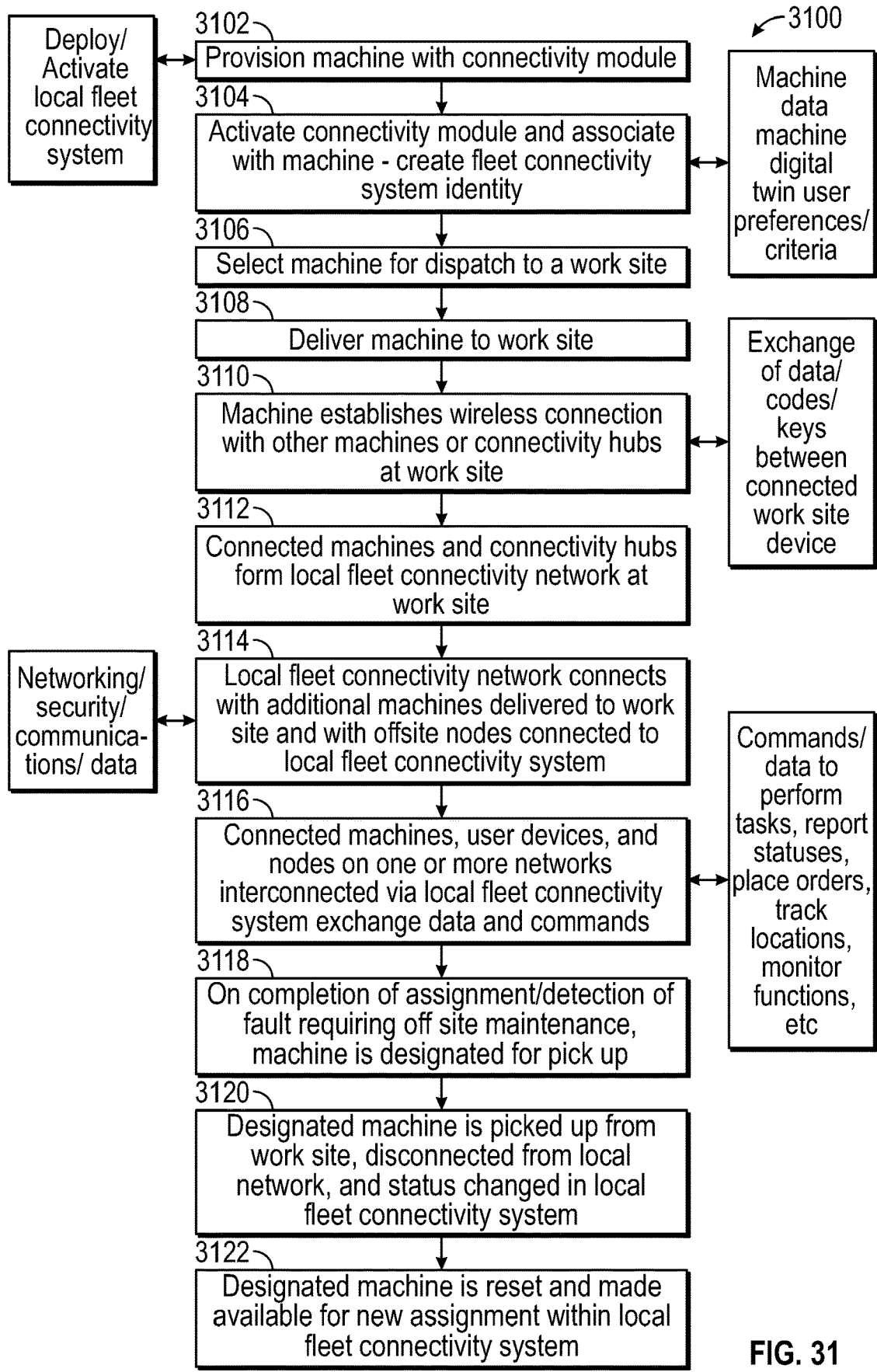
FIG. 31 is a flow chart of a method to deploy the local machine connectivity system of FIG. 2, according to an exemplary embodiment.

Referring to FIG. 31, a method 3100 of deploying a local machine connectivity system is shown according to an exemplary embodiment. In other embodiments, method 3100 may include additional, fewer, and/or different operations.

According to an exemplary embodiment, at operation 3102, a machine (e.g., work machine 202) is provisioned with a connectivity module 218. The connectivity module 218 may enable work machine 202 to link to one or more other machines to create a local fleet connectivity system 200. At operation 3104, the connectivity module is activated and associated with the machine. Activation and association of the connectivity module may provide system level visibility to a digital twin of the machine, machine location, status, and digital records for the machine that are stored onboard the machine or remotely. User access to machine control and machine data may be provided according to access permissions.

In some embodiments, at operation 3106, the machine is selected for dispatch to a work site. At operation 3108, the machine is delivered to the work site. At operation 3110, the machine links (e.g., communicably connects) with other machines or connectivity hubs at the work site by establishing a wireless connection with the other machines or connectivity hubs. Operation 3110 may include establishing, by at least one control module via at least one connectivity module, a connection between a plurality of machines disposed at a location. The link between a plurality of machines enables an exchange of data, codes, keys, etc. between the connected machines. At operation 3112, the connected machines and connectivity hubs form a local fleet connectivity network at the work site. Each of the machines and hubs may comprise a node of the local fleet connectivity network. At operation 3114, the local fleet connectivity network connects with additional machines and network devices (e.g., a user device) delivered to the work site and with offsite nodes connected to the local fleet connectivity system. For example, an offsite note (e.g., a remote user device) may communicably connect with a plurality of machines disposed on the work site via the connectivity module. Connecting to the offsite notes enables the machines to provide data to devices at a remote location. At operation 3116, connected machines, user devices, connectivity hubs, and nodes on one or more networks interconnected via the local fleet connectivity system exchange data and commands. The exchange of data and commands may enable the system to perform tasks, report statuses, place orders, track locations, monitor functions, etc. according to system provided permissions.

According to an exemplary embodiment, at operation 3118, at the completion of an assignment or at the detection of a fault condition requiring off site maintenance, the machine is designated for pick up. In some embodiments, the machine may send a notification to a remote user device indicating that the machine is to be removed from the work site. At operation 3120, the designated machine is picked up at the work site. Upon pick up, the machine may be disconnected from the local network. For example, a plurality of machines may be connected with each other and with a connectivity hub at a work site. When a first machine of the plurality of machines is removed from the work site, the first machine is no longer connected with the remaining plurality of machines or the connectivity hub.

In some embodiments, at operation 3122, the designated machine is reset (e.g. fueled, charged, serviced, repaired, upgraded, etc.) and made available for a new assignment within the local fleet connectivity system. In some embodiments, the machine may be returned to the same work site and connected to the same local fleet connectivity system. In other embodiments, the machine may be sent to a new work site and connected to a new local fleet connectivity system. Method 3100 may be performed any number of times for any machine, and can include any number of local fleet connectivity systems.

Figure 32:
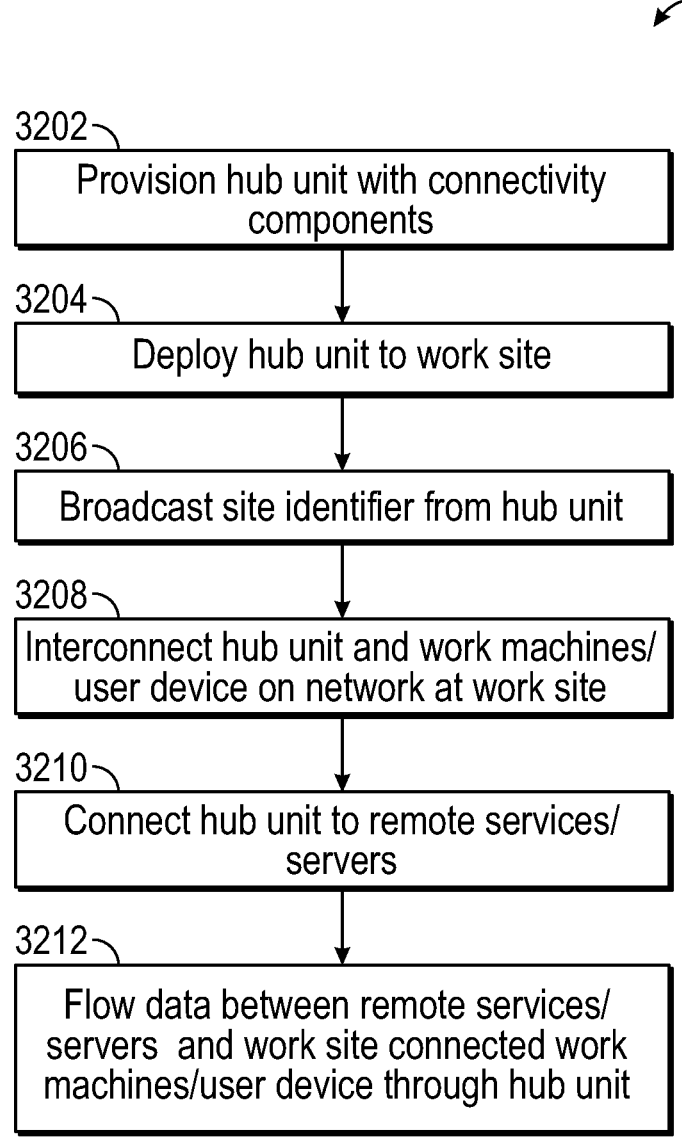
FIG. 32 is a flow chart of a method to deploy a fleet connectivity system connectivity hub, according to an exemplary embodiment.

Referring to FIG. 32, a method for deploying a connectivity hub for a local fleet connectivity system is shown, according to an exemplary embodiment. In some embodiments, at operation 3202, a hub unit is provisioned with at least one connectively module. The connectivity module may be configured to communicatively connect various devices (e.g., work machines, user devices, remote servers, etc.). At operation 3204, the hub unit may be deployed to a work site to provide the functionalities described herein in place of or in addition to a machine that has a connectivity module. At operation 3206, the connectivity hub may broadcast a site identifier. At operation 3208, the connectivity hub may connect with a plurality of nodes connected to a network at the work site. The nodes may be works machines, user devices, and other devices capable of communicably connecting with the connectivity hub that are disposed at the work site. For example, the connectivity module may establish a connection between the connectivity hub and a plurality of machines disposed at a work site. At operation 3210, the connectivity hub may connect with remote services and servers. For example, the connectivity hub may connect with various nodes connected with remote networks. For example, the connectivity module may establish a connection between the connectivity hub and at least one remote server. At operation 3212, the connectivity hub may exchange data between the remote services and servers and the nodes disposed at the work site (e.g., work machines, user devices, etc.). For example, the connectivity hub may exchange data between the plurality of machines and at least one remote server. The data may flow through the connectivity hub.

In some embodiments, operation 3212 includes the connectivity hub receiving input, interpreting, analyzing, and manipulating the input, and generating an output. For example, the connectivity hub may receive a command from at least one remote server. The command may comprise a task to be performed. Responsive to receiving the command, the connectivity module may assign at least one of the plurality of machines to perform the task. To assign the at least one machine, the connectivity hub may determine a subset of the plurality of machines that are capable of performing the task. For example, the connectivity hub may analyze data corresponding to the plurality of machines to determine which of the plurality of machines are able to perform the task. For example, the connectivity hub may identify at least one of a type of equipment, a battery level, an availability, and a self-inspection score for each of the plurality of machines. The connectivity module may determine the subset of the plurality of machines based on the analyzed data.

In some embodiments, the connectivity hub may select a preferred machine from the subset of the plurality of machines. The preferred machine may be based on predetermined criteria. For example, the predetermined criteria may comprise at least one of closest proximity to a task location, highest battery level, fewest recorded malfunctions, and best self-inspection score. For example, if the subset of the plurality of machines comprises several machines, the preferred machine may be the machine disposed closest to the task location, the machines with the highest battery level, the machine that is not already being used for a different task, or the machine operating the best.

In other embodiments, the connectivity hub may receive a request from a user of at least one remote server to obtain machine-specific data corresponding to the plurality of machines. The request may comprise an access identifier. The access indicator may be any information indicative of an association of the machine with the user. For example, the access indicator may be an access code, a customer key, user credentials (user name and password), identification information, the type of account being used (e.g., customer account, manufacturer account, technician account, etc.), etc. The connectivity hub may store instructions regarding which machines are associated with which access indicator. The connectivity hub may determine the machine-specific data the user is authorized to access. For example, the connectivity hub may compare the access indicator received via the request with the stored instructions to determine which machine-specific data to provide to the user. Upon determining which machines are associated with the access indicator, the connectivity hub may receive the machine-specific data the user is authorized to access from the plurality of machines. The connectivity hub may transmit the machine-specific data corresponding to the identified machines to the user of the remote server. In some embodiments, the access indicator limits which of the plurality of machines the user is authorized to access. In some embodiments, the access indicator limits the machine-specific data associated with each of the plurality of machines the user is authorized to access.

For example, a user may have access to all of the plurality of machines, but only to specific information. For example, a customer may only have access to current data (e.g., e.g., current battery level, current location on a job site, current authorized operators, etc.). A manufacturer may have access to all data, including current data and historical data (e.g., average battery life, previous jobs completed, results of previously-performed self-inspections, etc.). Similar to the example above, the connectivity hub may determine a subset of the machine-specific data that is associated with an access indicator that is included in the request and provide that subset of machine-specific data to the user of the remote server.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1-3, it should be understood that the controller 44 may include any number of circuits for completing the functions described herein. For example, the activities and functionalities of the control system 60 may be combined in multiple circuits or as a single circuit. Additional circuits with additional functionality may also be included. Further, the controller 44 may further control other activity beyond the scope of the present disclosure.

As mentioned above and in one configuration, the "circuits" of the control system 60 may be implemented in machine-readable medium for execution by various types of processors, such as the processor 52 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A site connectivity system comprising:

a first machine including a first prime mover, first tractive elements, and a first wireless machine communications interface;

a second machine including a second prime mover, second tractive elements, and a second wireless machine communications interface; and a deployable connectivity hub having an integrated power source such that the deployable connectivity hub is selectively deployable at a site, the deployable connectivity hub configured to:

establish a first wireless connection with the first wireless machine communications interface of the first machine at the site when the first wireless machine communications interface is within a first signal range of the deployable connectivity hub to form a local site network;

establish a second wireless connection with the second wireless machine communications interface of the second machine at the site when the second wireless machine communications interface is within the first signal range of the deployable connectivity hub such that the second wireless machine communications interface joins the local site network;

establish the second wireless connection with the second wireless machine communications interface of the second machine at the site through the first wireless machine communications interface when the second wireless machine communications interface is not within the first signal range of the deployable connectivity hub but within a second signal range of the first wireless machine communications interface such that the second wireless machine communications interface joins the local site network;

establish a third connection with a remote server;

35 receive data from the first wireless machine communications interface regarding the first machine over the local site network;

transmit the data to the second wireless machine communications interface over the local site network; and transmit, based on an access indicator of a user of the remote server indicating a subset of the data that the user is allowed to access, the subset of the data to the remote server over the third connection.

2. The site connectivity system of claim 1, wherein at least one of the first machine or the second machine includes an extendable implement.

3. The site connectivity system of claim 1, further comprising a user device configured to acquire the data from at least one of (a) the deployable connectivity hub, (b) the second wireless machine communications interface, or (c) the remote server.

4. The site connectivity system of claim 3, wherein the user device is configured to acquire the data directly from the deployable connectivity hub.

5. The site connectivity system of claim 3, wherein the user device is configured to acquire the data from the remote server.

6. The site connectivity system of claim 3, wherein the user device is configured to acquire the data from the second wireless machine communications interface.

7. The site connectivity system of claim 6, wherein the user device is associated with the second machine.

8. The site connectivity system of claim 3, wherein the deployable connectivity hub is configured to:

determine a subset of the data accessible by the user device based on an access level of a user associated with the user device; and only provide the subset of the data directly to the user device or to the user device through the second wireless machine communications interface.

9. The site connectivity system of claim 1, wherein the local site network is established using a first wireless communication protocol and the third connection is established using a second wireless communication protocol different than the first wireless communication protocol.

10. The site connectivity system of claim 1, wherein the deployable connectivity hub has the integrated power source such that the deployable connectivity hub is selectively deployable and self-powered at the site without connection to an external power source.

11. A site connectivity system comprising:

a first wireless machine communications interface configured to be associated with a first machine;

a second wireless machine communications interface configured to be associated with a second machine; and a deployable connectivity hub having an integrated power source such that the deployable connectivity hub is selectively deployable at a site, the deployable connectivity hub configured to:

establish a first wireless connection with the first wireless machine communications interface associated with the first machine at the site when the first wireless machine communications interface is within a first signal range of the deployable connectivity hub to form a local site network;

establish a second wireless connection with the second wireless machine communications interface associated with the second machine at the site when the second wireless machine communications interface is within the first signal range of the deployable connectivity hub such that the second wireless machine communications interface joins the local site network;

establish the second wireless connection with the second wireless machine communications interface associated with the second machine at the site through the first wireless machine communications interface when the second wireless machine communications interface is not within the first signal range of the deployable connectivity hub but within a second signal range of the first wireless machine communications interface such that the second wireless machine communications interface joins the local site network;

establish a third connection with a remote server;

receive data from the first wireless machine communications interface regarding the first machine;

transmit the data to the second wireless machine communications interface over the local site network; and transmit, based on an access indicator of a user of the remote server indicating a subset of the data that the user is allowed to access, the subset of the data to the remote server over the third connection.

12. The site connectivity system of claim 11, further comprising a user device configured to acquire the data from at least one of (a) the deployable connectivity hub, (b) the second wireless machine communications interface, or (c) the remote server.

13. The site connectivity system of claim 12, wherein the deployable connectivity hub is configured to:

determine a subset of the data accessible by the user device based on an access level of a user associated with the user device; and only provide the subset of the data directly to the user device or to the user device through the second wireless machine communications interface.

14. The site connectivity system of claim 11, wherein the local site network is established using a first wireless communication protocol and the third connection is established using a second wireless communication protocol different than the first wireless communication protocol, and wherein the first wireless communication protocol has a shorter wireless range than the second wireless communication protocol.

15. The site connectivity system of claim 11, wherein the deployable connectivity hub has the integrated power source such that the deployable connectivity hub is selectively deployable and self-powered at the site without connection to an external power source.

16. A site connectivity system comprising:

a connectivity hub having an integrated power source such that the connectivity hub is selectively deployable and self-powered at a site without connection to an external power source, the connectivity hub configured to:

establish a first wireless connection with a first wireless machine communications interface associated with a first machine at the site when the first wireless machine communications interface is within a first signal range of the connectivity hub to form a local site network;

establish a second wireless connection with a second wireless machine communications interface associated with a second machine at the site when the second wireless machine communications interface is within the first signal range of the connectivity hub such that the second wireless machine communications interface joins the local site network;

establish the second wireless connection with the second wireless machine communications interface associated with the second machine at the site through the first wireless machine communications interface when the second wireless machine communications interface is not within the first signal range of the connectivity hub but within a second signal range of the first wireless machine communications interface such that the second wireless machine communications interface joins the local site network;

establish a third connection with a remote server;

receive data from the first wireless machine communications interface regarding the first machine; and transmit, based on an access indicator of a user of the remote server indicating a subset of the data that the user is allowed to access, the subset of the data to the remote server over the third connection.

17. The site connectivity system of claim 16, wherein the connectivity hub is configured to transmit at least a subset of the data to the second wireless machine communications interface over the local site network.

* * * * *